US009038390B1

(12) United States Patent
Kreuger

(10) Patent No.: US 9,038,390 B1
(45) Date of Patent: May 26, 2015

(54) APPARATUSES AND METHODS FOR THERMODYNAMIC ENERGY TRANSFER, STORAGE AND RETRIEVAL

(71) Applicant: Sten Kreuger, Chonburi (TH)

(72) Inventor: Sten Kreuger, Chonburi (TH)

( * ) Notice: Subject to any disclaimer, the term of this patent is extended or adjusted under 35 U.S.C. 154(b) by 0 days.

(21) Appl. No.: 14/512,168

(22) Filed: Oct. 10, 2014

(51) Int. Cl.
| F01K 23/04 | (2006.01) |
| F01K 1/00 | (2006.01) |
| F01K 27/00 | (2006.01) |
| F28D 7/00 | (2006.01) |
| F01K 23/02 | (2006.01) |
| F01K 23/10 | (2006.01) |
| F03G 6/00 | (2006.01) |
| F03G 6/06 | (2006.01) |
| F03G 7/00 | (2006.01) |

(52) U.S. Cl.
CPC . *F01K 27/00* (2013.01); *F28D 7/00* (2013.01); *F01K 23/02* (2013.01); *F01K 23/10* (2013.01); *F03G 6/003* (2013.01); *F03G 6/065* (2013.01); *F03G 2007/007* (2013.01)

(58) Field of Classification Search
CPC ......... F01K 27/00; F01K 23/10; F01K 23/02; F03G 6/065; F03G 6/003; F03G 2007/007; F28D 7/00
USPC .................. 60/655, 670; 62/6, 401, 402, 467
See application file for complete search history.

(56) References Cited

U.S. PATENT DOCUMENTS

| 4,166,361 | A | 9/1979 | Earnest et al. |
| 5,239,833 | A * | 8/1993 | Fineblum ........................... 62/6 |
| 7,481,057 | B2 * | 1/2009 | Patwardhan ................. 60/641.8 |
| 7,637,457 | B2 | 12/2009 | Bennett |
| 7,971,424 | B2 * | 7/2011 | Masada ...................... 60/39.182 |
| 8,250,847 | B2 | 8/2012 | Rapp et al. |
| 8,739,512 | B2 * | 6/2014 | Mills .............................. 60/39.5 |
| 2010/0301614 | A1 | 12/2010 | Ruer |
| 2010/0307169 | A1 | 12/2010 | Diaz |
| 2011/0139407 | A1 | 6/2011 | Ohler et al. |
| 2014/0060051 | A1 * | 3/2014 | Ohler et al. ..................... 60/652 |

FOREIGN PATENT DOCUMENTS

CA            1126523         6/1982

* cited by examiner

*Primary Examiner* — Hoang Nguyen
(74) *Attorney, Agent, or Firm* — Andrew D. Fortney; Central California IP Group, P.C.

(57) ABSTRACT

Systems and methods for transferring and optionally storing and/or retrieving thermal energy are disclosed. The systems and methods generally include a heat engine and a heat pump, the heat engine including first isothermal and gradient heat exchange mechanisms, and the heat pump including second isothermal and gradient heat exchange mechanisms. The heat engine and the heat pump exchange heat with each other countercurrent across the first and second gradient heat exchange mechanisms, the first isothermal heat exchange mechanism transfers heat to an external heat sink, and the second isothermal heat exchange mechanism receives heat from an external heat source.

23 Claims, 38 Drawing Sheets

APPARATUSES AND METHODS FOR THERMODYNAMIC ENERGY TRANSFER, STORAGE AND RETRIEVAL

FIELD OF THE INVENTION

The present invention generally relates to the field of heat and thermal energy transfer, storage and retrieval. More specifically, embodiments of the present invention pertain to methods and systems for transferring, storing and retrieving thermal energy using thermodynamic cycles (e.g., heat pumps and heat engines) that limit energy losses according to the second law of thermodynamics (or "second law" losses; e.g., due to increases in entropy).

DISCUSSION OF THE BACKGROUND

Combined heat engines and heat pumps are generally well known like constructions based on the Vuillemier cycles as one example.

Most thermodynamic cycles (e.g., Carnot, Rankine, Brayton, Stirling, etc.) are based on reversible processes. Each cycle usually includes four such processes. A reversible process is by definition lossless. A thermodynamic cycle that consists of reversible processes is lossless. Thermodynamic losses in a combined reversible cycle are external, and the thermodynamic efficiency of the combined cycle is based on external losses and depends on how the heat is delivered from the outside and delivered to the outside of the combined cycle. The practical usefulness of combined cycles is dependent on the real efficiency of included sub-processes.

FIGS. 1 and 2 show the basic trilateral cycles and Brayton cycles and/or processes that function as heat engines and heat pumps. FIG. 1 shows a temperature-entropy (TS) diagram for a typical trilateral cycle that has an ascending upside and a horizontal bottom. The trilateral cycle of FIG. 1 also works in conjunction with a gradient heat source and a constant temperature (isothermal) heat sink, and operates as a motor when the cycle moves in the clockwise direction.

In the trilateral cycle of FIG. 1, 1-2 represents a process that increases the temperature of the working fluid slightly without changing the entropy, 2-3 represents an isobaric, increasing temperature gradient heat transfer process, 3-4 represents an adiabatic expansion process, and 4-1 represents an isothermal, isobaric heat transfer process (i.e., heat transfer to the outside; e.g., as a result of a phase change from gas to liquid). The heat added to the cycle from a heat source is $Q_{in}=Q_{2-3}$. The heat delivered from the cycle to a heat sink is $Q_{out}=Q_{4-1}$. The mechanical power added to the cycle is $W_1=W_{1-2}$. The mechanical power produced by and/or transferred within the system is $W_2=W_{3-4}$.

Since the cycle is reversible, the diagram of FIG. 1 also shows a trilateral heat pump cycle with a constant temperature heat source and a gradient heat sink when operating in the opposite direction (counter clockwise) as a heat pump. In the reverse cycle, 4-3 represents an adiabatic compression, 3-2 represents an isobaric, decreasing temperature gradient heat transfer process, 2-1 represents a pressure recovery process, and 1-4 represents an isothermal and isobaric heat transfer (e.g., phase change from liquid to gas). The heat added to the cycle from a heat source is $Q_{in}=Q_{1-4}$. The heat delivered from the cycle to a heat sink is $Q_{out}=Q_{3-2}$. The mechanical power added to the cycle is $W_1=W_{4-3}$. The mechanical power delivered from the cycle is $W_2=W_{2-1}$. U.S. Pat. Appl. Publ. No. 2011/0139407 discloses such a cycle for thermoelectric energy storage in liquids.

FIG. 2 shows a TS diagram for a typical Brayton cycle that has an ascending upside and a descending downside. The Brayton cycle of FIG. 2 includes a gradient heat source and a gradient temperature heat sink, and operates as a motor in the clockwise direction. In the Brayton cycle of FIG. 2, 5-6 represents an adiabatic compression, 6-7 represents an isobaric, increasing temperature gradient heat transfer, 7-8 represents an adiabatic expansion, and 8-5 represents an isobaric, decreasing temperature gradient heat transfer process. The heat added to the cycle from a heat source is $Q_{in}=Q_{6-7}$. The heat delivered from the cycle to a heat sink is $Q_{out}=Q_{8-5}$. The mechanical power added to the cycle is $W_1=W_{5-6}$. The mechanical power delivered from the cycle is $W_2=W_{7-8}$.

Since the cycle is reversible, the diagram of FIG. 2 also shows a Brayton heat pump cycle with a gradient temperature heat source and a gradient heat sink, operating as a heat pump in the opposite (counter clockwise) direction. In the reverse cycle, 8-7 represents an adiabatic compression, 7-6 represents an isobaric, decreasing temperature gradient heat transfer process, 6-5 represents an adiabatic expansion, and 5-8 represents an isobaric, increasing temperature gradient heat transfer. The heat added to the cycle from a heat source is $Q_{in}=Q_{5-8}$. The heat delivered from the cycle to a heat sink is $Q_{out}=Q_{7-6}$. The mechanical power added to the cycle is $W_1=W_{8-7}$. The mechanical power delivered from the cycle is $W_2=W_{6-5}$. U.S. Pat. Appl. Publ. No. 2010/301614 discloses such a cycle for thermoelectric energy storage in solid materials.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Objects of the present invention include increasing the usage of a temperature difference and/or Carnotizing the thermodynamic processes that increase the efficiency of heat driven machines or processes driven by temperature differences, as well as machine-driven heat transfer processes (e.g., using a heat pump). Other objects include systems and methods that limit or minimize "second law" losses. The combination of cycles in the present disclosure bring the different systems of combined cycles close to an ideal Carnot cycle. Also heating and/or cooling of air, water or any substance or working fluid can receive the benefits) of the present invention.

By combining the cycles as shown in the temperature-entropy (TS) diagrams, it is possible to get close to a perfect match between the heat transfer or exchange processes for the most efficient heat transmission between the different cycles. Such cycle combinations also provide an ability to exchange heat with the environment outside the combined-cycle pump-engine (system) in the most efficient way depending on various system requirements, with combinations including (but not limited to) heat exchanges across an increasing gradient in one cycle to a decreasing gradient in another cycle (and within a single cycle in the system), isothermal heat exchanges from an external heat source to a cycle in the system or from a cycle in the system to an external heat sink, and internal isothermal heat exchanges between different cycles in the system.

The effects of the present systems based on multiple cycles working together include less energy needed for driving the heat engine(s), more heat transferred from the cold side by the heat pump(s), and an increase in the efficiency of heat-sourced motors and heating/cooling systems. The present invention can, for example, increase the efficiency of a solar driven air conditioning (AC) system or a biomass heating or energy generation system.

In some examples of the present invention, a trilateral or Rankine cycle is the main (engine) cycle, and works together with a Brayton cycle (a closed cycle) using a heat source that either is the same as for the Rankine/trilateral cycle or, when the temperature is limited, the heat sink from a heat pump. In various embodiments, the heat pump can be a Brayton, trilateral, or vapor compression heat pump, and the heat engine can be a Brayton, trilateral, or Rankine heat engine. However, other types of thermodynamic cycles are also applicable to or suitable for use in the present invention. A key concept behind the invention is that the heat from a gradient process (e.g., a decreasing gradient) in the pump cycle is transferred to a complementary gradient process (e.g., an increasing gradient) in the engine cycle. Together with use of isothermal heat exchanges (e.g., based on a phase change of the working substance or working fluid), the present invention (which includes at least one internal countercurrent transfer heat across first and second gradient heat exchange mechanisms) limits or minimizes "second law" losses.

Embodiments of the present invention relate to systems and methods for transferring and optionally storing and/or retrieving thermal energy. The systems and methods generally include a heat engine and a heat pump, the heat engine including a first isothermal heat exchange mechanisms and a first gradient heat exchange mechanism, and the heat pump including a second isothermal heat exchange mechanisms and a second gradient heat exchange mechanism. The heat engine and the heat pump transfer or exchange heat (e.g., internally, or with each other) countercurrent across the first and second gradient heat exchange mechanisms, the first isothermal heat exchange mechanism transfers heat to an external heat sink, and the second isothermal heat exchange mechanism receives heat from an external heat source.

In one variation of the system, the first heat engine comprises a Rankine heat engine with a high pressure side and a liquid-phase working fluid therein, the heat pump comprises a vapor compression heat pump with a high pressure side and a superheated working fluid therein, and the countercurrent heat transfer across the first and second gradient heat exchange mechanisms transfers heat from the high pressure side of the heat pump to the high pressure side of the heat engine. For example, the vapor compression heat pump may further comprise a low pressure side, a third gradient heat exchange mechanism in the high pressure side, and a fourth gradient heat exchange mechanism in the low pressure side. The third gradient heat exchange mechanism may transfer heat from the high pressure side to the fourth gradient heat exchange mechanism in the low pressure side.

In another variation of the system, the heat engine comprises a trilateral heat engine with a high pressure side, the heat pump comprises a vapor compression heat pump with a high pressure side and a superheated working fluid therein, and the countercurrent heat transfer across the first and second gradient heat exchange mechanisms transfers heat from the high pressure side of the heat pump to the high pressure side of the heat engine.

In yet another variation of the system, the heat engine comprises a Rankine heat engine with a high pressure side and a liquid-phase working fluid therein, the heat pump comprises a trilateral heat pump with a high pressure side, and the countercurrent heat transfer across the first and second gradient heat exchange mechanisms transfers heat from the high pressure side of the heat pump to the high pressure side of the heat engine.

In a further variation of the system, the heat engine comprises a Rankine heat engine with a high pressure side, the heat pump comprises a transcritical heat pump with a high pressure side, the first gradient exchange mechanism comprises a gradient heat absorption mechanism in the high pressure side of the Rankine heat engine, and the countercurrent heat transfer across the first and second gradient heat exchange mechanisms transfers heat from the second gradient heat exchange mechanism in high pressure side of the heat pump to the gradient heat absorption process in the high pressure side of the heat engine.

In an even further variation of the system, the heat engine comprises a trilateral heat engine with a high pressure side, the heat pump comprises a transcritical heat pump with a high pressure side, the first gradient exchange mechanism comprises a gradient heat absorption mechanism in the high pressure side of the trilateral heat engine, and the countercurrent heat transfer across the first and second gradient heat exchange mechanisms transfers heat from the second gradient heat exchange mechanism in high pressure side of the heat pump to the gradient heat absorption process in the high pressure side of the heat engine.

In a still further variation of the system, the heat engine comprises a trilateral heat engine with a high pressure side, the heat pump comprises a trilateral heat pump with a high pressure side, the first gradient heat exchange mechanism comprises a gradient heat absorption mechanism in the high pressure side of the trilateral heat engine, and the countercurrent heat transfer across the first and second gradient heat exchange mechanisms transfers heat from the second gradient heat exchange mechanism in the high pressure side of the heat pump to the gradient heat absorption process in the high pressure side of the heat engine.

Another aspect of the invention relates to a system, comprising a heat engine including a first isothermal heat exchange mechanism and a first gradient heat exchange mechanism, a mechanism comprising a Brayton heat cycle with second and third gradient heat exchange mechanisms, and a heat pump including a second isothermal heat exchange mechanism and a fourth gradient heat exchange mechanism. The heat engine and the Brayton heat cycle transfer heat (e.g., internally, or with each other) countercurrent across the first and second gradient heat exchange mechanisms. The Brayton heat cycle and the heat pump transfer heat (e.g., internally, or with each other) countercurrent across the third and fourth gradient heat exchange mechanisms. The first isothermal heat exchange mechanism transfers heat to an external heat sink. The second isothermal heat exchange mechanism receives heat from an external heat source.

In one variation of this system, the Brayton heat cycle comprises a Brayton heat pump with a high pressure side, a low pressure side, and a gradient heat absorption mechanism in the low pressure side, the heat engine comprises a Rankine heat engine with a high pressure side, and the system further comprises a trilateral heat pump with a high pressure side and a gradient heat rejection mechanism therein. The first gradient exchange mechanism comprises a gradient heat absorption mechanism in the high pressure side of the Rankine heat engine. The second gradient exchange mechanism comprises a gradient heat rejection mechanism in the high pressure side of the Brayton heat pump. The countercurrent heat transfer across the first and second gradient heat exchange mechanisms transfers heat from the gradient heat rejection mechanism in the high pressure side of the Brayton heat pump to the gradient heat absorption mechanism in the high pressure side of the heat engine. The gradient heat rejection mechanism in the high pressure side of the trilateral heat pump transfers heat to the gradient heat absorption mechanism in the low pressure side of the Brayton heat pump.

In one variation of this system, the heat engine comprises a trilateral heat engine with a high pressure side, the mechanism comprising the Brayton heat cycle comprises a Brayton heat pump, and the heat pump comprises a trilateral heat pump with a high pressure side. The countercurrent heat transfer across the first and second gradient heat exchange mechanisms transfers heat from the high pressure side of the trilateral heat engine to the high pressure side of the Brayton heat pump. The countercurrent heat transfer across the third and fourth gradient heat exchange mechanisms transfers heat from the high pressure side of the trilateral heat pump to the low pressure side of the Brayton heat pump.

In another variation of this system, the heat engine comprises a Rankine heat engine with a gradient high pressure side, the mechanism comprising the Brayton heat cycle comprises a Brayton heat engine, and the heat pump comprises a trilateral heat pump with a high pressure side. The countercurrent heat transfer across the first and second gradient heat exchange mechanisms transfers heat from the high pressure side of the Brayton heat engine to the high pressure side of the Rankine heat engine, and the countercurrent heat transfer across the third and fourth heat exchange mechanisms transfers heat from the high pressure side of the trilateral heat pump to the high pressure side of the Brayton heat engine.

In yet another variation of this system, the heat engine comprises a trilateral heat engine with a high pressure side, the mechanism comprising the Brayton heat cycle comprises a Brayton heat engine, and the heat pump comprises a trilateral heat pump with a high pressure side. The countercurrent heat transfer across the first and second gradient heat exchange mechanisms transfers heat from the low pressure side of the Brayton heat engine to the high pressure side of the trilateral heat engine, and the countercurrent heat transfer across the third and fourth heat exchange mechanisms transfers heat from the high pressure side of the trilateral heat pump to the high pressure side of the Brayton heat engine.

A further variation of this system further comprises a heat storage subsystem with a gradient heat absorption mechanism that receives heat from the second gradient heat exchange mechanism in a low pressure side of the heat engine when charging, and a gradient heat rejection mechanism that transfers heat to the first gradient heat exchange mechanism in the Rankine heat engine when discharging. A still further variation of the above system further comprises a heat storage subsystem with a gradient heat absorption mechanism that receives heat from the second gradient heat exchange mechanism in a low pressure side of the Brayton heat engine when charging, and a gradient heat rejection mechanism that transfers heat to the first gradient heat exchange mechanism in the trilateral heat engine when discharging.

The thermal energy systems described herein include at least one device for energy storage (e.g., heat and/or pressure storage and retrieval). The energy storage subsystem stores the energy in a device with a temperature and/or pressure differential relative to a reference temperature and/or pressure (which may be in another device in the system). The temperature and/or pressure in the energy storage device can be higher or lower than the reference temperature and/or pressure, and the reference temperature and/or pressure can be the ambient temperature and/or pressure, but is not limited thereto. The energy storage device may be described herein as a "heat storage" device, but can also comprise a pressure storage device.

The systems described herein have at least one charging mode of operation and at least one discharging mode of operation. Charging mode may occur when heat and/or pressure are added to or removed from a heat storage device to increase the difference in temperature and/or pressure relative to the reference temperature and/or pressure. Discharging mode may occur when heat and/or pressure are added to or removed from a heat storage device to decrease the difference in temperature and/or pressure relative to the reference temperature and/or pressure.

Together, with internal heat transfers or exchanges omitted, and with a heat storage device or subsystem included in the system, the charging mode and the discharging mode in sequence complete one cycle that approaches the efficiency of an ideal Carnot cycle, with isothermal heat absorption and/or rejection from or to the outside (e.g., external to the system).

Yet another aspect of the present invention relates to a system, comprising a first thermodynamic device (e.g., a heat engine, such as a Rankine heat engine) including a first isothermal heat exchange mechanism and a first gradient heat exchange mechanism, a second thermodynamic device (e.g., a heat pump, such as a Brayton heat pump) including second and third gradient heat exchange mechanisms, and a gradient heat storage device with fourth and fifth gradient heat exchange mechanisms. The first thermodynamic device and the second thermodynamic device transfer heat (e.g., internally, or with each other) countercurrent across the first and second gradient heat exchange mechanisms. The second thermodynamic device and the gradient heat storage device transfer heat (e.g., internally, or with each other) countercurrent across the third and fourth gradient heat exchange mechanisms. The system may further comprise a heat engine (e.g., a Brayton heat engine) with sixth and seventh gradient heat exchange mechanisms, and a heat pump (e.g., a trilateral heat pump) including a second isothermal heat exchange mechanism and an eighth gradient heat exchange mechanism. The heat engine and the gradient heat storage device may transfer heat countercurrent across the fifth and sixth gradient heat exchange mechanisms. The heat engine and the heat pump may transfer heat countercurrent across the seventh and eight gradient heat exchange mechanisms. The first isothermal heat exchange mechanism may transfer heat to a first external heat sink. The second isothermal heat exchange mechanism may receive heat from an external heat source.

In various embodiments, a Rankine or trilateral heat engine and a Brayton heat pump operate as a pair in a first (e.g., charging) mode. In the second (e.g., discharging) mode, a Brayton heat engine and a heat pump (e.g., a trilateral heat pump) operate as a pair. With one pair in operation, the other pair can be shut down. In various embodiments, the second thermodynamic device may comprise a single Brayton thermodynamic device that works as the Brayton heat pump in the first (e.g., charging) mode and as the Brayton heat engine in the second (e.g., discharging) mode. The first thermodynamic device may be shut down in the second (e.g., discharging) mode and replaced by a third thermodynamic device comprising a heat pump (e.g., a trilateral heat pump). Alternatively, the first thermodynamic device can comprise or work as a heat engine (e.g., a trilateral heat engine) in the first (e.g., charging) mode and as a heat pump (e.g., a trilateral heat pump) in the second (e.g., discharging) mode. In further embodiments, the heat storage device is integrated with the second thermodynamic device, and the third and fourth gradient heat exchange mechanisms are an inner surface of the gradient heat storage device.

In further or alternative embodiments, a first thermodynamic device may comprise a plurality of first pressure changing mechanisms, and a second thermodynamic device may comprise one or more second pressure changing mechanisms. For example, the first thermodynamic device may include a first working fluid, and the second thermodynamic device may include a second working fluid, in which case the first heat exchange mechanism may change a temperature and an entropy of the first working fluid in the first direction, and the third heat exchange mechanism may change a temperature and an entropy of the second working fluid in the second direction. In some embodiments, at least one of the thermodynamic devices may comprise at least two additional gradient heat exchange mechanisms that exchange heat countercurrent with each other.

A still further aspect of the present invention relates to compensation for the differences in the heat capacities of different fluids involved in gradient heat exchange to reduce or minimize the temperature divergence of the two fluids in the gradient heat exchange. In one example, such compensation relates to a trilateral heat pump or heat engine, but is not limited thereto, and may be used in all gradient heat transfers. A thermodynamic device implementing such compensation may comprise a first heat exchanger having a first gradient heat exchange mechanism with a first fluid therein and a second gradient heat exchange mechanism with a second countercurrent fluid therein, a second heat exchanger comprising a third gradient heat exchange mechanism and a fourth gradient heat exchange mechanism, the third gradient heat exchange mechanism having the first fluid therein, and the fourth gradient heat exchange mechanism having the second countercurrent fluid therein, where the second fluid in the second gradient heat exchange mechanism is in direct fluid connection with the second fluid in the fourth gradient heat exchange mechanism, and an adiabatic temperature-changing mechanism in between and in fluid connection with each of the first and third gradient heat exchange mechanisms. In one example, the thermodynamic device may further comprise a fifth heat exchange mechanism, an isothermal heat absorption or heat rejection mechanism, a second adiabatic temperature-changing mechanism in fluid connection with the first fluid in or from the third gradient heat exchange mechanism and the fifth heat exchange mechanism, and a third adiabatic temperature-changing mechanism between and in fluid connection with the fifth heat exchange mechanism and the first fluid in the first gradient heat exchange mechanism. The gradient heat exchange occurs between the first and the second fluids in the first and the second heat exchangers. The adiabatic temperature-changing mechanism effectively changes the temperature of the first fluid so that the temperature difference between the first and second fluids is minimized in the first and second gradient heat exchangers, in order to minimize the second law losses. Each of the first and third gradient heat exchange mechanisms has a heat exchange type different from the heat exchange type of the second and fourth gradient heat exchange mechanisms. For example, the first and third gradient heat exchange mechanisms may be heat absorption mechanisms, and the second and fourth gradient heat exchange mechanisms may be heat rejection mechanisms. In various embodiments, the first adiabatic temperature-changing mechanism may comprise an expander or a compressor, depending on whether a temperature increase (compressor) or decrease (expander) is desired. Depending on whether the thermodynamic device is a heat engine or a heat pump, in various examples, the third adiabatic temperature-changing mechanism may comprise a pump (heat engine) or a turbine (heat pump), and the second adiabatic temperature-changing mechanisms may comprise an expander (heat engine) or a compressor (heat pump). The second fluid in various examples can be any fluid where heat exchange is required, such as (but not limited to) fluids from/to heat storage and/or other thermodynamic devices and/or systems.

In other and/or additional embodiments (e.g., for any of the various aspects), one of the isothermal heat exchange mechanisms exchanges heat at a temperature greater than a temperature range over which the first and second thermodynamic devices exchange heat with each other across the first and second temperature gradients. In other and/or additional embodiments, the first thermodynamic device is a trilateral heat engine, and the second thermodynamic device is a trilateral heat pump, although the invention is not so limited. For example, the first thermodynamic device may be a trilateral heat engine, and the second thermodynamic device may be a Brayton heat pump, or vice versa, and the system and method may include one or more further trilateral heat pumps and/or heat engines.

In the present invention, the heat pumps and/or heat engines operate reversibly (e.g., in forward and reverse directions). Consequently, a device or subsystem that operates as a heat pump in one direction may operate as a heat engine in the opposite direction, and vice versa.

In a further embodiment, the heat pump may include a vapor compression heat pump with superheated vapor in a high pressure side, and the heat engine may include a Rankine heat engine with a liquid in a high pressure side. The vapor compression heat pump transfers heat from the superheated vapor in the high pressure side to the liquid in the high pressure side of the Rankine heat engine. Alternatively, the vapor compression heat pump further includes a liquid in the high pressure side and a gradient heat rejection mechanism, and a gradient heat absorption mechanism in the low pressure side, and the vapor compression heat pump transfers heat from the gradient heat rejection mechanism to the heat absorption process in the low pressure side of the vapor compression heat pump.

In an even further embodiment, the heat pump includes an isothermal heat exchange mechanism that exchanges heat with a heat source and another isothermal heat exchange mechanism that exchanges heat with a heat sink. In addition, the heat engine may include an isothermal heat exchange mechanism that exchanges heat with a second heat sink, and the heat pump and the heat engine may exchange heat with each other across the first and second temperature gradients over a temperature range greater than the temperatures of the isothermal heat exchange mechanisms.

The system may further comprise an energy storage and retrieval subsystem. In some embodiments, the energy storage and retrieval subsystem comprises a first tank or storage vessel for storing a thermal energy storage medium at a first temperature, a second tank or storage vessel for storing the thermal energy storage medium at a second temperature different from (e.g., lower or significantly lower) than the first temperature, at least one pump configured to transfer the thermal energy storage medium between the first and second tanks/storage vessels, and a heat exchanger configured to transfer heat between the thermal energy storage medium and at least one of the heat pump and the heat engine. The thermal energy storage medium may be a liquid or solid at the first and second temperatures, and the heat exchanger transfers heat across complementary or countercurrent temperature gradients in (i) the thermal energy storage and retrieval subsystem and (ii) the heat pump or the heat engine. For example, when the thermal energy storage medium is a liquid, the first tank or storage vessel may store the thermal energy storage medium at a temperature at or near (but generally below) the boiling point of the thermal energy storage medium, and the second tank or storage vessel may store the thermal energy storage medium at a temperature at or near (but generally above) the melting point of the thermal energy storage medium.

In some embodiments, the heat exchange across the first and second temperature gradients is from a high pressure heat rejection mechanism to a high pressure heat absorption mechanism. In other or further embodiments, the heat engine includes another isothermal heat exchange mechanism that exchanges heat with a second heat source, and the heat engine optionally includes an internal heat exchange mechanism that transfers heat from a third, low pressure gradient to a fourth, high pressure gradient. Alternatively or additionally, the heat pump may comprise (i) first and second isothermal heat exchange mechanisms that respectively exchange heat with a heat source and a heat sink, and a (ii) further gradient heat exchange mechanism that exchanges heat with the heat engine across yet another gradient heat exchange mechanism, and the heat engine comprises a Brayton heat engine that includes a still further gradient heat exchange mechanism that exchanges heat with another heat sink.

The heat pump and the heat engine may exchange heat across (i) the third and fourth gradient heat exchange mechanisms and (ii) isothermally across third and fourth isothermal heat mechanisms. Alternatively, the heat engine may further include a third isothermal heat exchange mechanism that exchanges heat with a second heat sink. The system may further comprise a second heat pump or a second heat engine having a third gradient heat exchange mechanism, which may exchange heat with the first heat pump and the first heat engine.

The system may further comprise a liquid gas storage and vaporization subsystem, comprising one or more additional gradient heat exchange mechanisms, and a liquid gas storage vessel or tank. In such a system, the heat pump may comprise (i) a plurality of first gradient heat exchange mechanisms, each exchanging heat with the second gradient heat exchange mechanism, and (ii) a plurality of additional gradient heat exchange mechanisms, each exchanging heat with the additional gradient heat exchange mechanism(s).

In further aspects of the system, the heat pump comprises a first work input device and a first work output device, the second gradient heat exchange mechanism changes a temperature and entropy of a first working fluid in the heat pump, and the second isothermal heat exchange mechanism exchanges heat by changing a phase of the first working fluid. In addition, the heat engine may comprises a second work input device and a second work output device, a heat exchange mechanism may change a temperature and entropy of a second working fluid in the heat engine, and/or another isothermal heat exchange mechanism exchanges heat by changing a phase of the second working fluid. For example, each of the first and second work input devices may independently comprise a pump or a compressor, and each of the first and second work output devices may independently comprise an expander or a turbine.

In some embodiments of the system, the heat pump and/or the heat engine further comprises a pressure decreasing device (e.g., an adiabatic pressure decreasing device) and a pressure increasing device (e.g., an adiabatic pressure increasing device) that effectively raise, lower or repeat part of one or more temperature gradients in the heat pump and/or the heat engine. In other or additional embodiments, the heat pump further includes a low pressure side, and the system further comprises a regenerator configured to transfer heat from the high pressure side of the heat pump to the low pressure side of the heat pump. In one example, the heat pump comprises a transcritical heat pump with a high pressure side, a low pressure side, a third gradient heat exchange mechanism, and a fourth gradient heat exchange mechanism, the third gradient heat exchange mechanism comprises a gradient heat rejection mechanism in the high pressure side of the transcritical heat pump, the fourth heat exchange mechanism comprises a gradient heat absorption mechanism in the low pressure side of the transcritical heat pump, and the heat pump transfers heat internally countercurrent across the third and the fourth gradient heat exchange mechanisms. Alternatively, the heat engine may comprise a trilateral heat engine with a high pressure side, the heat pump comprises a transcritical heat pump with a high pressure side, the first gradient exchange mechanism comprises a gradient heat absorption mechanism in the high pressure side of the trilateral heat engine, and the countercurrent heat transfer across the first and second gradient heat exchange mechanisms transfers heat from the second gradient heat exchange mechanism in high pressure side of the heat pump to the gradient heat absorption process in the high pressure side of the heat engine.

Another aspect of the present invention relates to a method of transferring thermal energy, generally comprising receiving the thermal energy in a heat pump, transferring a first portion of the thermal energy to a heat engine, and outputting at least some of the first portion of the thermal energy from the heat engine. The heat pump includes first gradient and isothermal heat exchange mechanisms and optional first and second pressure changing mechanisms, and the heat engine includes second gradient and isothermal fourth heat exchange mechanisms and optional third and fourth pressure changing mechanisms. The thermal energy is received in the heat pump, the first portion of the thermal energy is transferred to the heat engine, and/or at least some of the first portion of the thermal energy is output from the heat engine by the second isothermal heat exchange, and the heat pump and the heat engine exchange heat with each other across the first and second gradient heat exchange mechanisms. The method may further exchange heat between (i) at least one of the heat pump and the heat engine and (ii) an external heat source and/or an external heat sink across at least one of the isothermal heat exchange mechanisms. The gradient and isothermal heat exchanges reduce or minimize second law losses.

In further embodiments of the method, the thermal energy is received by a first working fluid in the first heat pump, and the method further comprises performing mechanical work using the first working fluid. Additionally or alternatively, the first portion of the thermal energy is transferred to a second working fluid in the heat engine, and the method further comprises performing additional mechanical work using the second working fluid. In addition, the method may further comprise storing at least some of the thermal energy in a thermal energy storage tank or vessel, and/or recovering or retrieving part of the thermal energy stored in the thermal energy storage tank or vessel.

The combined cycles disclosed herein (and others based on or using principles disclosed herein) approach a perfect Carnot cycle, especially when at least some of the heat from the pump can be used to heat or pre-heat the working fluid in a heat engine and/or heat storage cycle. The above advantages of the present invention and others will become readily apparent from the detailed description of various embodiments below.

DETAILED DESCRIPTION

Figure 1:
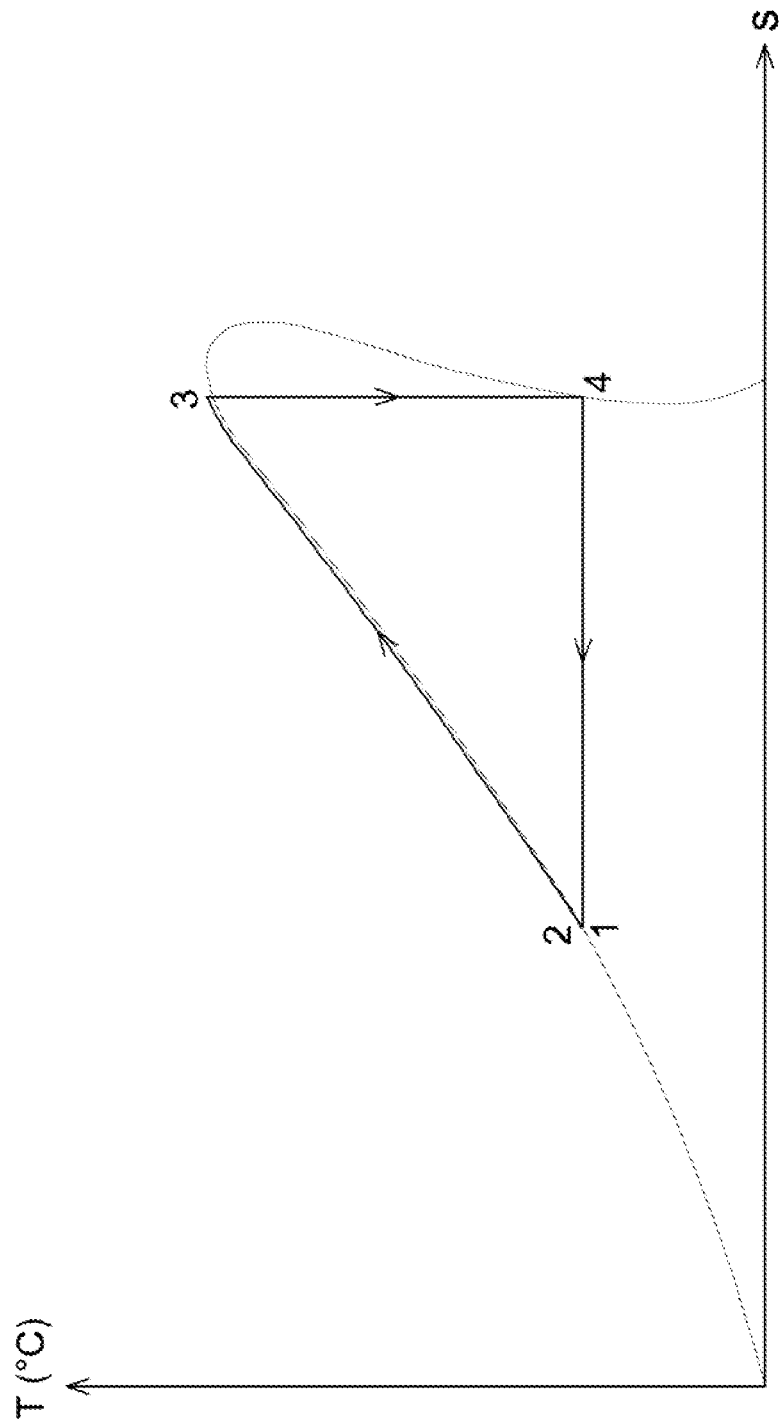
FIG. 1 is a temperature-entropy (TS) diagram for a conventional trilateral cycle.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

For the sake of convenience and simplicity, the terms "cycle" and "thermodynamic cycle" are generally used interchangeably herein, but are generally given their art-recognized meanings. Also, for convenience and simplicity, the terms "connected to," "coupled with," "coupled to," and "in communication with" may be used interchangeably, as may the terms "tank" and "vessel," and the terms "pipe," "tube" and "conduit," and use of one of the terms in one of these groups will generally include the others unless the context of use clearly indicates otherwise, but these terms are also generally given their art-recognized meanings.

The present invention combines one or more clockwise thermodynamic cycle(s) with one or more counterclockwise thermodynamic cycle(s). The present invention is particularly applicable to reversible thermodynamic cycles. The results of the present invention can be represented in a TS diagram (e.g., FIG. 3). The trilateral cycle in the TS diagram is represented by a horizontal downside (e.g., heat source, represented by the line 1-4) and a gradient (e.g., ascending or descending) upside (e.g., heat exchange or transfer or exchange process, represented by the line 3-2). By combining the two cycles in FIG. 3, one obtains a horizontal (i.e., isothermal) upside and a gradient (e.g., ascending) downside as a result. The combination results in an inverted trilateral cycle. In a conventional trilateral cycle, the temperature of the gradient process is higher than the temperature of the isothermal process. In the combined cycle of FIG. 3, the temperature of the gradient process is lower than the temperature of the isothermal process.

The present combination-cycle approach has many applications, in which some examples are further explained herein below. One example of a useful application of the present invention is efficient energy storage in warm and/or cold liquid (see, e.g., FIGS. 4-5), for thermoelectric use. Another application example is for preheating feed water for use in a steam cycle (see, e.g., FIG. 20). A third example is a heat-activated heat pump with increased efficiency (see, e.g., FIG. 9). A fourth example is highly efficient solar-driven liquid air production (see, e.g., FIG. 22).

When mechanical energy is produced from heat, it is possible to obtain low grade heat as a byproduct in a co-generation cycle. With the inverted inclined process in thermodynamic cycles provided by the present invention, it is possible to create a co-generate cycle with coldness or heat-withdrawal capacity as a byproduct. The cycle shown in FIG. 5 stores coldness (e.g., a working fluid or liquid medium at a very low temperature) in a charging loop. In the complementary discharging loop (see, e.g., FIG. 4), electricity may be retrieved, with moderate coldness as a valuable byproduct, and with a very small decrease in the electricity production.

If one or more clockwise trilateral processes (e.g., a steam engine) are combined with one or more counterclockwise trilateral processes (e.g., vapor compression), the steam can be superheated from a boiler. This combined cycle has a single temperature heat source and a single temperature heat sink, and can include substantially reversible processes.

In some applications such as biomass and waste burning, some salts formed during such applications (especially chloride salts, or chlorine) may dissolve a protective oxide or other coating on or in the tubes in the boiler at high temperatures, which can reduce the lifetime of the equipment, in some cases significantly. Some nuclear reactors have also a limited capacity to superheat steam. The present invention makes it is possible to superheat steam without increasing the boiler temperature. Superheating the steam can also reduce the humidity in the steam. Less humidity in the steam generally increases the lifetime of turbine blades.

The thermodynamic efficiency of the combined cycles approaches, and in some cases may be substantially the same as, an ideal Carnot cycle, and in those cases, the cycles in combination may involve trilateral cycles, Brayton cycles, Rankine cycles, and combinations thereof. The total increase in power output from the system of combined cycles is significantly higher than the increase in power needed for supporting the individual cycles (e.g., the heat pump[s]).

Figure 31A:
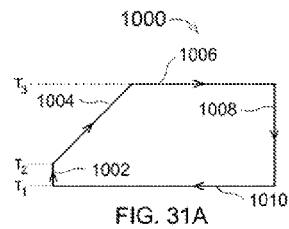
FIGS. 31A-N are diagrams of various thermodynamic cycles, useful for understanding the present disclosure.
Figure 31B:
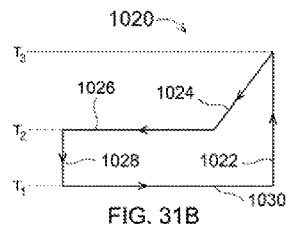
Figure 31C:
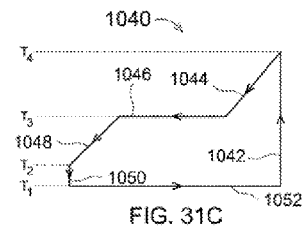
Figure 31D:
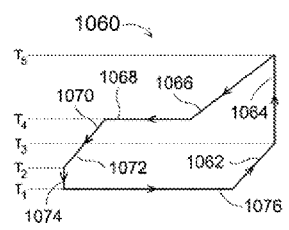
Figure 31E:
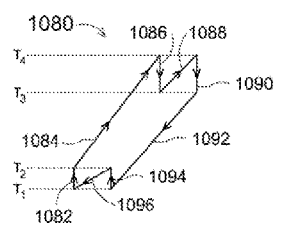
Figure 31F:
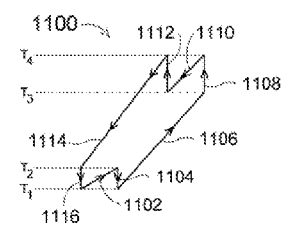
Figure 31G:
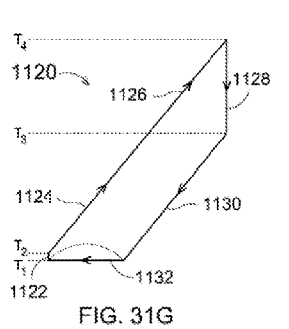
Figure 31H:
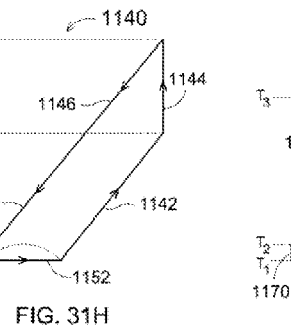
Figure 31I:
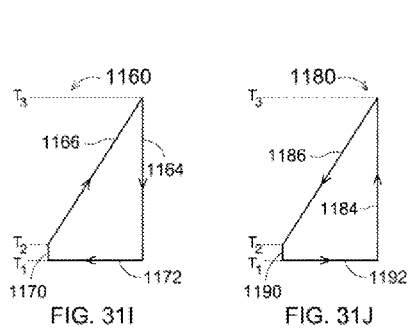
Figure 31J:
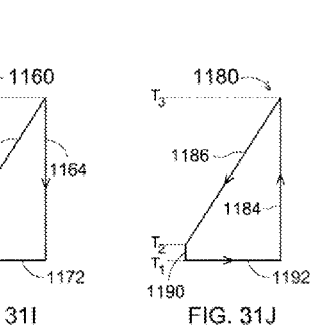
Figure 31K:
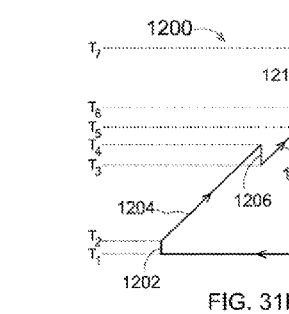
Figure 31L:
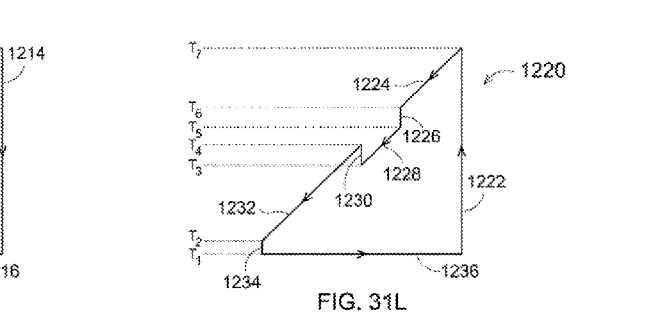
Figure 31M:
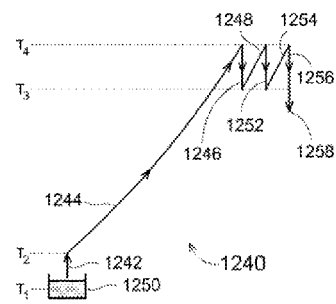
Figure 31N:
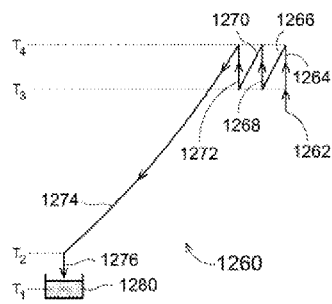

Before describing and/or explaining various embodiments of the invention, it may be helpful to describe some exemplary TS diagrams for examples of various thermodynamic cycles, with reference to FIGS. 31A-N. In FIGS. 31A-N, the relative temperatures are generally $T1<T2<T3<T4>T5>T6>T7$. Some of the cycles and cycle combinations shown in FIGS. 31A-N may be inventive in and of themselves, without further detailed description, although part or all of the cycle or cycle combination may be described in some detail herein.

FIG. 31A shows a Rankine cycle 1000 functioning as a heat engine, including a working fluid pumping process 1002 that increases the temperature of the working fluid from T1 to T2, a gradient isobaric heat absorption process 1004 (e.g., using a liquid-phase working fluid) in the temperature range T2 and T3, a high pressure isothermal evaporation process 1006 at T3, a gas expansion process at 1008 that lowers the temperature of the working fluid (in the gas phase) from T3 to T1, and a low pressure isothermal condensation process 1010 at T1 that converts the gas-phase working fluid to the liquid phase, connected in a loop.

FIG. 31B shows a vapor compression cycle 1020 without liquid cooling and without internal heat transfer or exchange. The vapor compression cycle 1020 functions as a heat pump, and includes a compression process 1022 working between T1 and T3, a high pressure gradient isobaric heat transfer or exchange (rejection) process 1024 between T3 and T2, a high pressure isothermal condensation (e.g., working fluid phase change) 1026 at T2, a liquid pressure lowering process (e.g., using a JT valve or a turbine) at 1028 that lowers the temperature from T2 to T1, and a low pressure isothermal evaporation process 1030 at T1, connected in a loop.

FIG. 31C shows a vapor compression cycle 1040 with liquid cooling and without internal heat transfer or exchange, functioning as a heat pump with a compression process 1042 between T1 and T4, a high pressure gradient isobaric heat transfer or exchange (e.g., rejection) process 1044 between T4 and T3, a high pressure isothermal condensation process (e.g., working fluid phase change from gas to liquid) 1046 at T3, a high pressure gradient isobaric liquid heat transfer or exchange (e.g., rejection) process 1048 between T3 and T2, a liquid pressure lowering process 1050 (e.g., using a JT valve or a turbine) that lowers the temperature from T2 to T1, and a low pressure isothermal evaporation process 1052 at T1, connected in a loop.

FIG. 31D shows a vapor compression cycle 1060 with liquid cooling and with internal heat exchange, functioning as a heat pump and including an increasing temperature gradient, isobaric heat transfer 1062 to a relatively high pressure working fluid (e.g., from the relatively low pressure, isobaric gradients 1070 and 1072) in the temperature range T1 to T3, a compression process 1064 between T3 and T5, a high pressure, decreasing gradient isobaric heat transfer (e.g., rejection) process 1066 between T5 and T4, a high pressure, isothermal condensation process 1068 at T4, a relatively high pressure, decreasing gradient, isobaric liquid heat transfer or exchange (e.g., rejection) process 1070 between T4 and T3, a decreasing gradient, relatively high pressure isobaric heat transfer or exchange 1072 between T3 and T2 (e.g., to the low pressure, isobaric increasing gradient 1062), a liquid pressure lowering process 1074 (e.g., using a JT valve or a turbine) that lowers the temperature from T2 to T1, and a low pressure isothermal evaporation process (e.g., a working fluid phase change from liquid to gas) 1076 at T1, connected in a loop.

FIG. 31E shows a Brayton heat engine cycle 1080 with one or more compression and heat transfer or exchange (e.g., rejection) process pairs in series, and one or more heat absorption and expansion pairs in series. Each compression and heat rejection pair has a decreasing gradient, high pressure, isobaric heat transfer or exchange (e.g., rejection) process (e.g., 1096) in the temperature range T2 to T1 and a compression process (e.g., 1082 and/or 1094) between T1 and T2. Each heat absorption and expansion pair has an increasing gradient, high pressure, isobaric heat absorption process (e.g., 1088) in the temperature range T3 to T4, and an expansion process (e.g., 1086 and/or 1090) between T4 and T3. The cycle 1080 also includes a heat exchange 1084 in the temperature range T2 to T4 (e.g., an increasing gradient, high pressure, isobaric heat absorption), and a heat exchange 1092 in the temperature range T3 to T1 (e.g., a low pressure, decreasing gradient, isobaric rejection), connected in a loop. In one implementation, heat rejected in the decreasing gradient, low pressure heat transfer or exchange 1092 is absorbed at least in part by the increasing gradient, high pressure heat transfer 1084.

FIG. 31F shows a Brayton heat pump cycle 1100 with an increasing gradient, low pressure, isobaric heat absorption 1102 in the temperature range T1 to T2, a temperature-decreasing process (such as working fluid expansion) 1104 from T2 back to T1 as part of a heat absorption and working fluid expansion process pair (temperatures at the end of process 1104 other than T1 may be acceptable, depending on the phase change temperatures of the working fluid), a heat transfer or exchange 1106 (e.g., an increasing gradient, low pressure heat absorption) in the temperature range T1 to T3, one or more compression and heat transfer or exchange (e.g., rejection) process pairs in series between T3 and T4, a decreasing gradient, high pressure isobaric heat transfer or exchange (e.g., rejection) process 1114 in the temperature range T4 to T2, and returning to one or more heat absorption and working fluid expansion process pairs in series between temperatures T2 and T1, connected in a loop. Each compression and heat rejection process pair has a decreasing gradient, high pressure, isobaric heat transfer or exchange (e.g., rejection) process (e.g., 1110) in the temperature range T4 to T3 and a compression process (e.g., 1108 and/or 1112) between T3 and T4. Each heat absorption and expansion process pair has an increasing gradient, high pressure, isobaric heat absorption (e.g., 1102) in the temperature range T1 to T2, and an expansion process (e.g., 1116 and/or 1104) between T2 and T1. In one implementation, heat rejected from or by the decreasing gradient, high pressure heat transfer or exchange 1114 is absorbed at least in part by the increasing gradient, high pressure heat transfer or exchange 1106.

FIG. 31G shows a transcritical trilateral heat engine cycle 1120, including a pumping process 1122 that increases the temperature of the working fluid from T1 to T2, an increasing gradient, high pressure, isobaric heat transfer or exchange (e.g., absorption) 1124 in the temperature range T2 to T3, an increasing gradient, isobaric heat absorption 1126 in the temperature range T3 to T4, a gas expansion process 1128 that lowers the temperature of the working fluid from T4 to T3, a decreasing gradient, low pressure, isobaric heat transfer or exchange (e.g., rejection) 1130 in the temperature range T3 to T1, and a low pressure isothermal condensation process at T1, connected in a loop. In one implementation, heat rejected from or by the decreasing gradient, low pressure heat transfer or exchange 1130 is absorbed at least in part by the increasing gradient, high pressure heat transfer or exchange 1124.

FIG. 31H shows a transcritical heat pump cycle 1140 including an increasing gradient, high pressure, isobaric heat transfer or exchange (e.g., heat absorption) 1142, a compression process 1144 between T3 and T4, a first decreasing gradient, high pressure, isobaric heat transfer or exchange (e.g., rejection) process 1146 between T4 and T3, a second decreasing gradient, high pressure, isobaric heat transfer or exchange 1148 in the temperature range T3 to T2, a liquid pressure lowering process 1150 between T2 and T1, and a low pressure isothermal evaporation process (e.g., a working fluid phase change from liquid to gas) 1152 at T1, connected in a loop. One implementation of the transcritical heat pump cycle 1140 includes a heat transfer or exchange from the high pressure, isobaric decreasing gradient 1148 to the low pressure, isobaric decreasing gradient 1142 in the temperature range T2 to T3.

FIG. 31I shows a trilateral heat engine cycle 1160 that is equivalent to the transcritical heat engine cycle 1140 of FIG. 31H, in which T3 in FIG. 31H=T1 in FIG. 31I. FIG. 31J shows a trilateral heat pump cycle 1180, which is the reverse cycle of cycle 1160 in FIG. 31J.

FIG. 31K shows a stepwise trilateral heat engine cycle 1200 with a pumping process 1202 between T1 and T2, a first increasing gradient, high pressure, isobaric heat absorption 1204 between T2 and T4, an (isentropic) expansion process 1206 working between T4 and T3, a second increasing gradient, high pressure, isobaric heat absorption 1208 between T3 and T5, an (isentropic) compression process 1210 between T5 and T6, a third increasing gradient, high pressure, isobaric heat absorption 1212 between T6 and T7, a second (isentropic) expansion process 1214 between T7 and T1, and a low pressure isothermal condensation process 1216 at T1, connected in a loop. The cycle 1200 is not limited to a trilateral cycle, and is applicable to all gradient heat exchanges.

FIG. 31L shows a stepwise trilateral heat pump cycle 1220 with an adiabatic compression process 1222 between T1 and T7, a first decreasing gradient, high pressure, isobaric heat transfer or exchange (e.g., rejection) process 1224 between T7 and T6, an (isentropic) expansion process 1226 between T6 and T5, a second decreasing gradient, high pressure, isobaric heat transfer or exchange (e.g., rejection) process 1228 between T5 and T3, an (isentropic) compression process 1230 between T3 and T4, a third decreasing gradient, high pressure, isobaric heat transfer or exchange (e.g., rejection) process 1232 between T4 and T2, a pressure lowering process 1234 between T2 and T1, and a low pressure isothermal evaporation process 1236 at T1, connected in a loop. The cycle 1220 is not limited to a trilateral cycle, and is applicable to all gradient heat exchanges.

In FIGS. 31K-L, depending on the values of the temperatures T3 through T7 and the thermal properties of the working fluid (e.g., the coefficient of thermal conductivity, heat capacity, etc.) at such temperatures, it is possible to increase or maximize the heat absorption or heat rejection steps in temperature ranges in which the working fluid is most efficient. Such cycles may be novel, and systems and methods that implement the trilateral heat engine cycle 1200 and the trilateral vapor compression cycle 1220 may be considered within the scope of the invention.

FIG. 31M shows a liquid gas vaporization cycle 1240 with an isolated storage tank 1250 for the liquid gas (e.g., liquid air) kept at the temperature T1, a pumping or vaporization process 1242 between T1 and T2, an increasing gradient isobaric heat absorption 1244 in the temperature range between T2 and T3 (or between T2 and T4), and one or more absorption and expansion process pairs in series, each pair having an increasing gradient, high pressure, isobaric heat absorption (e.g., 1248 and/or 1254) in the temperature range T3 to T4, an expansion process (e.g., 1246, 1252 and/or 1256) between T4 and T3, and a gas outlet at 1258 at temperature T3, connected in series.

FIG. 31N shows a gas liquefaction cycle 1260 with an gas intake 1262, one or more compression and heat transfer or exchange (e.g., rejection) process pairs in series, where each compression and heat rejection process pair has a compression process 1264, 1268 or 1272 between T3 and T4 and a decreasing gradient, high pressure, isobaric heat transfer or exchange (e.g., rejection) process 1266 and/or 1270 in the temperature range T4 to T3, a decreasing gradient, isobaric heat transfer or exchange (e.g., rejection) process 1274 in the temperature range T4 to T2, a pressure lowering process 1276 between T2 and T1, and a storage process in which the liquefied gas is stored in an isolated tank 1280 kept at the temperature T1, connected in series.

The invention, in its various aspects, will be explained in greater detail below with regard to exemplary embodiments.

An Exemplary Thermal Engine Based on Combined Brayton-Trilateral Cycles

In one aspect, the present invention relates to a combined Brayton-trilateral engine, comprising a heat engine and a heat pump, wherein the heat engine is one of a Brayton heat engine and a trilateral heat engine. When the heat engine is the Brayton heat engine, the heat pump is a trilateral heat pump, and when the heat engine is the trilateral heat engine, the heat pump is a Brayton heat pump. The Brayton heat engine and the Brayton heat pump each comprise a heat exchange mechanism with a temperature gradient, but in opposite directions to each other. For example, when the heat pump has a heat exchange mechanism with an increasing temperature gradient, the heat engine has a heat exchange mechanism with a decreasing temperature gradient. The trilateral heat pump and the trilateral heat engine also comprise an isothermal heat exchange mechanism. The direction of the combined Brayton-trilateral engine (or system) is reversible.

Figure 3:
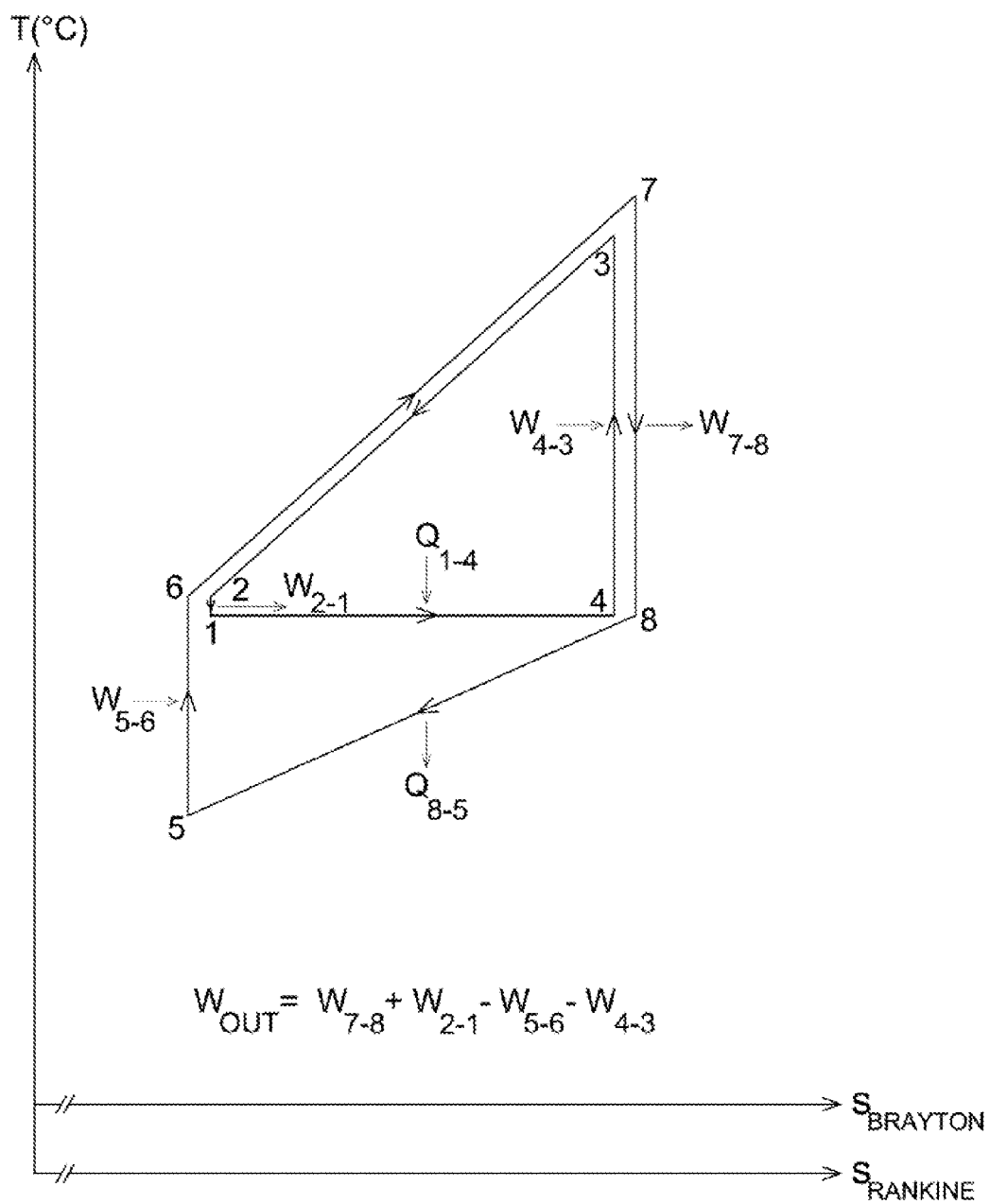
FIG. 3 is a TS diagram for combined trilateral and Brayton cycles according to one or more embodiments of the present invention.

The differences between the prior combined Brayton-trilateral cycles and the combined Brayton-trilateral cycles in the present invention can be demonstrated using the TS diagram in FIG. 3. FIG. 3 shows a first exemplary embodiment, in which the combined cycles (e.g., a system including a trilateral cycle and a Brayton cycle) work together in different directions. The combined cycles and/or system have application layout examples (see, e.g., the system examples shown in FIGS. 4 and 5) that may be useful for gaining a better understanding of these embodiments of the invention. These examples are also explained in detail, including suitable components and operations, and may also be used as references in the present disclosure.

FIG. 3 shows a TS diagram of a combined Brayton heat engine cycle and trilateral gradient heat pump cycle with an isothermal heat source and a gradient heat sink. The diagram shows the combined cycle when the trilateral cycle works as a heat pump (see FIG. 1) and the Brayton cycle works as a heat engine (see FIG. 2). In the trilateral cycle shown in FIG. 3, line 4-3 represents an adiabatic compression process, line 3-2 represents an isobaric, decreasing temperature gradient internal heat transfer or exchange process, line 2-1 represents a pressure recovery process, and line 1-4 represents an isothermal and isobaric heat transfer process from an external heat source. In the Brayton cycle, line 5-6 represents an adiabatic compression process, line 6-7 represents an isobaric, increasing temperature gradient internal heat transfer or exchange process, line 7-8 represents an adiabatic expansion process, and line 8-5 represents an isobaric, decreasing temperature gradient heat transfer process to an external heat sink.

The combined Brayton and trilateral cycles have an internal heat exchange between 3-2 and 6-7. The heat added to the system from a heat source is represented by $Q_{in}=Q_{1-4}$. The heat delivered from the system to a heat sink is represented by $Q_{out}=Q_{8-5}$. The mechanical power added to the system is represented by $W_1=W_{4-3}$ and $W_{5-6}$ (e.g., $W_{4-3}+W_{5-6}$). The mechanical power delivered from the system is represented by $W_2=W_{7-8}$ and $W_{2-1}$ (e.g., $W_{7-8}+W_{2-1}$). As seen from the outside, with the internal heat transfer(s) or exchange(s) omitted, the system of combined cycles behaves like a cycle with an isothermal heat source and a decreasing temperature gradient heat sink.

FIG. 3 shows a TS diagram of a combined trilateral heat engine and Brayton gradient heat pump cycle, with gradient heat source and isothermal heat sink. The cycles in FIG. 3 are reversible, and the FIG. 3 TS diagram can also be illustrated with arrows in the opposite directions, in which case the TS diagram shows a combined Brayton heat pump cycle and trilateral gradient engine cycle with isothermal heat sink and gradient heat source. In the reverse trilateral cycle, the line 1-2 represents a pump process, the line 2-3 represents an isobaric, increasing temperature gradient heat transfer or exchange process, the line 3-4 represents an adiabatic expansion process and the line 4-1 represents an isothermal and isobaric heat transfer or exchange process. In the reverse Brayton cycle, the line 8-7 represents an adiabatic compression process, the line 7-6 represents an isobaric, decreasing temperature gradient heat transfer or exchange (e.g., heat sink) process, the line 6-5 represents an adiabatic expansion process, and the line 5-8 represents an isobaric, increasing temperature gradient heat transfer or exchange process.

The combined reverse cycles have an internal heat transfer or exchange between 2-3 and 7-6. The heat added to the system from a heat source is represented by $Q_{in}=Q_{5-8}$. The heat delivered from the system to a heat sink is represented by $Q_{out}=Q_{4-1}$. The mechanical power added to the system is represented by $W_1=W_{2-1}$ and $W_{7-8}$ (e.g., $W_{7-8}+W_{2-1}$). The mechanical power delivered from the system is represented by $W_2=W_{4-3}$ and $W_5$-6 (e.g., $W_{4-3}$ $W_{5-6}$). Seen from the outside, with internal heat transfers or exchanges omitted, the system including combined reverse Brayton and trilateral cycles behave like a thermodynamic cycle having an increasing temperature gradient heat source and an isothermal heat sink.

Figure 4:
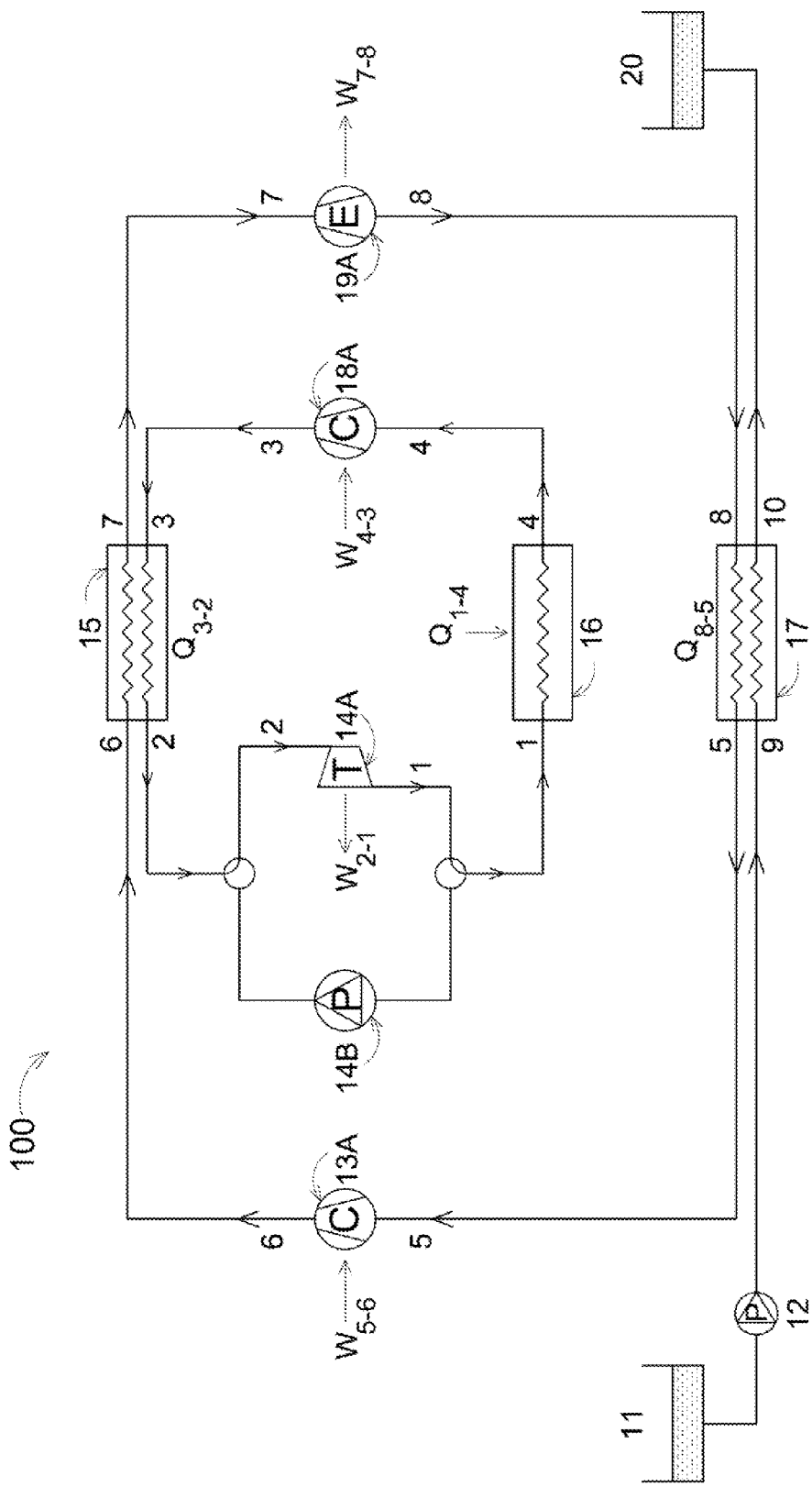
FIG. 4 is a layout of an exemplary machine in accordance with the cycles shown in FIG. 3.

FIG. 4 shows an exemplary layout of a machine 100 in accordance with the principles of FIG. 3, including a combined Brayton heat engine and a trilateral heat pump with an isothermal heat source and a gradient heat sink. Pump 12 pumps liquid from the cold storage tank 11, through a heat exchanger 17, and to the hot storage tank 20. Tanks 11 and 20 are conventional liquid storage tanks, which may have an independent capacity or volume of from several liters (e.g., 1-10 liters) to millions of cubic meters (e.g., $10^6$-$10^{10}$ cubic meters). Each of the tanks 11 and 20 may be thermally insulated to minimize loss of thermal energy to the outside environment. The heat exchanger 17 may comprise a conventional radiator or other structure having a relatively high surface area-to-volume ratio and a relatively low coefficient of thermal conductivity (relative to the pipes or other conduits through which the liquid passes between tanks 11 and 20), through which one of the liquid and the working gas in the Brayton heat engine passes, and around which the other of the liquid and the working gas in the Brayton heat engine passes (e.g., in a sealed conduit or passage, or other form of closed system). When passing through the heat exchanger 17, the liquid in the trilateral heat pump is heated and the working gas in the Brayton heat engine is cooled. Thus, in the heat exchanger 17, each of the trilateral heat pump and the Brayton heat engine have a heat exchange mechanism adapted or configured to exchange heat with the other one of the trilateral heat pump and the Brayton heat engine. This concept generally applies to all heat exchangers disclosed herein; i.e., each heat exchanger comprises two or more heat exchange mechanisms in one or more thermodynamic devices and, optionally, in a heat storage device or subsystem.

The working gas is then in sequence compressed by a compressor 13A, heated in a heat exchanger 15, expanded by an expander 19A, and then finally returned back to the heat exchanger 17 to repeat the cycle. The compressor 13A and the expander 19A are conventional, and designed for the particular system in which they are used. The heat exchanger 17 can operate according to the same general principle(s) as the heat exchanger 15, but may have a different design depending on the system requirements and the working gas/fluid(s) in the Brayton heat engine and trilateral heat pump. The working gas in the Brayton heat engine can be substantially any gas or gas mixture capable of use in thermal engines, such as steam, ammonia, nitrogen, air, argon, helium, hydrogen, $CO_2$, etc., a (hydro)fluorocarbon or other Freon-type gas such as $CH_2F_2$, $C_2H_4F_2$, $C_2HF_5$, $C_3H_3F_5$ (e.g., 1,1,1,3,3-pentafluoropropane) or $C_3F_8$, a hydrocarbon such as methane, propane, propylene, butane, pentane, etc.

The fluid in the trilateral heat pump absorbs heat (e.g., from an external heat source) isothermally in the heat exchanger 16. The heat exchanger 16 may comprise a conventional isothermal heat absorber, such as a boiler or evaporator, that enables the working fluid to change phase isothermally (e.g., at its boiling point). The external heat source may comprise a combustion chamber (e.g., that burns biomass, natural gas or other combustible fuel), a conventional solar energy collector, etc. In one embodiment, the heat source supplying heat to the heat exchanger 16 may be at least partially internal (e.g., the heat exchanger 16 may receive hot fluid from a separately pumped line from the hot tank 20, and convey the fluid to the cold tank 11 or another heat exchanger [not shown]). The working fluid in the trilateral heat pump can be substantially any material or mixture that remains substantially in the liquid phase under the operational conditions of the system 100 in the condensation/work output phase(s) of the cycle, such as water, brine, a mixture of water and ammonia and/or $CO_2$, a hydrofluorocarbon or hydrocarbon such as R-141b, R-245fa, cyclohexane, octane, undecane, toluene, etc., a hydrofluorocarbon ether refrigerant such as HFE-7000 ($C_3F_7OCH_3$), HFE-7100 (methoxynonafluorobutane) or HFE-7200 (ethoxynonafluorobutane), a liquid metal (e.g., mercury) or metal mixture, a liquid salt or salt mixture, etc., but that can change phase in the isothermal heat exchanger 16. The fluid in the trilateral heat pump (now in the gas phase) is then in sequence compressed in a compressor 18A, passed through the heat exchanger 15 (where it releases or transfers heat to the Brayton heat engine, and may be condensed back to the liquid phase), passed through a turbine 14A (where it drives the turbine and releases internal pressure energy), and finally returned to the heat exchanger 16 to repeat the cycle. As discussed above, the heat exchanger 16 is conventional, and designed for the particular system in which it is used. The compressor 18A may be a conventional compressor capable of use with a working fluid in a conventional thermal/heat pump and/or engine, and the turbine 14A may be a conventional, liquid- or fluid-driven turbine designed for the particular system in which it is used.

In FIG. 4, the charging mode, the heat added to the system 100 from a heat source, is represented by $Q_{in}=Q_{1-4}$, and the heat delivered from the system 100 to a heat sink (i.e., the liquid being pumped from cold tank 11 to hot tank 20 through the heat exchanger 17) is represented by $Q_{out}=Q_{8-5}$. The mechanical power added to the system 100 is represented by $W_1$=the work done by the compressors 18A and 13A, and the work performed by the pump 20. The mechanical power delivered from the system 100 is represented by $W_2$=the work done by the expander 19A, and the work performed by the turbine 14A. In various embodiments, the turbine 14A can generate electricity, turn one or more wheels or propellers, generate air flow, or perform any other task or operation of a conventional turbine.

Figure 5:
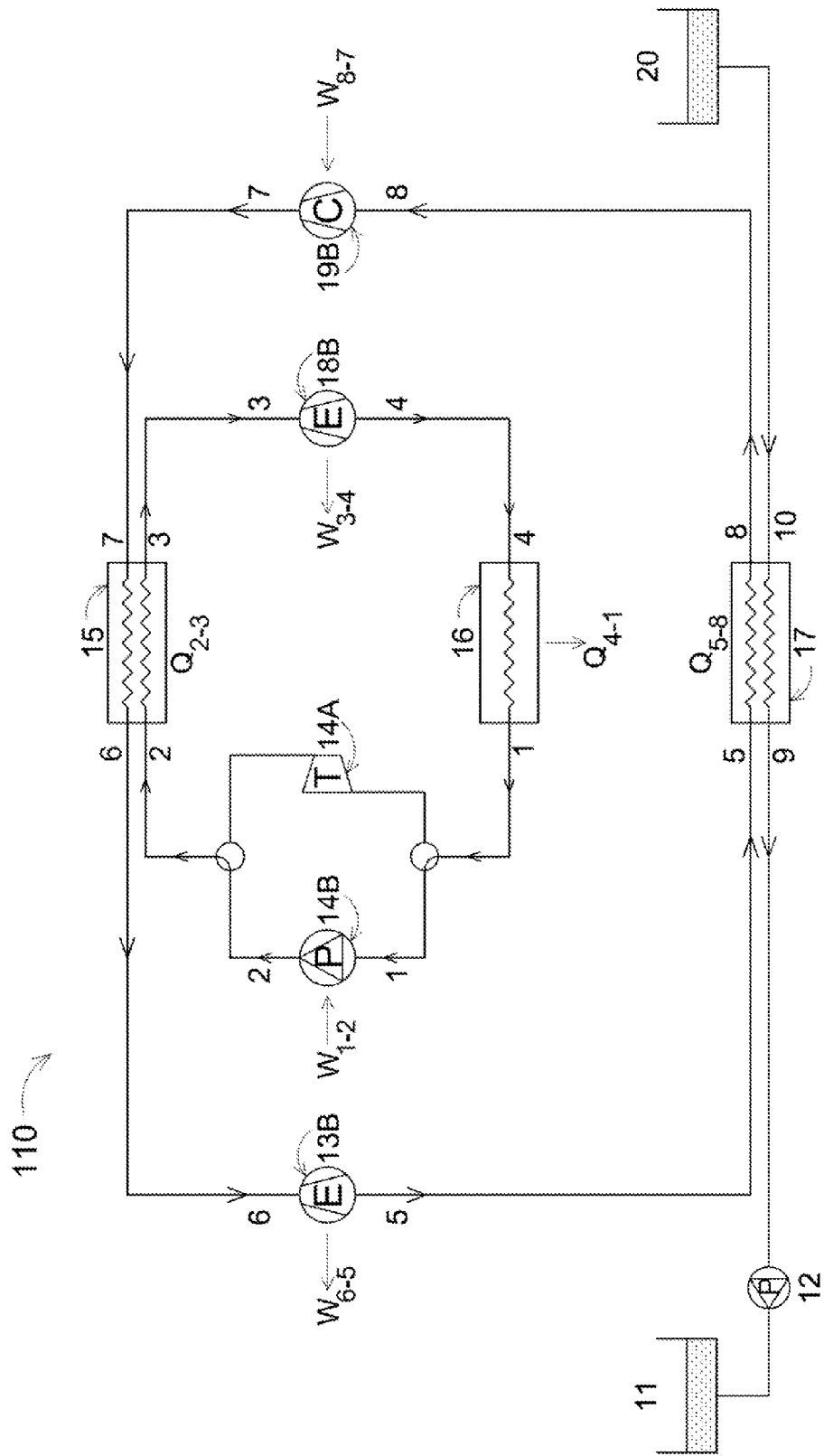
FIG. 5 a layout of another exemplary machine in accordance with the cycles shown in FIG. 3.

FIG. 5 shows an exemplary layout of a machine 110 in accordance with the principles of FIG. 3, including a combined Brayton heat pump and trilateral heat engine, with an isothermal heat sink and a gradient heat source. The trilateral and Brayton cycles in the machine 110' FIG. 5 work in the opposite directions of the cycles in FIG. 4.

In the system 110, a pump 12 pumps the liquid from the heat storage tank 20, through the heat exchanger 17, to the cold storage tank 11. The pump 12 may be the same as that shown in FIG. 4 when the machine is reversible and the pump is bidirectional. Otherwise, a separate pump and machine 110 may be employed for the reverse cycles. When passing through the heat exchanger 17, the liquid on its way to the cold storage tank 11 is cooled, and the working gas in the Brayton cycle is heated (at $Q_{5-8}$). The working gas in the Brayton cycle is then, in sequence, compressed by the compressor 19B, cooled in the heat exchanger 15 (releasing the heat to the working fluid in the trilateral cycle at $Q_{2-3}$), expanded in the expander 13B, and finally returned back to the heat exchanger 17 to repeat the cycle.

The working fluid in the reverse trilateral cycle releases heat through the heat exchanger 16 to a heat sink (e.g., a cooler external environment, such as a subterranean or underground location, sea water or ocean water below the surface, etc.). The fluid is then, in sequence, pumped by the pump 14B, heated in the heat exchanger 15, expanded by the expander 18B, and finally returned back to the heat exchanger 16 to repeat the cycle.

In FIG. 5, the discharging mode, the heat added to the system 110 from the heat source (i.e., relatively high-temperature fluid pumped from hot tank 20 to cold tank 11) is represented by $Q_{in}=Q_{5-8}$ and the heat delivered from the system 110 to the heat sink (e.g., thermally coupled to heat exchanger 16) is represented by $Q_{out}=Q_{4-1}$. The mechanical power added to the system is $W_1$=the work done by the compressor 19B and the pumps 14B and 12. The mechanical power delivered from the system 110 is $W_2$=the work performed by expanders 18B and 13B.

To obtain reversible operations (i.e., both energy discharging and energy charging in a single machine) using the systems 100 and 110 in FIGS. 4-5, the following modifications may be made. For example, the compressor 13A in FIG. 4 and the expander 13B in FIG. 5 may be connected in parallel, and suitable valves (e.g., 3-way valves) may be placed in the working gas conduits upstream and downstream of the compressor 13A and the expander 13B. Also, the compressor 18A in FIG. 4 and the expander 18B in FIG. 5 may be connected in parallel, and suitable valves (e.g., 3-way valves) may be placed in the working fluid conduits upstream and downstream of the compressor 18A and the expander 18B. The expander 19A in FIG. 4 and the compressor 19B in FIG. 5 may be connected in parallel, and suitable valves (e.g., 3-way valves) may be placed in the working gas conduits upstream and downstream of the expander 19A and the compressor 19B. Finally, the turbine 14A in FIG. 4 and the pump 14B in FIG. 5 may be connected in parallel, and suitable valves (e.g., 3-way valves) may be placed in the working fluid conduits upstream and downstream of the turbine 14A and the pump 14B. The pump 12 changes the pumping direction or flow direction of the heat storage liquid. Alternatively, screw compressors and scroll compressors, which are examples of bidirectional devices that can function as a compressor in one direction and as an expander in the opposite direction, can be substituted for a compressor or expander in either FIG. 4 or FIG. 5 to obtain a system with bidirectional operation. Also, bidirectional pistons can be used as a gas expander in one direction and as a gas compressor in the opposite direction. As mentioned above, other types of compressors and expanders without bidirectional capabilities can be mounted in parallel with valves in order to enable reversed cycle operation. It is within the abilities of one skilled in the art to design and use a system configured to carry out Brayton and/or trilateral thermodynamic cycles in either direction from the disclosure provided herein.

Another Exemplary System Based on Combined Brayton-Trilateral Cycles

Figure 6:
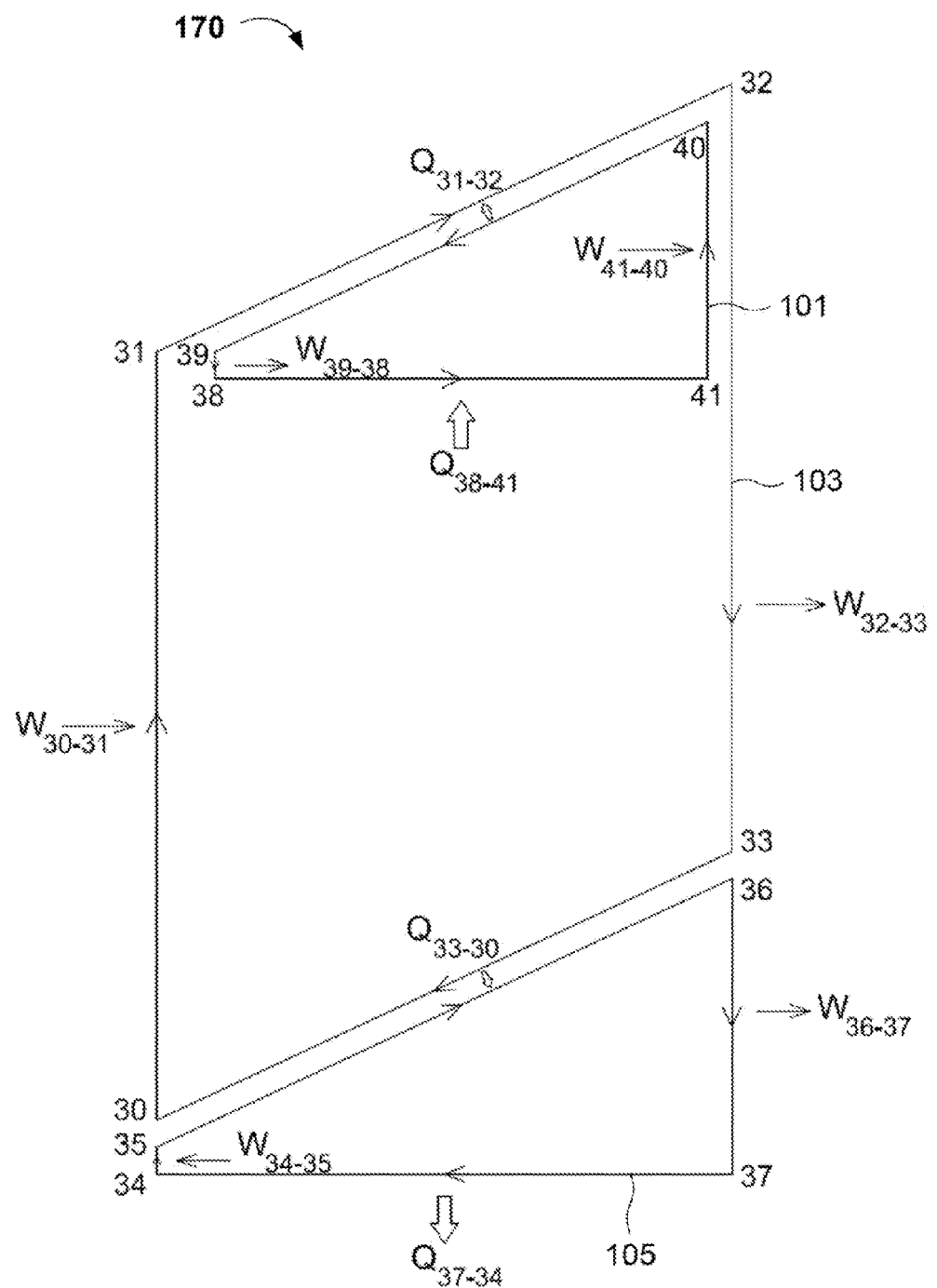
FIG. 6 is a TS diagram of a combined trilateral heat pump cycle, a Brayton heat engine cycle, and a trilateral heat engine cycle in accordance with one or more embodiments of the present invention.

In another aspect, the present invention concerns a system that includes a heat pump and two heat engines, with two (or more) internal heat exchanges over temperature gradients in opposite directions. For example, one exemplary system represents a combination of the system of FIG. 3, combined with a trilateral heat pump cycle that interfaces with the Brayton heat engine cycle of FIG. 3. Referring now to FIG. 6, a TS diagram 170 of a combined trilateral heat pump cycle, a Brayton heat engine cycle and a trilateral heat engine cycle is shown. The system of FIG. 6 includes an external isothermal heat source and isothermal heat sink.

The TS diagram shows the combined cycle when the first trilateral cycle 101 works as a heat pump, the Brayton cycle 103 works as a heat engine, and the second trilateral cycle 105 works as a heat engine. The operations of the trilateral heat pump cycle 101 and the Brayton heat engine cycle 103 are the same as in the description of FIG. 3. In addition, a second trilateral cycle 105 working as a heat engine is included.

Figure 2:
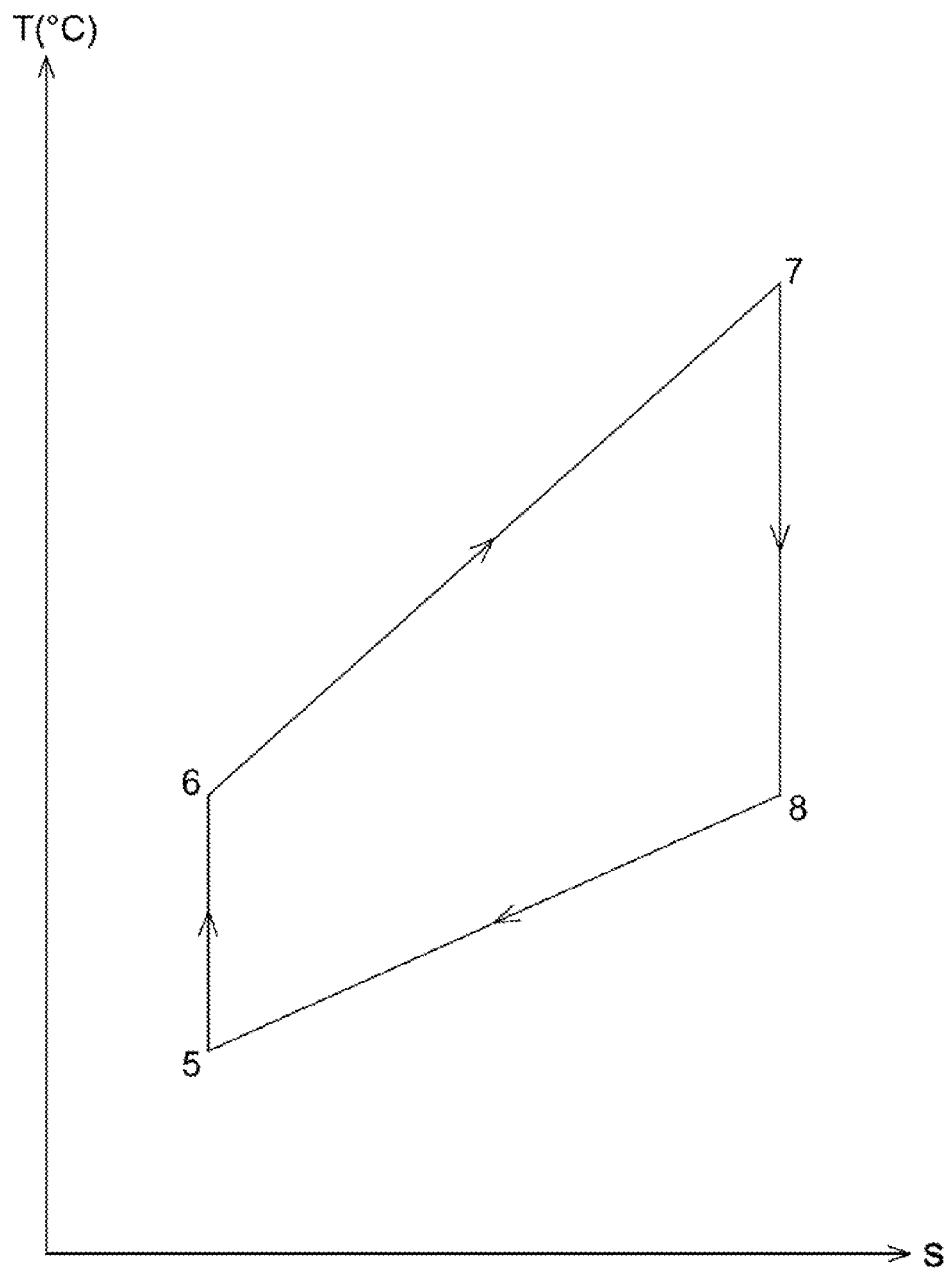
FIG. 2 is a TS diagram for a conventional Brayton cycle.

The basic processes included in and/or operations of the Brayton and trilateral cycles are as described with regard to FIGS. 1-2. With regard to the system 170 of FIG. 6, the trilateral heat pump 101 is defined by the cycle 38-41-40-39-38. The Brayton heat engine 103 is defined by the cycle 30-31-32-33-30. The trilateral heat engine 105 is defined by the cycle 34-35-36-37-34. An internal heat transfer or exchange occurs from 40-39 to 31-32 between the trilateral heat pump cycle 101 and the Brayton heat engine cycle 103, and is the heat source to the Brayton cycle 103. Another internal heat transfer or exchange occurs from 33-30 to 35-36 between the Brayton heat engine cycle 103 and the trilateral heat engine cycle 105, and is the heat source to the trilateral cycle 105.

The heat added to the system 170 from a heat source (e.g., an external heat source) is represented by $Q_{in}=Q_{38-41}$. In one embodiment, the isothermal heat transfer to the trilateral heat pump 101 represents a phase change of the working gas/fluid in the trilateral heat pump 101. Thus, the heat source may be a device that changes the working fluid (e.g., water, liquid ammonia, a liquid-phase hydrocarbon, etc.) to a gas, a solid-phase working material to a liquid (e.g., a metal, metal mixture or alloy, a salt or salt mixture, paraffin, etc.), and/or possibly a solid-phase working material to a gas (e.g., $CO_2$). The heat delivered from the system 170 to a heat sink (not shown) is $Q_{out}=Q_{37-34}$. The mechanical power added to the system 170 is $W_1=W_{41-40}+W_{30-31}+W_{34-35}$. The mechanical power delivered from the system 170 is $W_2=W_{39-38}+W_{32-33}+W_{36-37}$. Seen from the outside, with internal heat transfers or exchanges omitted, the system of combined cycles 170 behaves like a cycle with an isothermal heat source and an isothermal heat sink. In effect, such a system approaches an ideal Carnot cycle.

Figure 7:
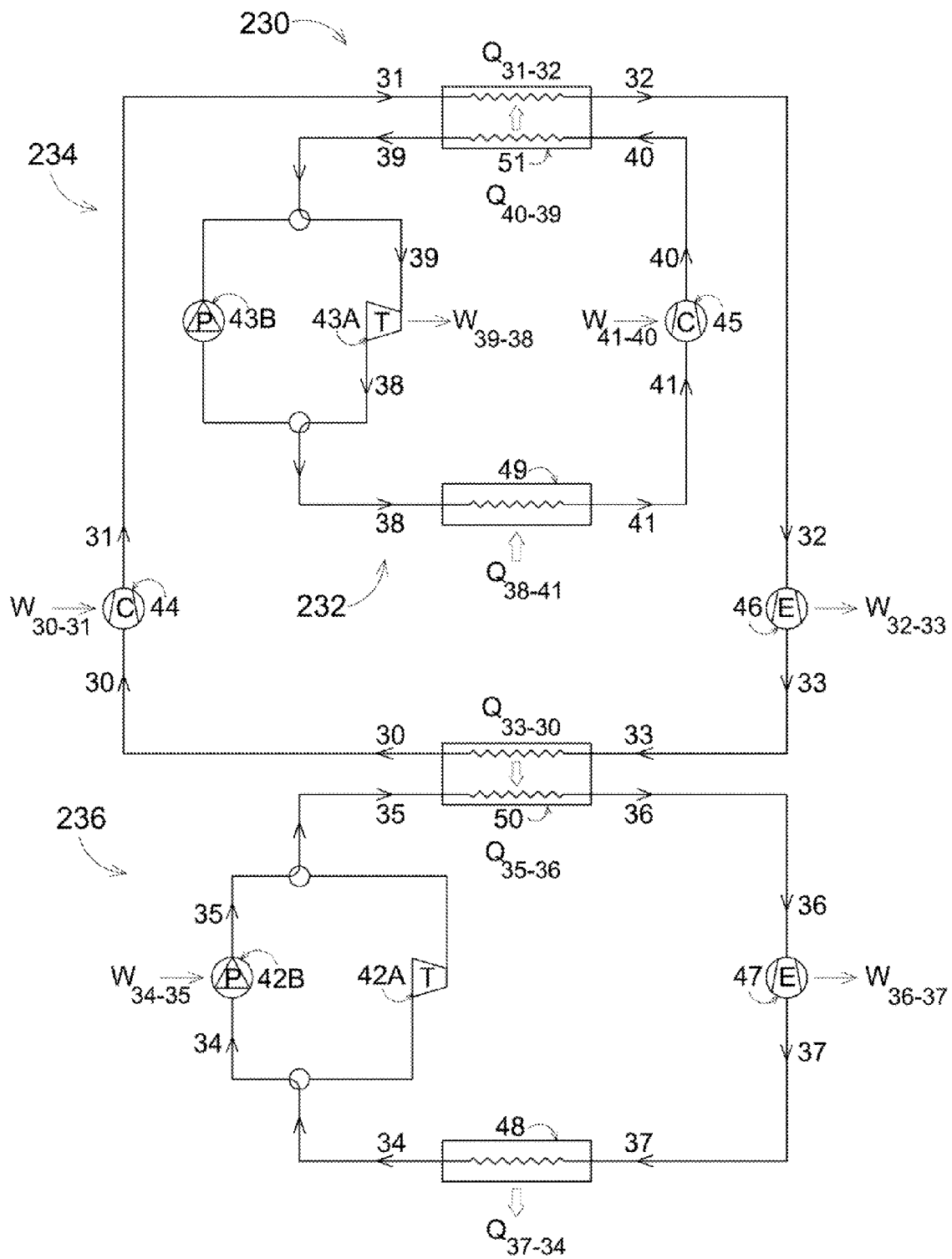
FIG. 7 is a layout of an exemplary machine with combined cycles in accordance with FIG. 6.

FIG. 7 shows a layout of a machine 230 with combined cycles according to the principles of FIG. 6, including a trilateral heat pump 232, a Brayton heat engine 234, and a trilateral heat engine 236. The basic components and operations of the trilateral heat pump 232 and the Brayton heat engine 234 working together is the same or substantially the same as the trilateral and Brayton cycles of FIGS. 4 and 5. In addition to the components of FIG. 4, a trilateral heat engine 236 is also included, with a heat exchanger 50 that functions as the heat sink for the Brayton cycle 234 and the heat source of the trilateral heat engine 236.

In addition to the operations, functions, and characteristics of the components in FIG. 4, the following description applies to the additional trilateral heat engine 236 in FIG. 7. The working fluid in the trilateral heat engine cycle releases its heat (e.g., to an external heat sink; not shown) through the heat exchanger 48. The fluid is then, in sequence, pumped by the pump 42B, heated (by the Brayton cycle/engine 234) in the heat exchanger 50, expanded in the expander 47, and finally returned back to the heat exchanger 48 to repeat the cycle.

Heat from an external heat source (not shown, but generally as described herein) is added by the heat exchanger 49 in the trilateral heat pump 232, and heat is delivered from the system 250 to a heat sink (not shown, but which may, in various embodiments, comprise an energy storage device or apparatus) through the heat exchanger 48. The heat added to the system 250 from the heat source is represented by $Q_{in}=Q_{38-41}$. The heat delivered from the system 250 to the heat sink is $Q_{out}=Q_{37-34}$. The mechanical power absorbed by and/or added to the system 250 is $W_2$ and represents the work performed by the compressors 44 and 45 (in the trilateral heat pump 232 and Brayton heat engine 234, respectively) and the pump 42B in the trilateral heat engine 236. The mechanical power produced by and/or transferred within the system 250 is represented by $W_1$ and is the work performed by the expanders 46 and 47 (in the Brayton heat engine 234 and trilateral heat engine 236, respectively) and the turbine 43A in the trilateral heat pump 232. In some embodiments, the expanders 46 and 47 (as well as other expanders in other systems) may perform functions and/or work such as driving a piston or shaft, a reciprocating magnet, or other mechanical member or apparatus (e.g., a cam shaft in a cam) that transfers energy to another machine, converts the mechanical energy to another form (e.g., electricity), or generates energy in another form.

Similar to the layouts in FIGS. 4 and 5, the cycles of the system/machine 250 in FIG. 7 are reversible. To reverse the operation of the system/machine 250, the following components can be changed, switched in/out, or operated in the opposite direction. The compressor 45 can be replaced by or switched with an expander. The compressor 44 can also be replaced by or switched with an expander. Each of the expanders 46 and 47 can be replaced by a compressor. The turbine 43A can be switched over to the pump 43B, and the pump 42B can be switched over to the turbine 42A.

In addition, screw compressors and scroll compressors, for example, are bidirectional and can operate in either direction. Other types of compressors and expanders without bidirectional capabilities can be mounted in parallel with valves (as demonstrated with regard to pump-turbine pairs 42A-42B and 43A-43B) to enable reversible cycle operation.

An Exemplary System Based on Combined Trilateral-Trilateral Cycles

A further aspect of the invention relates to a system that includes a trilateral heat pump and a Rankine heat engine, with one or more internal heat exchanges over temperature gradients in opposite directions, and one or more internal isothermal heat exchanges.

Figure 8:
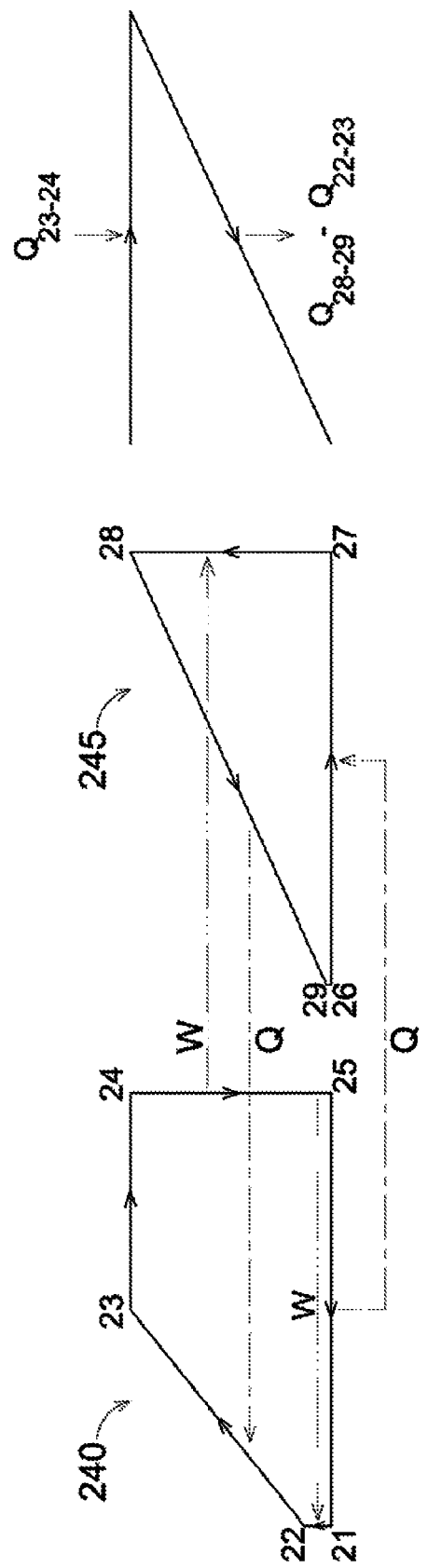
FIG. 8 is a TS diagram of a combined thermodynamic cycle in which Rankine and trilateral cycles work together, in accordance with one or more embodiments of the present invention.

FIG. 8 shows a TS diagram of a combined thermodynamic cycle in which a Rankine cycle works together with a trilateral cycle (a trilateral heat pump combined with a Rankine heat engine). The vertical axis in FIG. 8 represents temperature (i.e., going up along the vertical axis represents an increase in temperature), and the horizontal axis represents entropy (i.e., going to the right along the horizontal axis represents an increase in entropy). FIG. 8 also illustrates the results of combining Rankine and trilateral systems into one combined system with regard to heat (Q) transfers for the system, one from an external isothermal heat source, and another to an external gradient heat sink.

The basic components and processes included in the trilateral cycle are as described in FIGS. 1 and 4. These components and processes are also applicable to Rankine cycles. The Rankine heat engine cycle 240 is defined by the sequential points 21-22-23-24-25-21. The trilateral heat pump cycle 245 is defined by the sequential points 26-27-28-29-26.

Internal heat transfers or exchanges occur from isothermal condensation 25-21 in the Rankine heat engine cycle 240 to isothermal absorption 26-27 in the trilateral heat pump cycle 245, and from descending heat gradient 28-29 in the trilateral heat pump cycle 245 to ascending heat gradient 22-23 in the Rankine heat engine cycle 240. The heat added to the system from a heat source (e.g., an external heat source as described herein) is represented by $n=Q_{23-24}$. The heat delivered from the system (e.g., to an external heat sink, as described herein) is represented by $Q_{out}=(Q_{28-29}-Q_{22-23})$, as shown in the right-hand portion of FIG. 8.

The mechanical power produced by and/or transferred within the system is represented by $W_2=W_{24-25}+W_{29-26}$. The mechanical power absorbed by and/or added to the system is $W_1=W_{27-28}+W_{21-22}$. The mechanical work performed by the system on one or more external devices is thus represented by $W_{out}=W_2-W_1$.

Seen from the outside, with internal heat transfers or exchanges omitted, the system of combined cycles in FIG. 8 behaves like an inverted trilateral thermodynamic cycle with a relatively high-temperature isothermal heat source and a low-temperature gradient heat sink when used as a heat engine, and with relatively a low-temperature gradient heat source and a relatively high-temperature isothermal heat sink when used as a heat pump. In this system of FIG. 8, the heat $Q_{26-27}$ absorbed by the trilateral heat pump cycle 245 is equal to the heat $Q_{25-21}$ released by the Rankine heat engine cycle 240.

Figure 9:
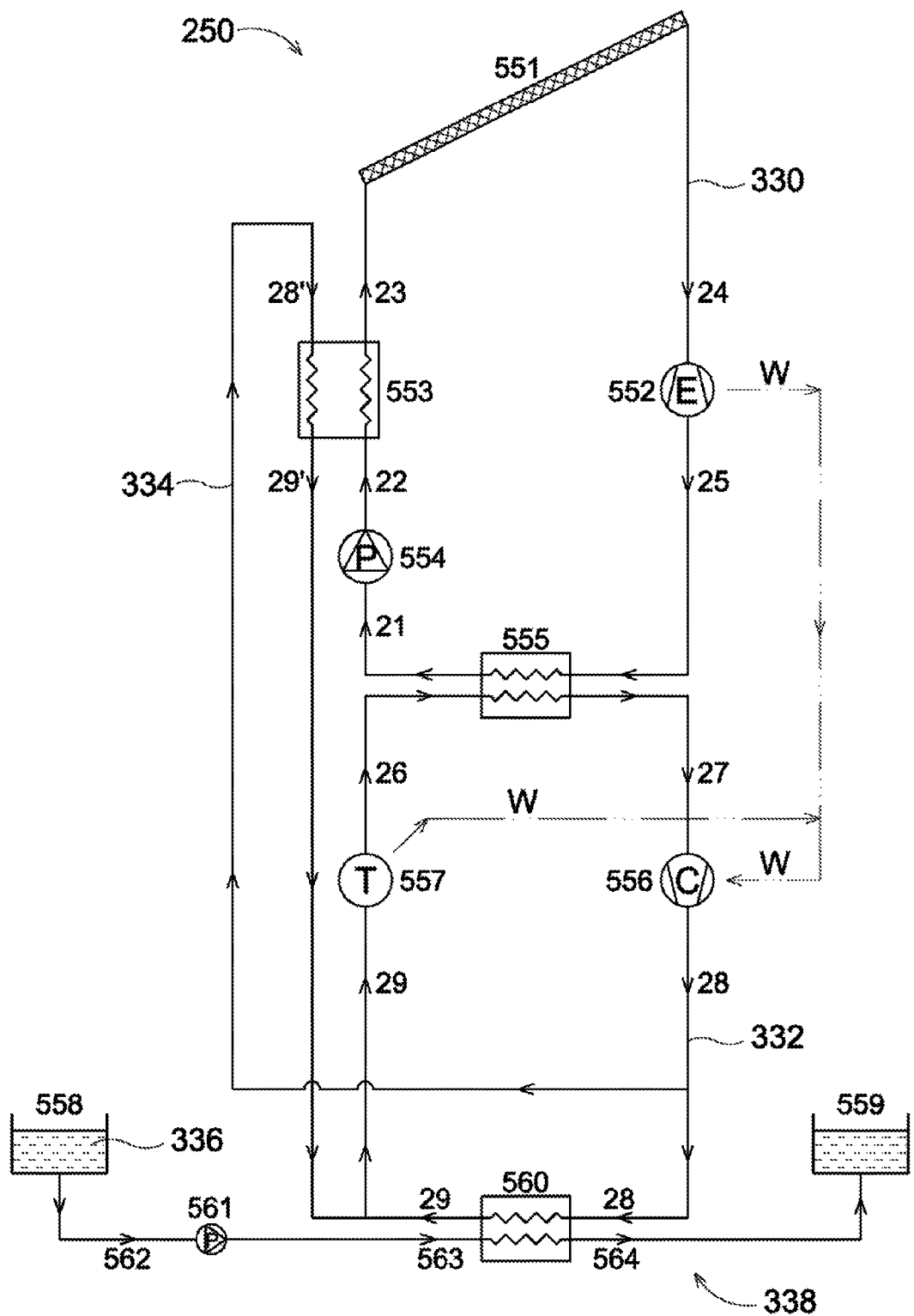
FIG. 9 is a layout of an exemplary machine with combined Rankine and trilateral cycles in accordance with FIG. 8.

FIG. 9 shows a layout 250 of a machine with combined Rankine and trilateral cycles according to FIG. 8. FIG. 9 demonstrates an example of a machine in accordance with the principles of FIG. 8, including a system with combined Rankine and trilateral cycles working together, one (the Rankine cycle) as a heat engine 330 and the other (the trilateral cycle) as a heat pump 332. In the example of FIG. 9, the heat pump 332 preheats the working fluid (e.g., a liquid) in the heat engine 330 and heats a cooling liquid 336 pumped to the liquid tank 559.

The basic components and processes of the trilateral heat pump 332 and the Rankine heat engine 330 are as described in FIGS. 4 and 5. The Rankine heat engine 330 is defined by the sequential endpoints (e.g., cycle) 21-22-23-24-25-21, and includes a pump 554, a solar collector 551, an expander 552, and heat exchangers 553 and 555. The trilateral heat pump (e.g., a vapor compression cycle) 332 is defined by the sequential endpoints (e.g., cycle) 29-26-27-28-29, and includes a compressor 556, a turbine 557, and heat exchangers 555 and 560.

A solar energy collector 551 absorbs heat from the sun and transfers the heat to the system 250, starting with the working fluid in the Rankine heat engine 330. The working fluid in the Rankine heat engine 330 releases energy in the expander 552 (e.g., some of the thermal energy in the working fluid is converted to mechanical work in the expander 552), then transfers heat through the heat exchanger 555 to the heat pump cycle 332. A pump 554 pumps the working fluid in the Rankine heat engine 330 through a second heat exchanger 553 to the solar energy collector 551.

The compressor 556 in the heat pump 332 compresses the working fluid in the heat pump 332 to increase its temperature at 27-28, then the working fluid in the heat pump 332 releases thermal energy through the heat exchangers 560 and 553 (in auxiliary loop 334). The heat exchanger 553 transfers thermal energy to the working fluid in the Rankine heat engine 330 as working fluid flows toward the solar energy collector 551, and the heat exchanger 560 transfers thermal energy to the fluid 336 (e.g., water) pumped from a cool fluid storage tank 558 (e.g., an external heat sink) to a warm fluid storage tank 559. Thereafter, the working fluid in the trilateral heat pump(s) 332/334 drives the turbine 557 (to convert some of its energy into mechanical work), and is conveyed back to the heat exchanger 555 again to renew the heat pump cycle.

The heat added to the system 250 from a heat source (e.g., solar collector 551) is represented by $Q_{in}=Q_{23-24}$. The heat delivered from the system 250 to a heat sink (e.g., warm fluid storage tank 559) is represented by $Q_{out}=(Q_{28-29}-Q_{22-23})$. The mechanical power produced by and transferred within the system 250 is represented by $W_2$, or the work performed by expander 552 and turbine 557. The mechanical power absorbed into the system 250 is represented by $W_1$, or the work performed by compressor 556 and pumps 554 and 561.

By reversing and using only the trilateral cycle as a heat engine, and replacing (or switching out) the compressor 556 with an expander, the turbine 557 with a pump, and the heat exchanger 555 with a heat exchanger that releases the heat to an external sink (e.g., the surrounding air as one example), and also changing the pumping direction of the pump 561 in the thermal energy storage sub-system 338, it is possible to get a heat engine cycle that uses the warm (or hot) liquid stored in tank 559 as a heat source. Electricity can then, for example, be produced during the nights using the thermal energy stored in the tank 559.

One application of the system 250 (or a system similar thereto) includes a heat driven heat pump (e.g., heat pump 332 in the forward direction) with internal heat transfer or exchange to an intermediate temperature heat storage component (e.g., heat storage subsystem 338). In charging mode, the heat pump 332 can be driven by a steam engine (e.g., solar energy collection/conversion subsystem 330, with a solar collector 551 as the heat source and a cold liquid [water] 598 in the thermal energy storage system 298 as the heat sink). The heat pump (e.g., 332) may also use the surrounding environment as a heat source, and the cold liquid (water) 598 in the thermal energy storage system 298 as the heat sink. In discharging mode (i.e., the reverse direction), the complementary heat engine uses the heat (hot liquid) storage tank 559 as the heat source and the surrounding environment as the heat sink. The solar energy collection/conversion subsystem 330 can be non-operational (e.g., shut down) in the discharging mode.

This system 250 has several advantages. Compared to a system with a gradient heat transfer or exchange, the system with isothermal heat transfers or exchanges only needs one heat storage tank, whereas gradient heat transfer or exchange systems generally need at least two tanks. Alternatively or additionally, one may use the relative temperature difference between the two tanks to drive mechanical and/or thermodynamic operations or processes (e.g., according to conventional methods of doing so). The efficiency of the system 250 is also higher than gradient heat transfer or exchange systems because it is not dependent on any non-linear heat capacity of the working fluid (as occurs in gradient-based heat transfer or exchange processes).

The total efficiency of a system using a heat storage subsystem for storing heat for later use is largely or substantially independent of the temperature of the heat storage medium when heat pumps and heat engines are used as described herein, as long as the volume of the heat storage medium or substance is sufficient (e.g., to store enough thermal energy for the intended use, and/or to store the heat within certain system parameters, such as maximum and minimum temperatures of the heat storage medium, its thermal conductivity, etc.) and the temperature interval (e.g., difference between minimum and maximum temperatures of the heat storage medium in the system) is suitable for the medium or substance. A larger volume of heat storage medium or substance in the system can be advantageous because the efficiency of the heat pumps tends to decline as the temperature interval increases (e.g., as the heat storage or output temperature rises, relative to the same cool storage or input temperature). For heat engines, the situation is reversed, meaning that the efficiency increases when the output temperature or temperature differential rises. The combination of an increase in efficiency of the heat engines and a decrease in efficiency of the heat pumps generally balances, so the output energy from the system is generally or substantially the same, regardless of the actual temperature(s) of the heat storage medium.

The present invention can use ordinary water to store the heat even if the collector temperature is over 100° C. (e.g., up to 200° C. or more) and the storage temperature is between 70° C. and 100° C. In one working example, with a surrounding (e.g., ambient or environmental) temperature of 30° C., one can store 1.9 kW·h of heat at 100° C. for every kW·h of heat from the sun. When the water temperature is 70° C., one can store 3 kW·h of heat for every kW·h of heat from the sun. When recovering the energy, the relation is converse (or reversed), meaning that the recovered energy is the same, independent of the storage temperature of the heat storage medium or fluid (e.g., whether it is 200° C., 100° C., or 70° C.), as long as the volume of the heat storage medium is sufficient (e.g., to store enough thermal energy for the intended use).

An Exemplary System Based on Combined Rankine-Brayton Cycles with Multiple Heat Pumps A further aspect of the invention relates to a system that includes a Rankine heat pump combined with a Brayton heat pump and Rankine heat recovering heat engine, an isothermal heat sink, and a gradient heat source. The system includes multiple internal heat exchanges over temperature gradients in opposite directions, and can be used for solar-powered air conditioning and heating applications, as well as mechanical power and/or electricity generation.

Figure 10:
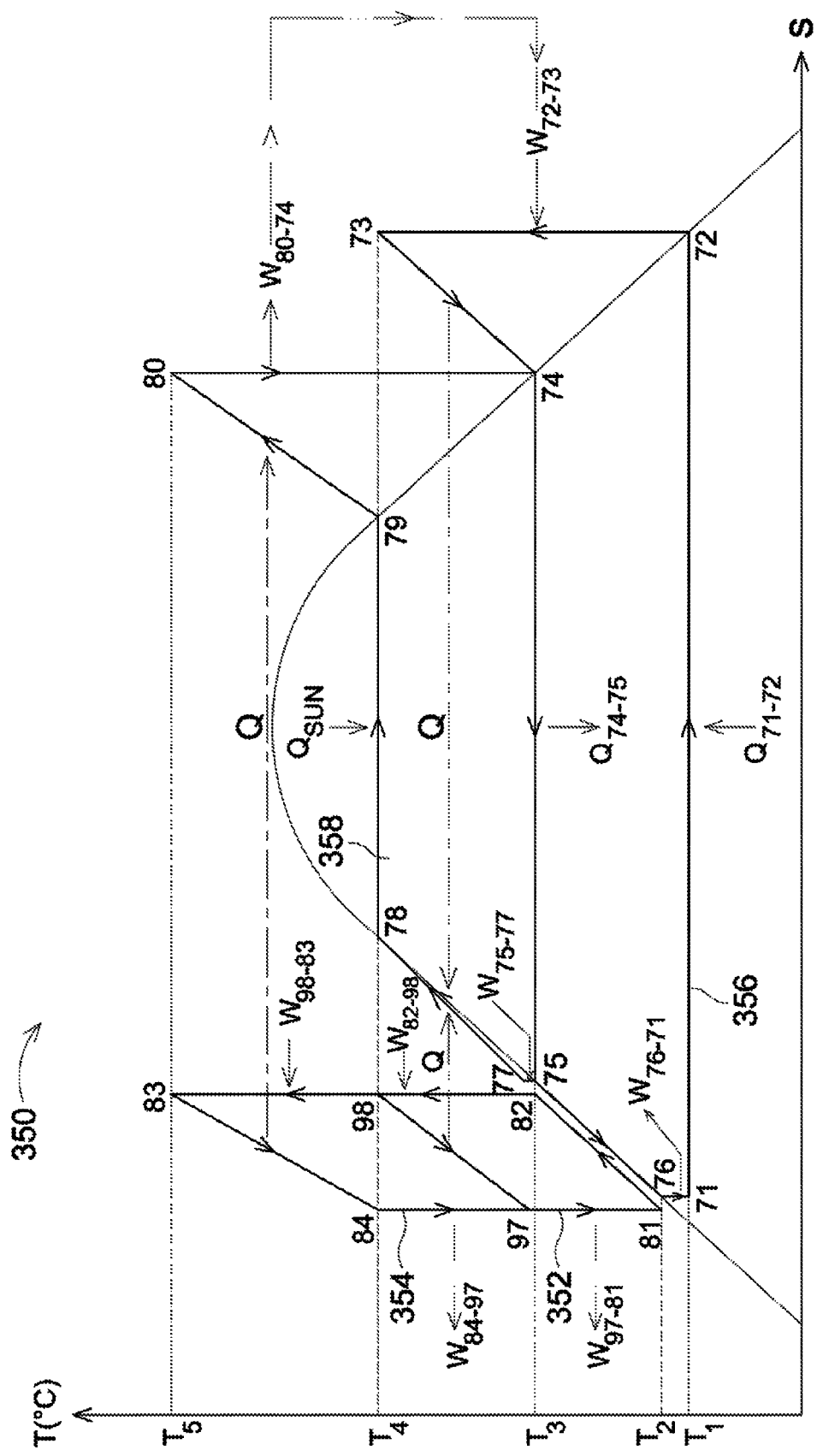
FIG. 10 is a TS diagram of a Rankine heat pump cycle combined with a Brayton heat pump cycle, an isothermal heat sink, two isothermal heat sources, and a Rankine heat recovering heat engine cycle in accordance with one or more embodiments of the present invention.

FIG. 10 shows a TS diagram of a Rankine heat pump cycle combined with a Brayton heat pump cycle and Rankine heat engine cycle. The diagram also includes an isothermal heat sink and a gradient heat source as a liquid precooler, and the Rankine heat engine is a heat recovering heat engine. The Brayton heat pump includes two thermodynamic cycles. The TS diagram of FIG. 10 shows the combined cycle when two Brayton cycles 352 and 354 and two Rankine cycles 356 and 358 work together. The Brayton cycles work as heat pumps. One Rankine cycle (352) works as a heat pump, and the other Rankine cycle (356) works as a heat engine.

The basic components and processes in the Brayton and Rankine cycles are as described with regard to FIGS. 4 and 5. The first Brayton heat pump cycle 352 is defined by the sequential points 81-82-98-97-81. The second Brayton cycle 354 is defined by the sequential points 81-82-98-83-84-97-81. The Rankine heat engine cycle 358 is defined by the sequential points 75-77-78-79-80-74-75. The Rankine heat pump cycle 356 is defined by the sequential points 71-72-73-74-75-76-71.

Internal heat transfers occur from descending heat gradient 75-76 in the Rankine heat pump cycle 356 to ascending heat gradient 81-82 in the first Brayton heat pump cycle 352, from each of the descending heat gradients 73-74 in the Rankine heat pump cycle 356 and 98-97 in the first Brayton heat pump cycle 352 to the ascending heat gradient 77-78 in the Rankine heat engine cycle 358, and from the descending heat gradient 83-84 in the second Brayton heat pump cycle 354 to the ascending heat gradient 79-80 in the Rankine heat engine cycle 358. The heat added to or transferred into the system 350 from one or more heat sources (e.g., an external heat source as described herein) is represented by $Q_{in}=Q_{71-72}+Q_{78-79}$, each of which may result in an isothermal phase change of the working fluid/gas in the Rankine cycles. The heat delivered or transferred from the system 350 to a heat sink (not shown) is represented by $Q_{out}=Q_{74-75}$. $Q_{74-75}$ is the heat released from both the Rankine heat pump cycle 356 and the Rankine heat engine cycle 358. In one embodiment, $Q_{out}$ represents the heat released from an isothermal phase change (e.g., from gas to liquid) of the working fluid/gas in both of the Rankine cycles.

The mechanical power added to the system 350 is represented by $W_1$, which is generally equal to $W_{72-73}+W_{75-77}+W_{82-98}+W_{98-83}$. The mechanical power produced by and transferred within the system 350 is represented by $W_2$, which is generally equal to $W_{80-74}+W_{76-71}+W_{84-97}+W_{97-81}$. The mechanical work performed by the system on external device(s) is $W_{out}$, which is generally equal to $W_2-W_1$. Seen from the outside, with internal heat transfers or exchanges omitted, the system 350 of combined Brayton and Rankine cycles behaves like a thermodynamic cycle with two isothermal heat sources and an isothermal heat sink. In effect, such a system approaches an ideal Carnot cycle.

Figure 11:
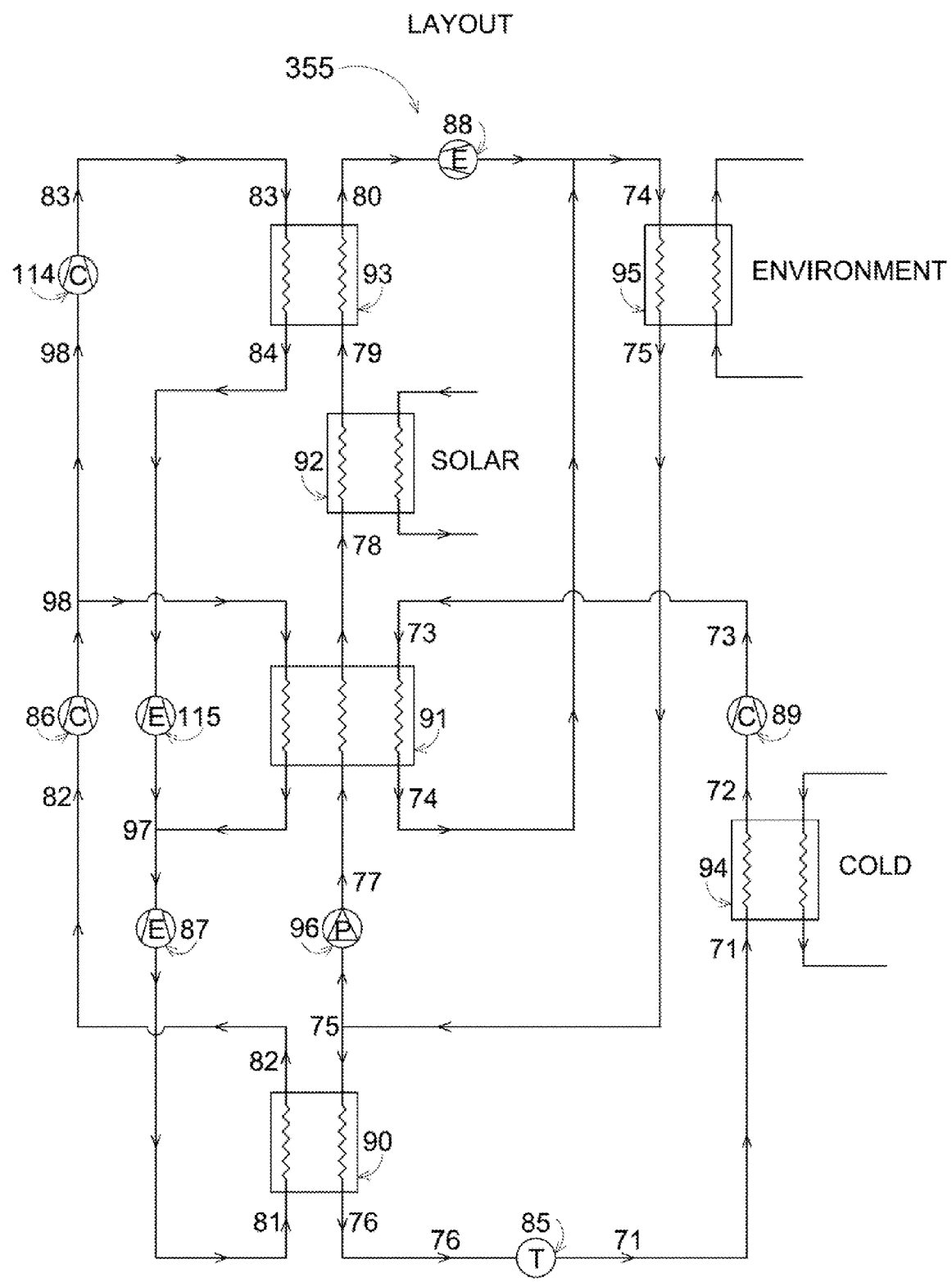
FIG. 11 is a layout of an exemplary machine with combined thermodynamic cycles according to the diagram/system of FIG. 10.

FIG. 11 shows an exemplary layout of a machine 355 with combined thermodynamic cycles according to the diagram/system 350 of FIG. 10. FIG. 11 shows an example of a machine and/or system 355 with two Brayton cycles and two Rankine cycles that work together. As described with regard to FIG. 10, the Brayton cycles work as heat pumps, one Rankine cycle works as a heat pump, and the other Rankine cycle works as a heat engine. In the illustrated machine 355, all Brayton cycles are connected together (e.g., they share the same fluid and some of the same components), but they can also be separate. The Rankine cycles in the system 355 in FIG. 11 (corresponding to trilateral cycles 356 and 358 in FIG. 10) may be connected (e.g., they may share the same fluid), but they can also be separate.

The basics of the Brayton and Rankine heat cycles are described with regard to FIGS. 1 and 2, and the basics of the Brayton heat pumps, the Rankine heat pump and the Rankine heat engine are described with regard to FIGS. 4 and 5. The first Brayton heat pump is defined by the path 81-82-98-97-81 in FIG. 11, and includes a compressor 86, expander 87, and heat exchangers 90 and 91. The second Brayton heat pump is defined by the path 81-82-98-83-84-97-81, and includes compressors 86 and 114, expanders 115 and 87, and heat exchangers 90 and 93. The compressors 86 and 114 effectively raise the temperature of the working gas in the Brayton heat pumps (e.g., from $T_3$ to less than or about $T_4$, and from less than or about $T_4$ to Ts, respectively; see FIG. 10), without significantly or appreciably changing the entropy of the working gas. The expanders 115 and 87 (FIG. 11) effectively decrease the temperature of the working gas in the Brayton heat pumps (e.g., from $T_4$ to more than or about $T_3$, and from more than or about $T_3$ to about $T_2$, respectively; see FIG. 10), without significantly or appreciably changing the entropy of the working gas. The working gas in the Brayton heat pumps is heated by heat exchanger 90 (e.g., to temperature $T_3$), and cooled by heat exchangers 91 and 93 (e.g., to temperature $T_4$ in the case of heat exchanger 93).

The Rankine heat engine is defined by the path/cycle 75-77-78-79-80-74-75, and includes a pump 96 and an expander 88, as well as heat exchangers 91, 92, 93 and 95. The Rankine heat pump (e.g., vapor compression) is defined by the path/cycle 71-72-73-74-75-76-71, and includes a compressor 89 and a turbine (which also functions as an expander) 85, as well as heat exchangers 90, 91, 94 and 95. The compressor 89 increases the temperature of the working fluid in the Rankine heat pump, without significantly or appreciably changing the entropy of the working fluid. The expander 88 in the Rankine heat engine and the turbine 85 in the Rankine heat pump decrease the temperature of the working fluid in the Rankine heat pump, without significantly or appreciably changing the entropy of the working fluid, while also obtaining work from the expansion of the working fluid. In some embodiments, this amount of work can be quite significant. The working fluid in the Rankine cycles is heated by heat exchangers 92 and 94, and cooled by heat exchangers 90 and 95. The pump 96 and turbine 85 may be as described elsewhere herein.

The heat exchanger 90 transfers heat from the Rankine cycle(s) to the Brayton heat pump cycle(s), and the heat exchangers 91 and 93 transfer heat from the Brayton heat pump cycles to the Rankine cycles. The heat exchanger 94 absorbs heat from an external heat source (not shown) and transfers the heat to the Rankine heat pump cycle, thereby effectively delivering external cooling (e.g., to the heat source). In one embodiment, the heat exchanger 94 converts the working fluid in the Rankine heat pump cycle from liquid to gas. The heat exchanger 95 transfers heat from the Rankine cycles to an external heat sink (e.g., the external environment) and effectively provides external heating. Through the heat exchanger 92, a heat source (for example, collected solar thermal energy or solar-generated electrical energy [e.g., current] passed through a resistive heating element, or, alternatively, biomass combustion), delivers the main heat to the system 355.

Referring to both FIGS. 10 and 11, the amount of heat added to the system 355 the heat sources (e.g., heat exchangers 92 and 94) is represented by $Q_{in}=Q_{71-72}+Q_{78-79}$. The amount of heat delivered from the system 355 to a heat sink (e.g., heat exchanger 95) is represented by $Q_{out}=Q_{74-75}$. The mechanical power added to the system 355 is represented by $W_1$, or the work performed by compressors 89, 86 and 114, and by the pump 96. The mechanical power produced by and/or transferred within the system 355 is represented by $W_2$, or the work performed by expanders 88, 115 and 87, and by the turbine 85.

An Exemplary System Based on Combined Rankine, Trilateral, and Brayton Cycles with Multiple Heat Pumps and Multiple Heat Engines A further aspect of the invention relates to a system that includes combined Rankine, trilateral, and Brayton cycles, with multiple heat pumps and multiple heat engines, an isothermal heat sink, and multiple isothermal heat sources. The system includes multiple internal heat exchanges over temperature gradients in opposite directions, and can be used for combustion-based energy transfer, exchange, or storage/retrieval, as well as mechanical power and/or electricity generation.

Figure 12:
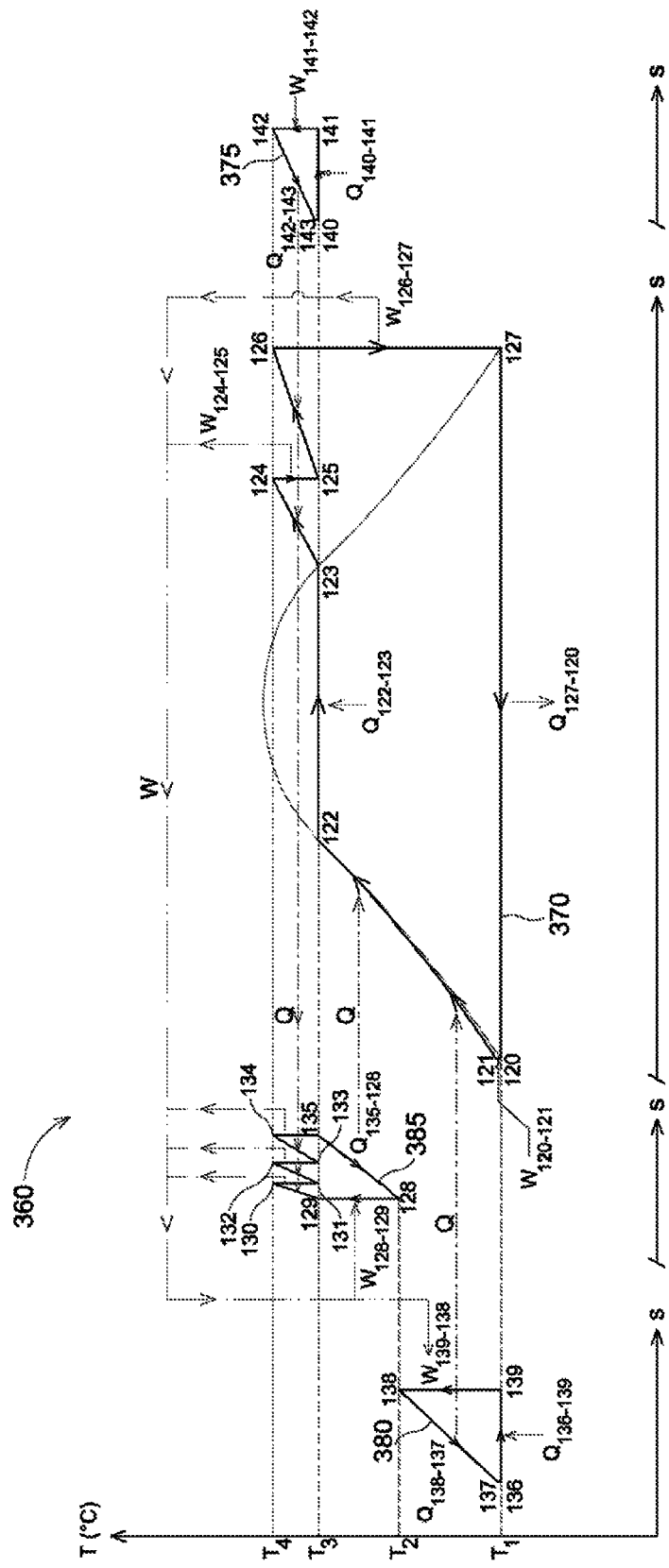
FIG. 12 shows a TS diagram of an exemplary Rankine cycle including one Brayton cycle, one Rankine cycle, and two combined trilateral cycles in accordance with one or more embodiments of the present invention.

FIG. 12 shows a TS diagram 360 of an exemplary steam cycle including one Brayton cycle 385, a Rankine heat engine cycle 370, and two combined trilateral heat pump cycles 375 and 380. FIG. 12 shows the combined thermodynamic cycle when the Brayton cycle 385, the Rankine cycle 370, and the trilateral cycles 370-380 work together. The Brayton cycle 385 works as a heat engine. The two trilateral cycles work as heat pumps (one as a feed water pre-heater and the other as a feed water post-superheater), and the Rankine cycle works as a heat engine. The energy output from the cycles can support the energy needed for (e.g., be transferred to another component that inputs energy into) the system.

The basic components and processes in the Brayton, Rankine and trilateral cycles are as described with regard to FIGS. 1-5. The Brayton heat engine cycle 385 in FIG. 12 is defined by the sequential points 128-129-130-131-132-133-134-135-128. In this case, the Brayton cycle has three isobaric increasing temperature gradient heat transfers or exchanges, each followed by an adiabatic expansion. The Rankine heat pump cycle 375 is defined by the sequential points 140-141-142-143-140. The first trilateral heat pump cycle 380 is defined by the sequential points 136-139-138-137-136, and acts as a vapor compression heat pump. The Rankine heat engine cycle 370 is defined by the sequential points 127-120-121-122-123-124-125-126-127. In this case, the Rankine heat engine cycle has two isobaric increasing temperature gradient heat transfers or exchanges that are each followed by an adiabatic expansion.

Internal heat transfers occur from descending gradient heat transfer mechanisms 142-143 in the first trilateral heat pump cycle 375 to ascending gradient heat transfer mechanisms 123-124 and 125-126 in the Rankine heat engine cycle 370 and ascending gradient heat transfer mechanisms 129-130, 131-132 and 133-134 in the Brayton heat engine cycle 385, from descending gradient heat transfer mechanism 135-128 in the Brayton heat engine cycle 385 to ascending gradient heat transfer mechanism 121-122 in the Rankine heat engine cycle 370, and from descending gradient heat transfer mechanism 138-137 in the second trilateral heat pump cycle 375 to the ascending gradient heat transfer mechanisms 121-122 in the Rankine heat engine cycle 370.

The total heat added to or transferred into the system 360 from one or more heat sources (which are generally as described herein and which may be external) is represented by $n = Q_{140-141} + Q_{122-123} + Q_{136-139}$. The total heat delivered or transferred from the system 360 to one or more heat sinks (not shown, but which may be as described herein) is represented by $Q_{out} = Q_{127-120}$. The total mechanical power added to the system 360 is represented by $W_1 = W_{128-129} + W_{139-138} + W_{141-142} + W_{120-121}$. The mechanical power produced by and/or transferred within the system 360 is represented by $W_2 = W_{130-131} + W_{132-133} + W_{134-135} + W_{137-136} + W_{124-125} + W_{126-127} + W_{143-140}$. Seen from the outside, with internal heat transfers or exchanges omitted, the system 360 of combined Brayton, Rankine, and trilateral cycles behaves like a thermodynamic cycle with isothermal heat sources and an isothermal heat sink.

Figure 13:
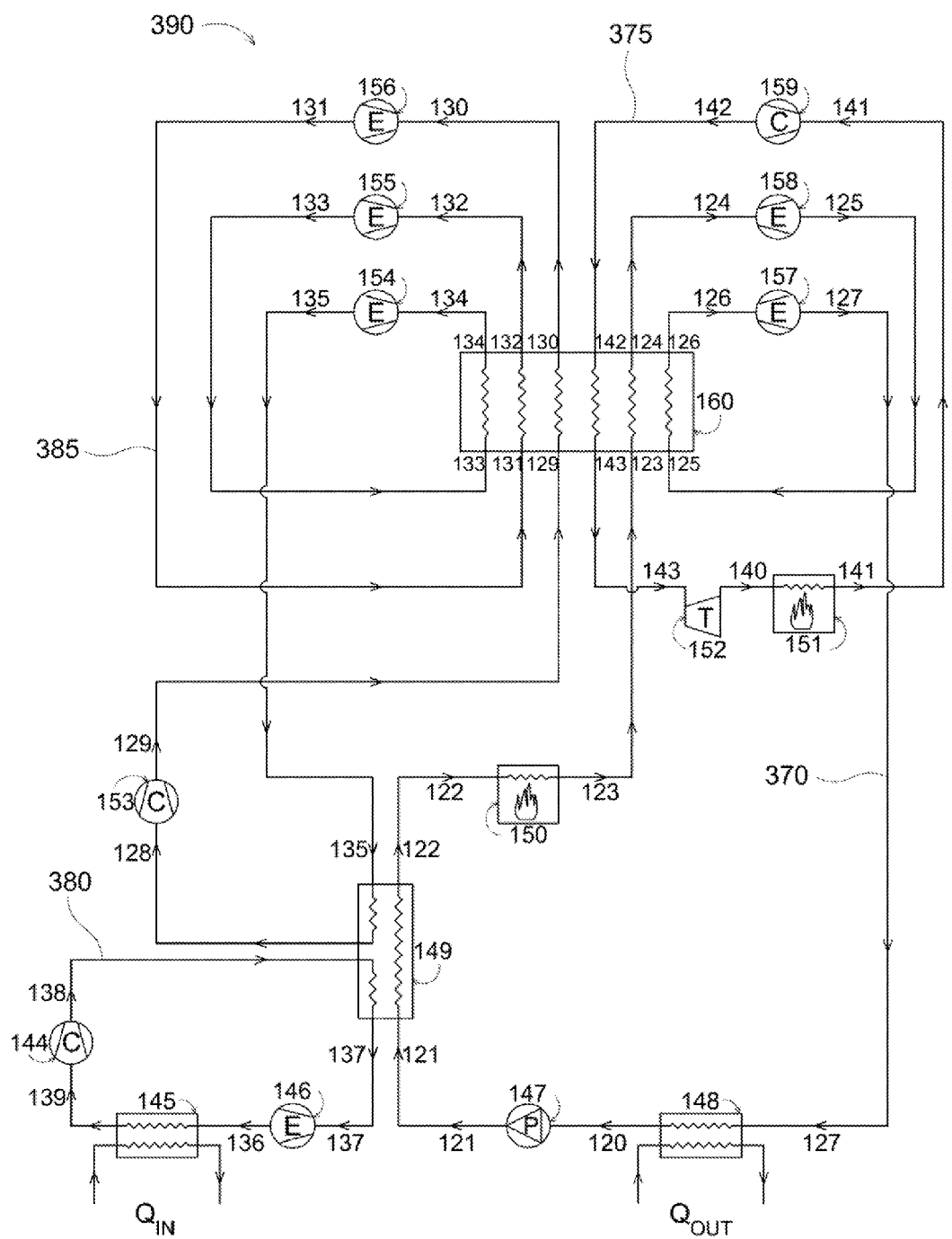
FIG. 13 is a layout of an exemplary machine and/or system with combined Brayton, Rankine, and trilateral cycles in accordance with the principles of the diagram/system of FIG. 12.

FIG. 13 shows a layout of an exemplary machine and/or system 390 with combined Brayton, Rankine, and trilateral cycles in accordance with the principles of the diagram/system 360 of FIG. 12, including one Brayton cycle 385, a Rankine cycle 370, and two trilateral cycles 375 and 380 working together. As described with regard to FIG. 12, the Brayton cycle 385 works as a heat engine, two trilateral cycles 375 and 380 work as heat pumps, and the Rankine cycle 370 works as a heat engine. The basic components and operations of the Brayton heat engine 385, the trilateral heat pumps 375 and 380, and the Rankine heat engine 370 are as described with regard to FIGS. 4 and 5.

The Brayton heat engine 385 includes the cycle 128-129-130-131-132-133-134-135-128, with a first compressor 153, a first heat exchanger 160, expanders 154, 155 and 156, and a second heat exchanger 149. In the example of FIG. 13, the Brayton heat engine 385 has three expanders 154-156, and receives heat in three exchanges or processes by the heat exchanger 160, each heat exchange or heat receiving process preceding an expansion.

The first trilateral heat pump 375 is defined by the cycle 140-141-142-143-140, with a first heat source 151, a second compressor 159, the first heat exchanger 160, and a first turbine 152. The second trilateral heat pump 380 is defined by the cycle 136-139-138-137-136, with a third heat exchanger 145 (which receives heat from a heat source), a third compressor 144, the second heat exchanger 149, and a second turbine 146.

The Rankine heat engine 370 is defined by the cycle 127-120-121-122-123-124-125-126-127, with a fourth heat exchanger 148 (which rejects heat to a heat sink or other output for heat rejected by the Rankine heat engine 370), a pump 147, the first heat exchanger 149, a second heat source 150, the second heat exchanger 160, and expanders 157 and 158. In the example of FIG. 13, the Rankine heat engine 370 has two expanders, and receives heat in two exchanges or processes in the heat exchanger 160, each heat exchange or heat receiving process preceding an expansion.

The first heat exchanger 160 transfers heat from the first trilateral heat pump 375 to each of the Brayton heat engine 385 and the Rankine engine 370. The second heat exchanger 149 receives heat from the Brayton engine 385 and the second trilateral heat pump 380, to be absorbed by the Rankine heat engine 370. The third heat exchanger 145 exchanges heat with an external heat source to receive heat for the second trilateral heat pump 380, and the fourth heat exchanger 148 rejects and/or transfers heat from the Rankine heat engine 370.

Referring to both FIGS. 12 and 13, the total heat added to the system 390 from the various heat sources is represented by $Q_{in} = Q_{150} + Q_{151} + Q_{145}$. The total heat delivered from the system 390 to the heat sink (e.g., heat exchanger 148) is represented by $Q_{out} = Q_{148}$. The total mechanical power added to the system 390 is represented by $W_1$, or the work performed by compressors 153, 159 and 144, and pump 147. The mechanical power produced by and/or transferred within the system is represented by $W_2$, or the work performed by expanders 156, 155, 154, 158 and 157, and turbines 152 and 146.

An Exemplary System Based on Combined Trilateral-Trilateral Cycles Using a Non-Linear Working Substance A further aspect of the invention relates to a system that includes combined trilateral-trilateral cycles, with at least one heat pump and at least one heat engine, and an isothermal heat sink. The system includes multiple internal heat exchanges over temperature gradients in opposite directions, and can be used for energy storage/retrieval, as well as mechanical power and/or electricity generation, using a "non-linear" working substance or fluid.

Figure 14:
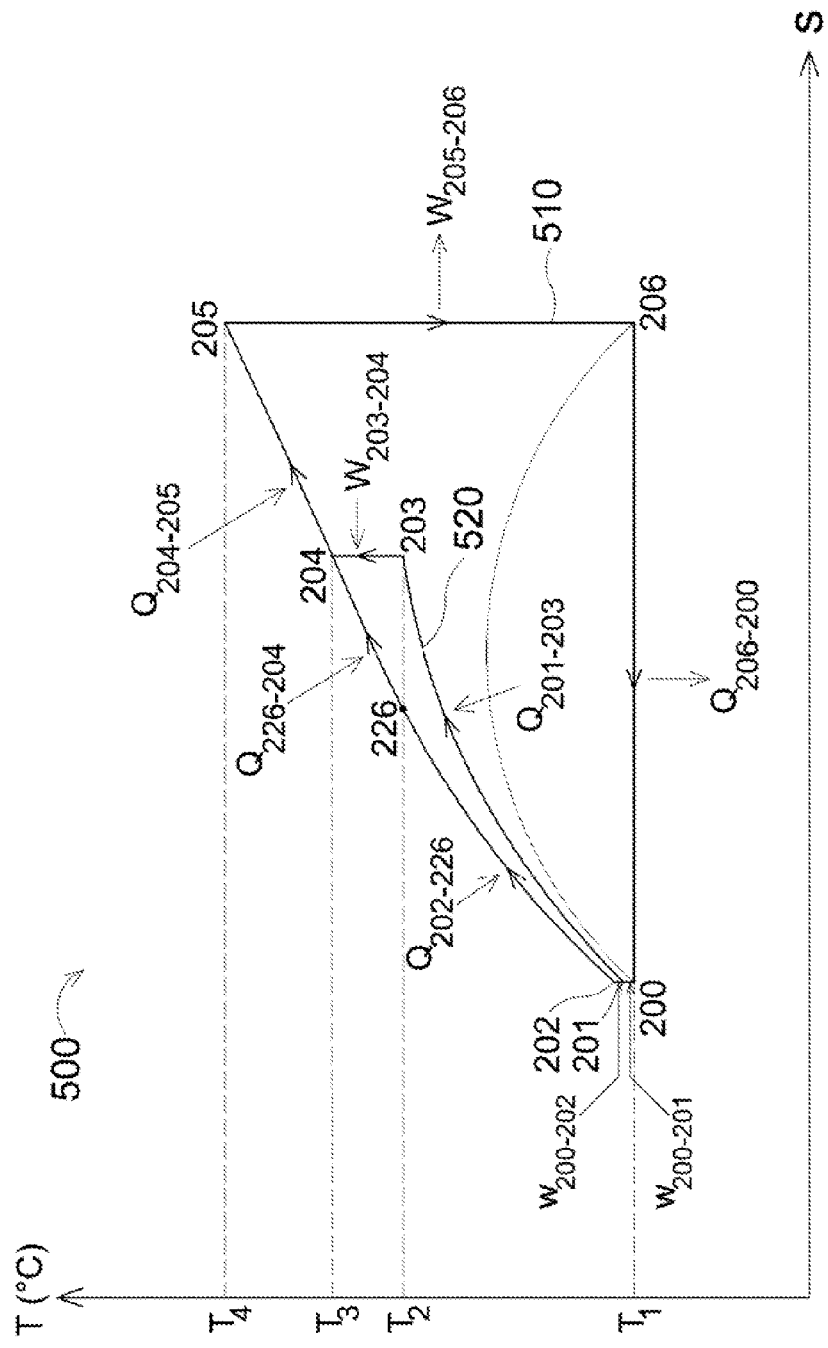
FIG. 14 is a TS diagram of an exemplary combined trilateral heat pump cycle and a trilateral heat engine cycle using a working fluid that exhibits nonlinear behavior in accordance with one or more embodiments of the present invention.

FIG. 14 shows a TS diagram 500 of an exemplary combined trilateral heat engine cycle 510 and a trilateral cycle 520 partially working as a heat pump using a working fluid that exhibits nonlinear behavior, such as $CO_2$, for example. Such an engine is particularly useful for energy storage in thermal energy transfer systems. For example, ABB has compensated for nonlinear behavior of $CO_2$ in U.S. Pat. Appl. Publ. No. 2012/0080168 by changing the flow volume of the storage liquid. In the present invention, in the example of FIGS. 14 and 15, the $CO_2$ flow in the middle section diminishes to compensate for the $CO_2$ nonlinearity by changing the flow volume of the working fluid.

The TS diagram 500 of FIG. 14 shows the combined thermodynamic cycle when two trilateral cycles 510 and 520 work together. One trilateral cycle 510 works as a heat engine, and the other trilateral cycle 520 works partially as a heat pump. This combined system 500 avoids the negative effects of the nonlinearity of a $CO_2$ working fluid. This combination of cycles increases the utilization in the area of the diagram 500 with the best efficiency of the fluid, and reduces the utilization in the area of the diagram 500 with relatively poor efficiency of the fluid. The combination of cycles forms or shapes a TS curve with increased linearity that, in turn, increases the efficiency of the system.

The basic processes in the trilateral cycles are described with regard to FIG. 1. The trilateral heat engine cycle 510 is defined by the sequential points 200-202-226-204-205-206-200. The partial trilateral heat engine cycle 520 is defined by the sequential points 200-201-203-204-205-206-200. The total heat added to or transferred into the system from a heat source (as described herein) is represented by $Q_{in}=Q_{201-203}+Q_{202-226}+Q_{226-204}+Q_{204-205}$. The total heat delivered or transferred from the system to a heat sink (as described herein) is represented by $Q_{out}=Q_{206-200}$. The total mechanical power added to or absorbed by processes in the system is $W_1=W_{200-202}+W_{200-201}+W_{203-204}$. The mechanical power produced by and/or transferred within the system (e.g., using a mechanical process or apparatus in the system, such as a turbine or an expander) is represented by $W_2=W_{205-206}$. Seen from the outside, with internal heat transfers or exchanges omitted, the system of combined cycles behave like a thermodynamic cycle with an increasing temperature gradient heat source and an isothermal heat sink.

Figure 15:
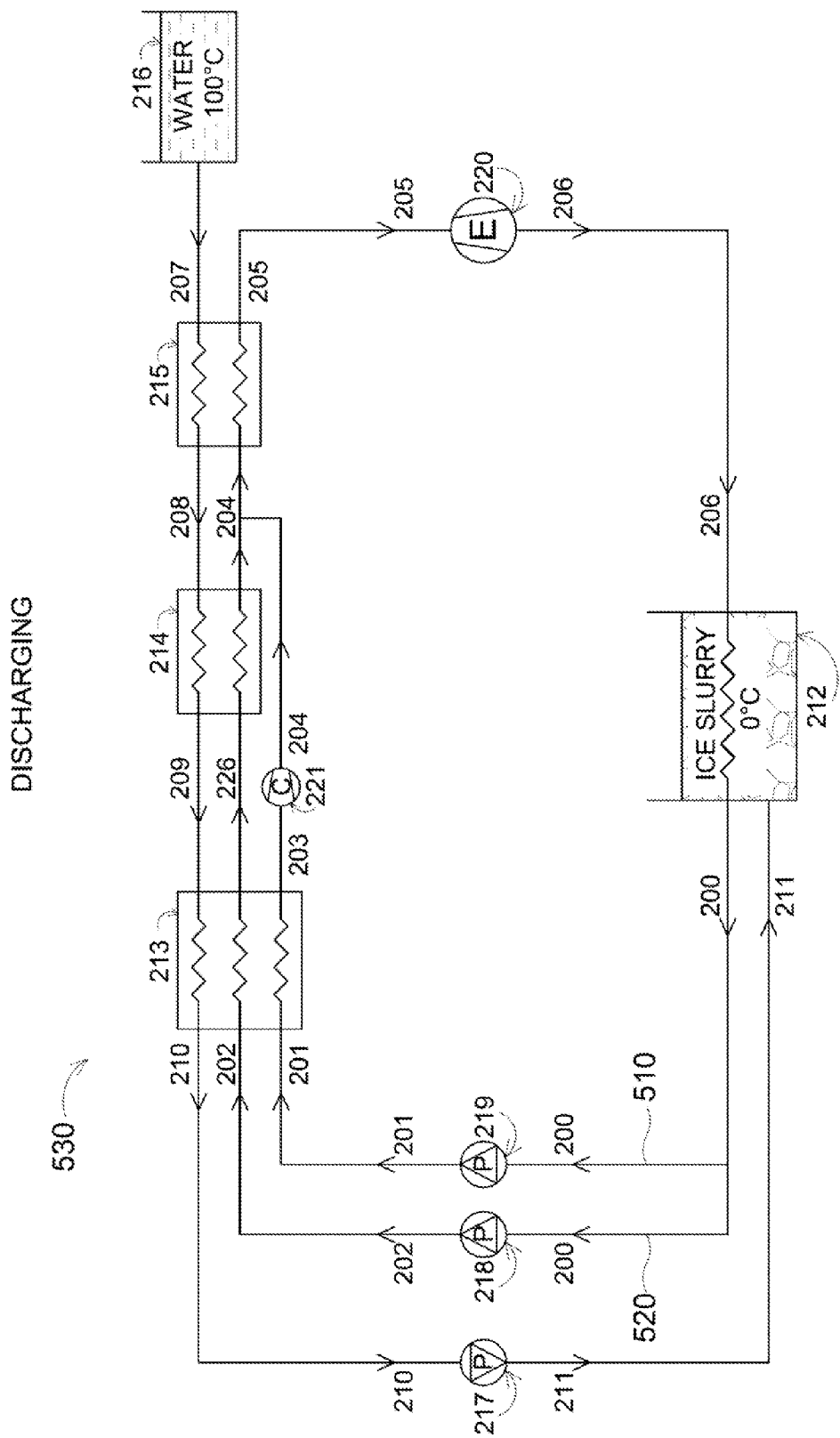
FIG. 15 is a layout of an exemplary machine and/or system with combined trilateral cycles in accordance with the principles of the TS diagram in FIG. 14.

FIG. 15 shows a layout of an exemplary machine and/or system 530 with combined trilateral cycles in accordance with the principles of the TS diagram 500 in FIG. 14 in the discharging mode, where two trilateral cycles work together to transfer heat from a working fluid (in the example shown, water), and thus discharge heat from a hot water tank 216 (e.g., containing stored hot water at a temperature of, e.g., 100° C.) for use in an application (e.g., a heating system for a home, building, vehicle, storage facility, etc.) receiving electricity from a generator, which, for example, can be driven by the expander in the system 530. One trilateral cycle 510 (which may be considered a partial cycle) works as a heat pump, and the other trilateral cycle 520 works as a heat engine. In the illustrated application of FIG. 15, the cycles are connected together and share the same fluid and some components, but can also be separated into separate cycles.

The basics of the energy-discharging trilateral heat pump 510 and the trilateral heat engine 520 are described with regard to FIGS. 4 and 5. The (partial) trilateral heat pump cycle 510 is defined by the cycle 200-201-203-204-205-206-200, and includes a first pump 219, a first heat exchanger 213, a compressor 221, a second heat exchanger 215, an expander 220, and the heat sink (e.g., an ice slurry or cold water storage tank 212). The trilateral heat engine cycle 520 is defined by the cycle 200-202-226-204-205-206-200, and includes a second pump 218, the first and second heat exchangers 213 and 215, a third heat exchanger 214, the expander 220, and the heat sink 212.

The heat added to or transferred into the system 530 from a heat source (e.g., hot water from the hot water tank 216) is that heat absorbed or transferred through the first, second and third heat exchangers 215, 214 and 213. The heat delivered or transferred from the system 530 to a heat sink is the heat transferred to the ice slurry or cold water tank 212. The mechanical power added to the system 530 is represented by $W_1$, or the work performed by the compressor 221 and the first and second pumps 218 and 219. A pump 217 supports the transfer of fluid between the external heat source 216 and the heat sink 212. The mechanical power produced by and/or transferred within the system is represented by $W_2$, or the work performed by the expander 220. That work can be used to drive a turbine, rotate a fan attached to a shaft, drive a piston, operate a generator to generate or retrieve electricity or other form of power, etc.

Figure 16:
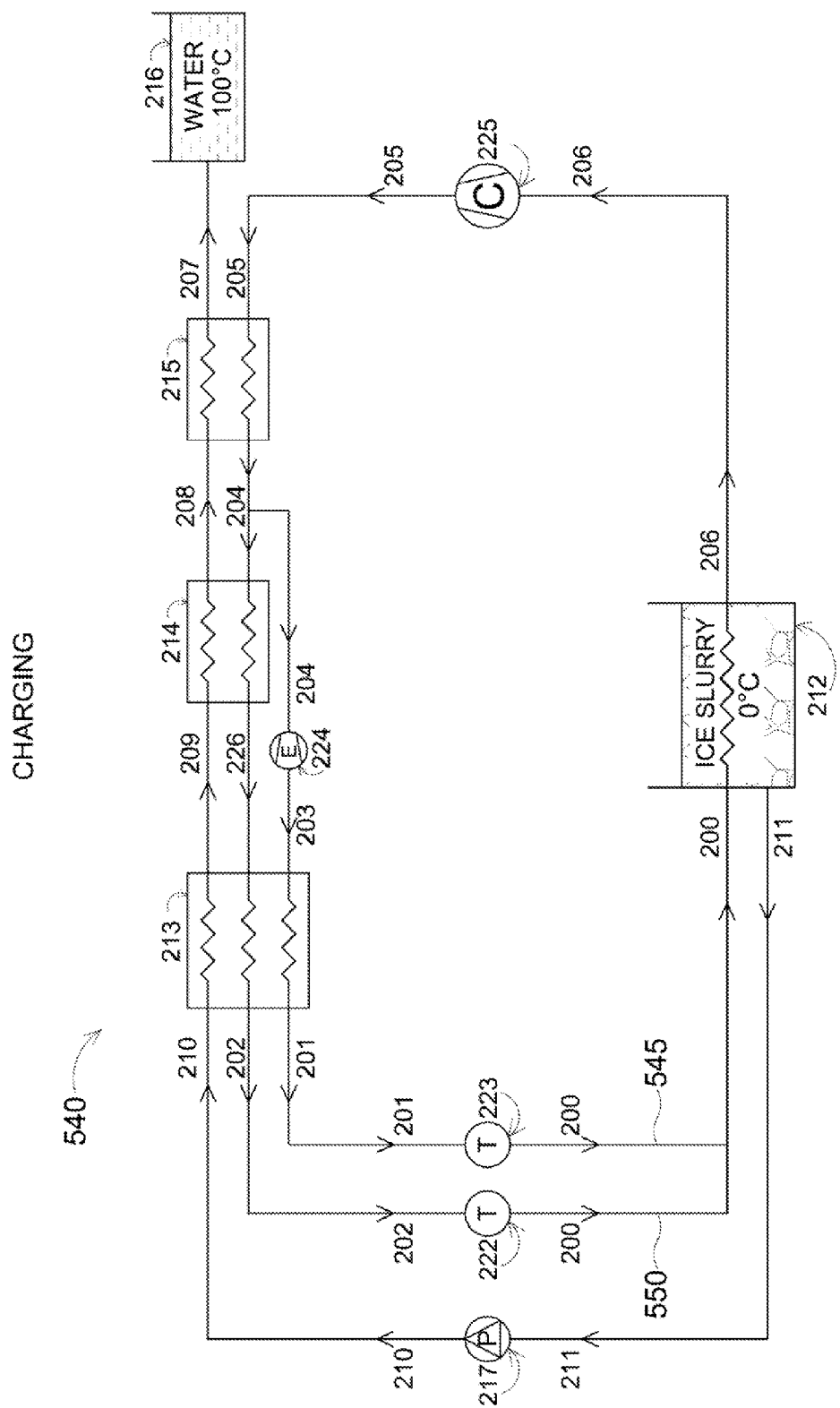
FIG. 16 is a layout of another exemplary machine and/or system with combined trilateral cycles in accordance with the reverse principles of the TS diagram in FIG. 14.

FIG. 16 shows a layout of an exemplary machine and/or system 540 with combined trilateral cycles in accordance with the reverse principles of the TS diagram 500 in FIG. 14 (e.g., in the charging mode), where two trilateral cycles work together to transfer heat to another working fluid (in the example shown, water), and thus charge a hot water tank 216 with hot water (e.g., at 100° C.) and store thermal energy for later use (or charge the cold storage tank 212 by removing or rejecting heat from the tank 212). One trilateral cycle 545 works partially as a heat engine, and the other trilateral cycle 550 works as a heat pump. In the illustrated application of FIG. 16, the cycles are connected together and share the same fluid and some components, but can also be separated into separate cycles.

The basics of the trilateral heat pump 550 and the trilateral heat engine 545 are described with regard to FIG. 4 and FIG. 5. The trilateral heat pump 550 is defined by the cycle 200-206-205-204-226-202-200, and includes a compressor 225, the heat exchangers 215, 214, 213, a first turbine (or expander) 222, and the heat sink 212. The (partial) trilateral heat engine cycle 545 is defined by the cycle 200-206-205-204-203-201-200, and includes the compressor 225, the first heat exchanger 215, the expander 224, the third heat exchanger 213, a second turbine (or expander) 223, and the heat sink 212.

The total heat transferred, withdrawn or delivered from the system 540 is that heat absorbed by or transferred to the water pumped from the cold water tank 212 through the heat exchangers 213, 214 and 215 to the hot water tank 216. The total heat added to or transferred into the system 540 from a heat source is $Q_{in}=Q_{200-206}$ in charging mode. The mechanical power added to the system 530 is represented by $W_1$, or the work performed by the compressor 225 and the pump 217. The pump 217 (which, in the example of FIGS. 15-16, is a two-way pump) supports the transfer of fluid between the heat storage tank 216 and the cool storage tank 212. The mechanical power produced by and/or transferred within the system is represented by $W_2$, or the work performed by the expander 224 and the turbines 222 and 223. That work can be used to rotate a shaft, drive a piston, generate electricity, etc.

An Exemplary System Based on Combined Brayton-Trilateral Cycles and an Energy Storage and Retrieval Subsystem A further aspect of the invention relates to a system that includes combined Brayton-trilateral cycles, with a heat pump and a heat engine, and an isothermal heat source. The system includes multiple internal heat exchanges over temperature gradients in opposite directions, and can be used for energy storage/retrieval using a plentiful, inexpensive working fluid (e.g., water), as well as for mechanical power and/or electricity generation.

Figure 17:
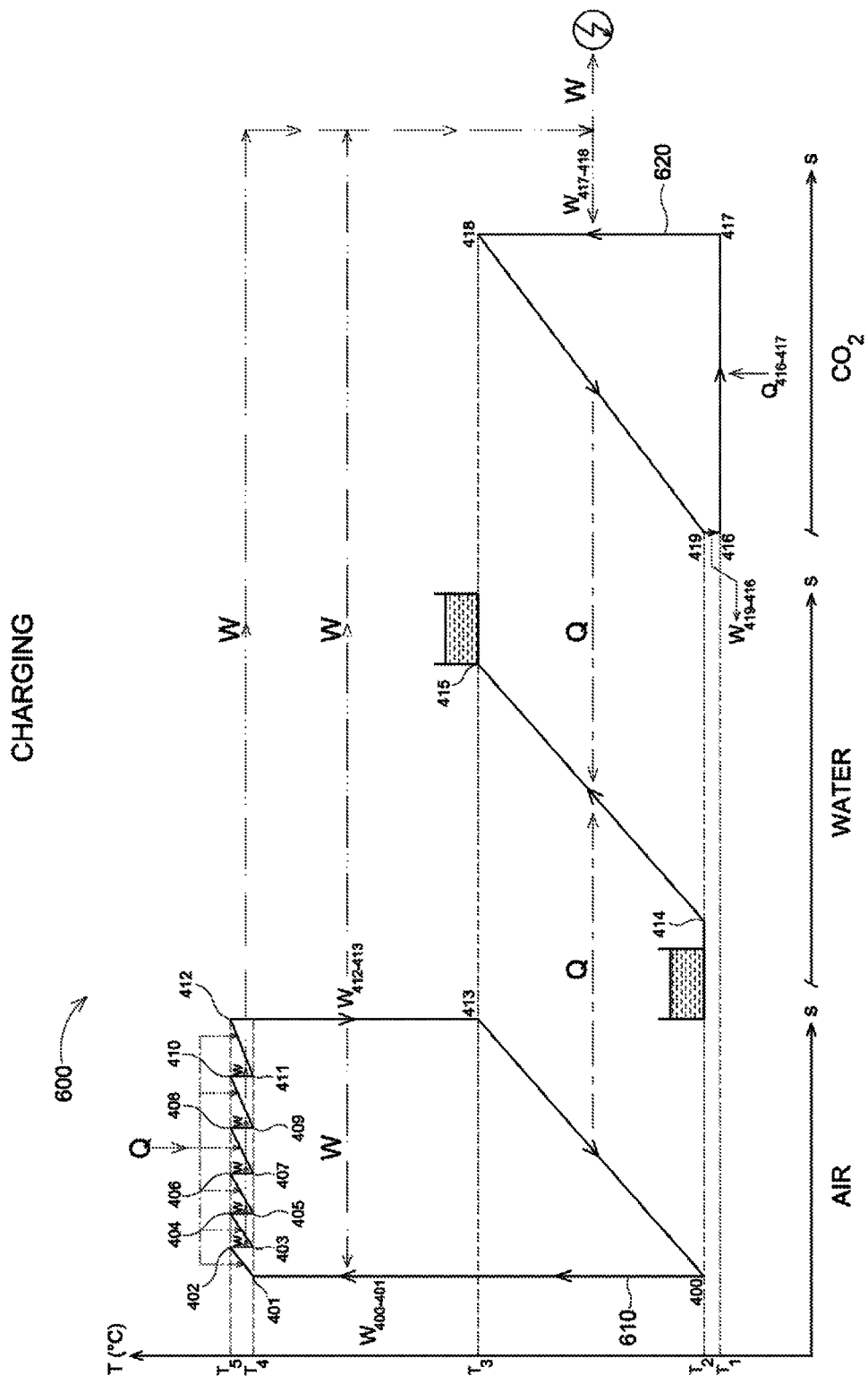
FIG. 17 is a TS diagram of a combined Brayton heat engine cycle including multiple gradient heat sources and a trilateral heat pump cycle including an isothermal heat source and heat sinks to a thermal energy storage component in accordance with one or more embodiments of the present invention.

FIG. 17 shows a TS diagram 600 of a combined Brayton heat engine cycle 610 including multiple gradient heat sources and a trilateral heat pump cycle 620 including an isothermal heat source. The system 600 includes an internal heat sink to a heat storage device (e.g., water tank) 415. The TS diagram shows the combined cycle when one Brayton cycle and one trilateral cycle work together. The Brayton cycle 610 works as heat engine and the trilateral cycle 620 works as a heat pump. The system 600 including the combination is a charging loop for heat to be stored in, for example, a liquid (e.g., water). By reversing the trilateral cycle 620, it is possible to use the heat stored in the storage device (e.g., tank 423, FIG. 16) to get energy (e.g., thermal energy or mechanical work, $W_2$) out.

The basic processes and components included in the Brayton and trilateral cycles are described above with regard to FIGS. 1 and 2. The Brayton heat engine cycle 610 comprises the cycle 400-401-402-403-404-405-406-407-408-409-410-411-412-413-400. In addition to the description of the exemplary Brayton cycle in FIG. 2, the gradient, temperature-increasing heat transfer or exchange process in the Brayton cycle 610 in FIG. 17 is divided into six steps with five expanders in between. The trilateral heat pump cycle 620 comprises the cycle 417-418-419-416-417.

An internal heat transfer occurs from the Brayton cycle (at $Q_{413-400}$) to the heat storage system (e.g., a hot water tank

415) at $Q_{414\text{-}415}$, and another internal heat transfer occurs from the trilateral cycle at $Q_{418\text{-}419}$ to the heat storage system (e.g., the hot water tank 415) at $Q_{414\text{-}415}$. The heat that is added to or transferred into the system 600 from one or more heat sources (not shown, but generally as described herein) is represented by $Q_{in}=Q_{401\text{-}412}+Q_{416\text{-}417}$. The heat that is delivered or transferred from the system 600 to a heat sink (represented by $Q_{out}$) is, in this case, 0 because the system 600 includes a thermal energy storage component. The mechanical power that is added to the system 600 is represented by $W_1=W_{400\text{-}401}+W_{417\text{-}418}$. The mechanical power produced by and/or transferred within the system 600 is represented by $W_2=W_{402\text{-}411}+W_{412\text{-}413}+W_{419\text{-}416}$. Seen from the outside, with internal heat transfers omitted, the combined thermodynamic cycles of system 600 behaves like a cycle with one multiple gradient increasing heat source and one isothermal heat source. The heat sink is internal and used for increasing the temperature of the heat storage system.

Figure 18:
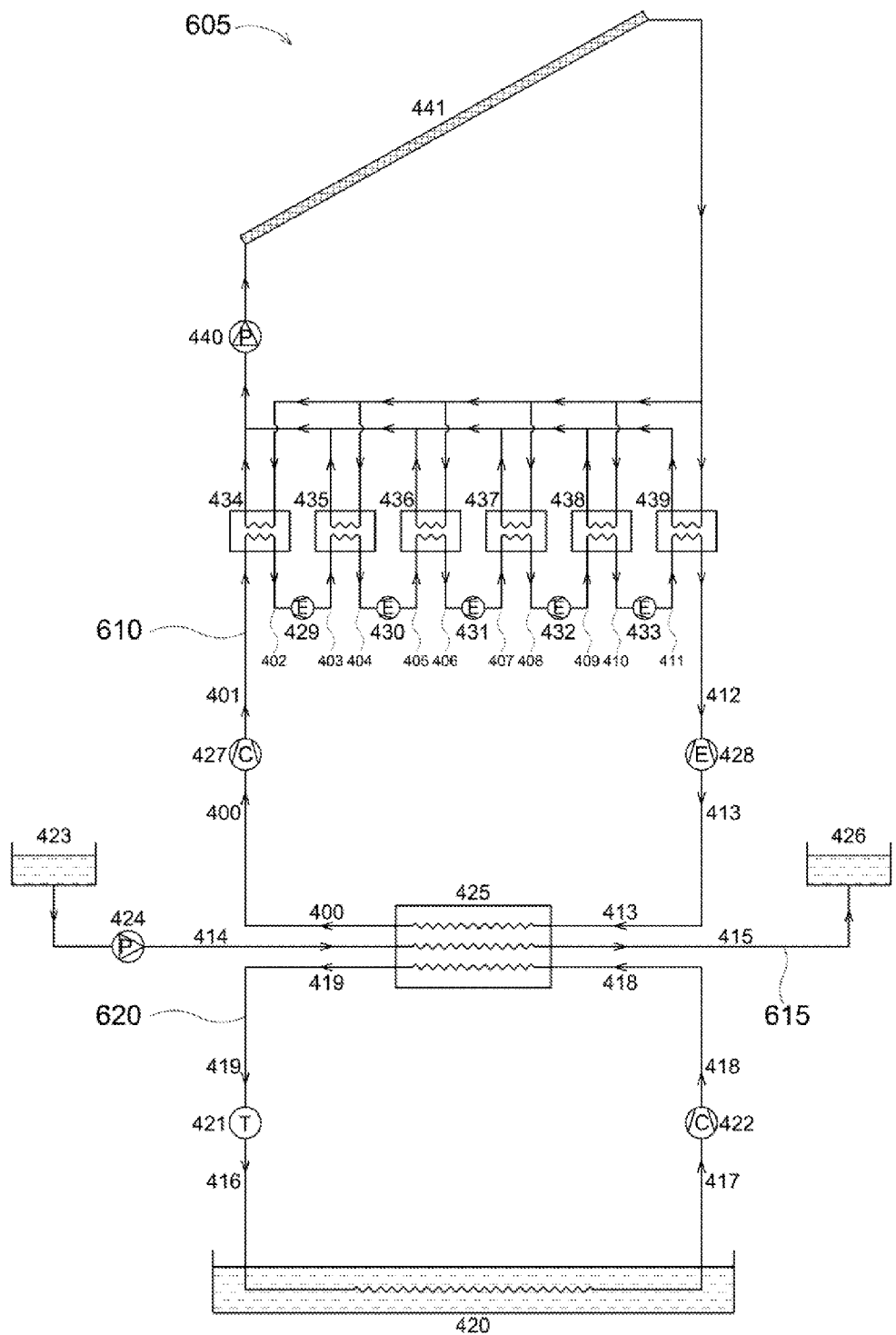
FIG. 18 is a layout of an exemplary machine and/or system having combined thermodynamic cycles in accordance with the concepts shown in FIG. 17.

FIG. 18 shows a layout of an exemplary machine and/or system 605 having combined thermodynamic cycles in accordance with the concepts shown in FIG. 17, including one Brayton cycle 610 working as a heat engine and one trilateral cycle 620 working as a heat pump, combined and working together. In the charging mode that shows in FIG. 18, the thermodynamic cycles 610 and 620 heat the liquid in the thermal energy storage subsystem 615 that is stored in the hot water tank 426. In the discharging mode, the trilateral cycle 620 changes direction to a heat engine and uses the stored hot water as source of energy, and the Brayton cycle 610 can be stopped. Such a system 605 in discharging mode is useful for electricity production when the sun is down.

The basic components and operations of the Brayton heat engine 610 and the trilateral heat pump 620 are as described in FIGS. 4 and 5. The Brayton heat engine 610 includes the cycle 400-401-402-403-404-405-406-407-408-409-410-411-412-413-400, with a first compressor 427, expanders 428, 429, 430, 431, 432 and 433, a first heat exchanger 425 (which can reject heat to a heat sink), and with a plurality of second heat exchangers 433-437 to absorb heat from a heat source (e.g., from the sun, at 439 in a solar energy collector/system).

The trilateral heat pump 620 includes the cycle 417-418-419-416-417, with a second compressor 422, the first heat exchanger 425 (which also exchanges heat with a heat sink), a turbine 421, and a third heat exchanger 420 that absorbs heat from the environment. Alternatively, depending on the working fluid in the trilateral heat pump 620, the third heat exchanger 420 can absorb heat from a heat source (as described herein), such as the environment or other permanent heat source.

Referring back to FIG. 17, the total heat added or transferred to the system 600 from various heat sources is represented by $Q_{in}=Q_{401\text{-}402}+Q_{403\text{-}404}+Q_{405\text{-}406}+Q_{407\text{-}408}+Q_{409\text{-}410}+Q_{411\text{-}412}+Q_{416\text{-}417}$. The total heat delivered or transferred by or from the system 605 to a heat sink (e.g., heat exchanger 425 in FIG. 18) is $Q_{out}=Q_{413\text{-}400}+Q_{418\text{-}419}$. However, when the heat sink is used for heat storage within the system, such as in the system 605 of FIG. 18, no heat actually leaves the system.

The total mechanical power added to the system 600 is $W_1=W_{400\text{-}401}+W_{417\text{-}418}$ (performed by the compressors 427 and 422 in FIG. 18)+the work performed by the pump 424 in the thermal energy storage subsystem 615+the pump 438 for the liquid in the solar energy collection subsystem to transport the heat absorbed from the sun to the heat exchangers 433-437 (FIG. 18). The mechanical power produced by and/or transferred within the system 600 (FIG. 17) is represented by $W_2=W_{402\text{-}403}+W_{404\text{-}405}+W_{406\text{-}407}+W_{408\text{-}409}+W_{410\text{-}411}+W_{412413}$ (e.g., performed by expanders 428-433 in FIG. 18)+$W_{419\text{-}416}$ (e.g., performed by turbine 421 in FIG. 18).

By reversing the trilateral heat pump 620 to a heat engine, it is possible to use the heat stored in the hot water tank 426 to get mechanical power out from the system to run a generator, a turbine, or a piston-based engine, for example. In a system that uses solar power to add heat, electricity can then be produced during the night, when the sun is down. To reverse the trilateral cycle operation, the compressor 422 can be replaced by or switched out with an expander.

An Exemplary System Based on Combined Rankine-Trilateral Cycles and an Energy Storage and Retrieval Subsystem A further aspect of the invention relates to a system that includes combined Rankine-trilateral cycles, with a heat pump and a heat engine, an isothermal heat source (e.g., a solar thermal energy collector), and an isothermal heat sink. The system includes multiple internal heat exchanges over temperature gradients in opposite directions between the energy storage and retrieval subsystem and each of the heat pump and the heat engine. The energy storage and retrieval subsystem can use a plentiful, inexpensive working fluid (e.g., water), and the system can also be used to provide mechanical power and/or generate electricity.

Figure 19:
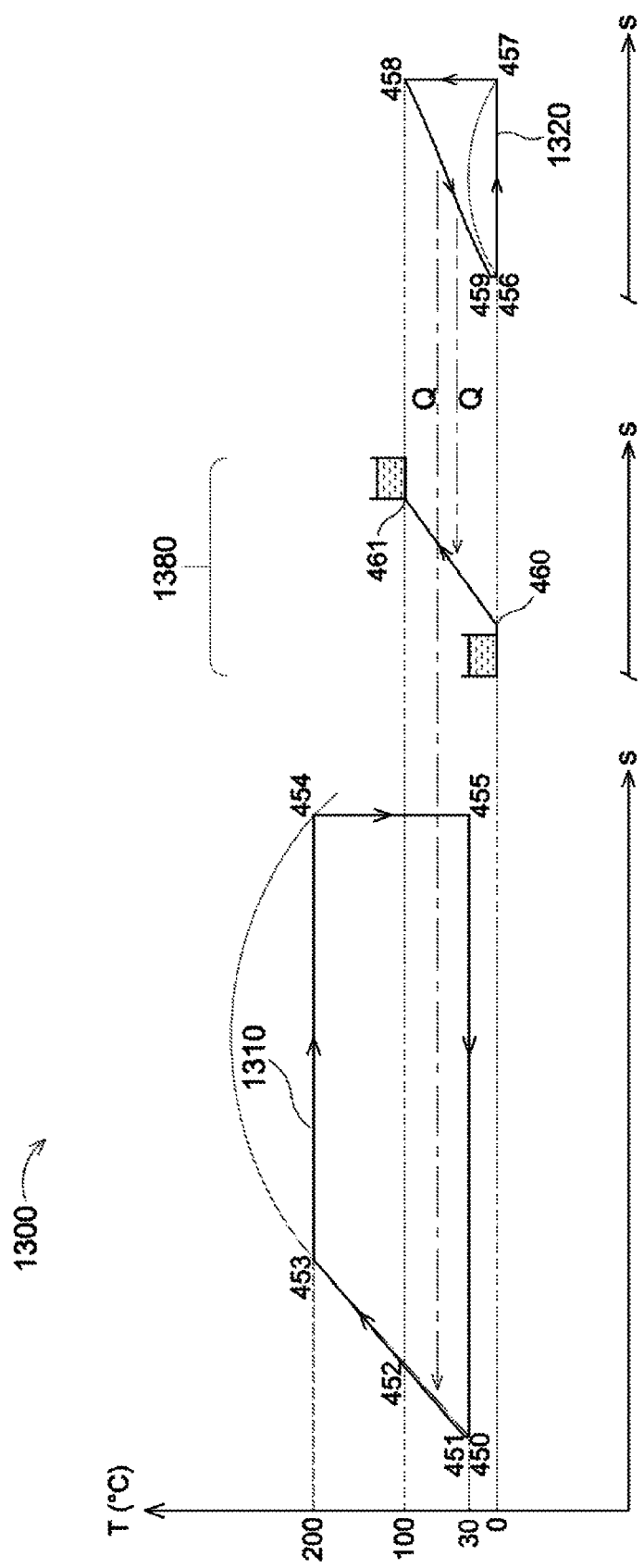
FIG. 19 shows a TS diagram of a combined Rankine heat engine cycle with one isothermal heat source, one gradient heat source and an isothermal heat sink, and a trilateral heat pump cycle with an isothermal heat source and a heat sink to a thermal energy storage component, in accordance with one or more embodiments of the present invention.

FIG. 19 shows a TS diagram 1300 of a combined Rankine heat engine cycle 1310 with one isothermal heat source, one gradient heat source and an isothermal heat sink, and a trilateral heat pump cycle 1320 with an isothermal heat source and a heat sink to a hot water storage subsystem 1380. FIG. 19 shows combined Rankine and trilateral cycles working together. The Rankine cycle 1310 works as heat engine, and the trilateral cycle 1320 works as a heat pump and is a charging loop for heat to be stored in, for example, a liquid (e.g., water). By reversing the trilateral heat pump cycle 1320 to a heat engine, it is possible to use the stored heat to get $W_2$. The Rankine heat engine cycle 1310 may use a working fluid that functions in both the gas phase and the liquid phase, such as water/steam, brine/steam, etc., and the pump cycle 1320 may advantageously use $CO_2$ as the working fluid, but the system 1300 is not limited to such working fluids.

The basic components and processes in the Rankine and trilateral cycles are generally as described above with regard to FIGS. 1 and 4. The Rankine heat engine cycle 1310 includes the cycle 450-451-452-453-454-455-450. In one example of the Rankine heat engine cycle 1310, water having a temperature of about 30° C. and a vapor pressure of much less than atmospheric pressure (e.g., 0.04 bar) is heated slightly (e.g., by pumping the fluid from a condenser to one or more heat exchangers). At 451, the water is heated (e.g., by a heat exchanger), and at 452, the water reaches its boiling point (100° C.). The water vapor (steam) continues to be heated from 100° C. at 452 to about 200° C. at 453. The entropy of the water/steam also increases substantially linearly with the increase in temperature from 451 to 453. At 453, the entropy of the steam increases isothermally to 454. The steam has a relatively high pressure (e.g., 16 bar), and at 454, the steam is expanded, thereby reducing its temperature and pressure. Eventually, some of the steam condenses to liquid water (e.g., as the temperature drops to about or below 100° C., depending on the pressure of the steam/water vapor). At 455, the steam/water vapor undergoes an isothermal entropy decrease (e.g., by condensation) to 450, completing the cycle 1310.

The trilateral heat pump cycle 1320 includes the cycle 457-458-459-456-457. In the Rankine heat engine cycle 1310, the working fluid (e.g., water) stays substantially in one phase (e.g., the liquid phase, between a temperature of 0° C. and 100° C., and at a vapor pressure of atmospheric pressure or greater). In the trilateral heat pump cycle 1320, at 457, the working fluid (having a temperature of about 30° C. and a pressure of about 35 bar) is heated (e.g., by one or more compressors that increase both the pressure and the temperature). At 458, the working fluid (e.g., at 100° C. and a pressure of 125 bar transfers heat to or exchanges heat with the heat storage subsystem 460-461 (e.g., $Q_{460\text{-}461}$) and internally to the Rankine engine cycle 1310 (e.g., $Q_{451\text{-}452}$). In the reverse operation, the heat released from the storage subsystem (e.g., $Q_{461\text{-}460}$) can function as a heat source for the reverse trilateral cycle 1320 (which then operates as a heat engine).

The total heat added or transferred to the system 1300 from one or more heat sources (as described herein) is represented by $Q_{in} = Q_{452\text{-}453} + Q_{453\text{-}454} + Q_{456\text{-}457}$. The total heat delivered or transferred by or from the system 1300 to one or more heat sinks is represented by $Q_{out} = Q_{455\text{-}450}$. The total mechanical power added to the system is represented by $W_1 = W_{450\text{-}451} + W_{457\text{-}458}$. The mechanical power produced by and/or transferred within the system 1300 is represented by $W_2 = W_{454\text{-}455} + W_{459\text{-}456}$.

With the trilateral heat pump cycle 1320 in reverse operation (i.e., working as a heat engine), the system 1300 enters into a discharging mode, the W and Q conditions and functions change, and increased mechanical power ($W_2$) can be produced by the system 1300. The internal heat transfers in the discharging mode occur from the heat storage subsystem (i.e., $Q_{461\text{-}460}$) to $Q_{451\text{-}452}$ and $Q_{459\text{-}458}$. The total heat added or transferred to the system in discharging mode from the heat source(s) is $Q_{in} = Q_{452\text{-}453} + Q_{453\text{-}454}$. The total heat delivered or transferred from the system in discharging mode to the heat sink(s) is $Q_{out} = Q_{455\text{-}450} + Q_{457\text{-}456}$. The total mechanical power added to the system in discharging mode is $W_1 = Q_{450\text{-}451} + Q_{456\text{-}459}$. The mechanical power produced by and/or transferred within the system 1300 in discharging mode is represented by $W_2 = W_{454\text{-}455} + W_{458\text{-}457}$. If the work out of the reverse system $W_{458\text{-}457}$ is sufficient, it is possible to shut down the Rankine engine cycle 1310.

Seen from the outside, with internal heat transfers or exchanges omitted, the system 1300 of combined cycles 1310 and 1320 behaves like a thermodynamic cycle with one gradient/increasing heat source, two isothermal heat sources, and an isothermal heat sink when working in the initial mode.

Figure 20:
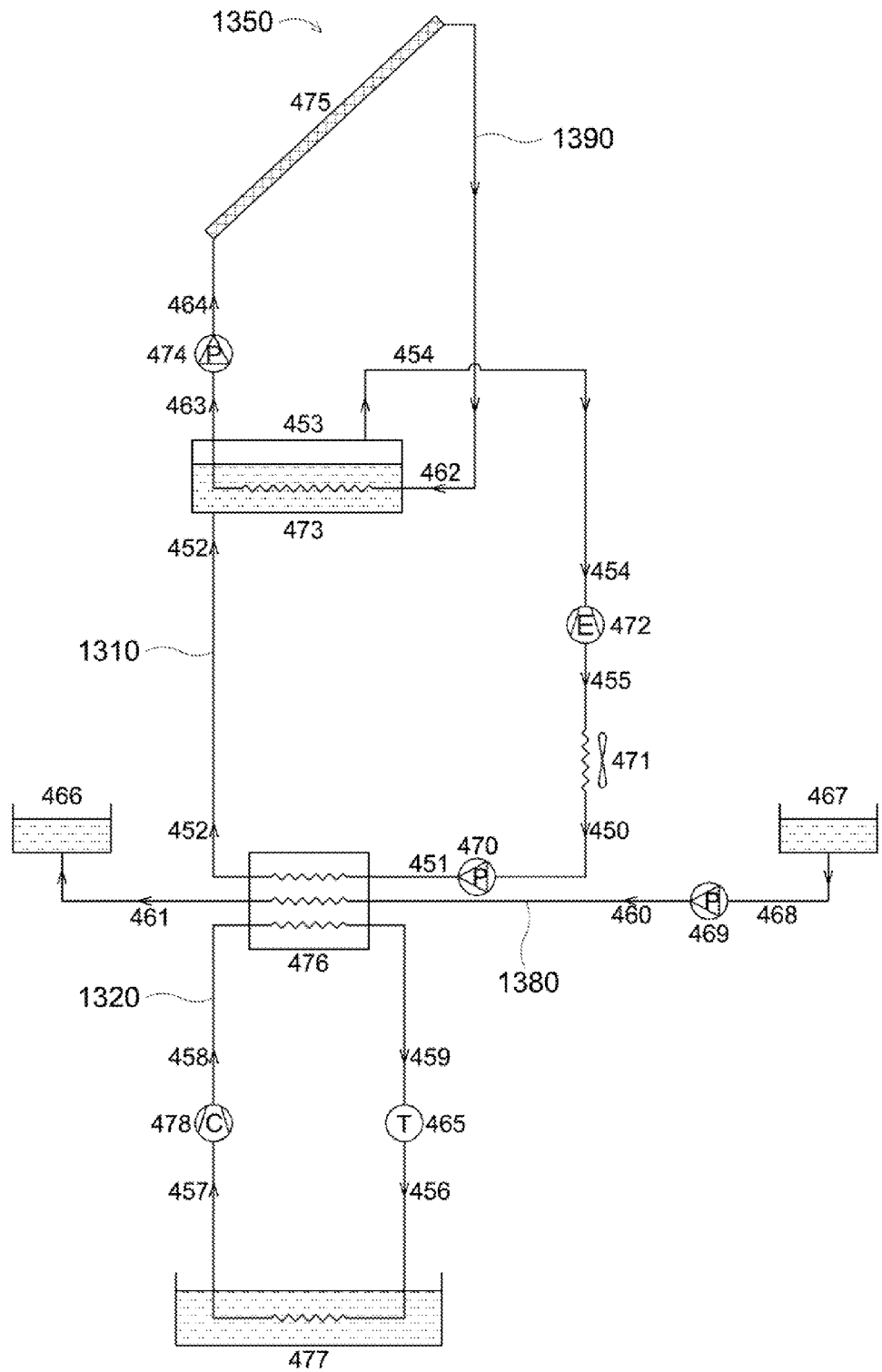
FIG. 20 is a layout of an exemplary machine and/or system with combined thermodynamic cycles according to the concepts and/or principles shown in FIG. 19.

FIG. 20 shows a layout of an exemplary machine and/or system 1350 with combined thermodynamic cycles according to the concepts and/or principles shown in FIG. 19. FIG. 20 demonstrates an example of a machine/system 1350 that includes a Rankine heat engine 1310 and a trilateral heat pump 1320 working together. The trilateral heat pump 1320 heats the liquid in the thermal energy storage cycle 680 as it is pumped from the tank 467 to the tank 466, and transfers heat to the Rankine heat engine in the charging mode.

The basic components and operations of the Rankine heat engine and the trilateral heat pump are as described in FIGS. 4 and 5. The Rankine heat engine 1310 includes the cycle 450-451-452-454-455-450, with a pump 470, an expander 472, heat exchangers 471 and 476 (which may respectively function to exchange heat with the environment and with the heat storage subsystem 1380 and/or the heat pump cycle 1320), a heat exchanger 473 (which may function as a second heat source in the heat engine cycle 1310 to absorb heat from the sun through the solar energy absorber 475).

The trilateral heat pump 1320 includes the cycle 456-457-458-459-456, with a compressor 478, a turbine 465, a heat exchanger 477 (which may function as a heat source to absorb heat from an external supply of thermal energy) and the heat exchanger 476 (which may function as a heat sink to release heat to the heat storage cycle 1380 that is stored in the tank 466, and to the heat engine 1310).

The heat added to the system ($Q_{in}$) from one or more heat sources is the amount of heat absorbed or transferred through the heat exchanger 473 (which receives heat from the solar energy/heat absorber 475) and the heat exchanger 477, which is in this case connected to a cold storage tank. For example, the cold storage tank may store water at a temperature of at or near 0° C.

The total heat delivered or transferred by (or removed from) the system 1350 to a heat sink ($Q_{out}$) is the heat removed by air cooling in or by the heat exchanger 471. In one embodiment, this heat can be used to heat the interior of a home, building, work space, etc., or to pre-heat air used for another purpose (e.g., in a combustion process or industrial drying process). At least some of the heat exchanged through the heat exchanger 476 is absorbed by the heat engine 1310, meaning that no heat leaves the heat engine 1310 through the heat exchanger 476. Some of the heat rejected by the trilateral heat pump 1320 through the heat exchanger 476 may be absorbed by the thermal energy storage subsystem 1380.

The mechanical power absorbed by the various processes to the system 1350 ($W_1$) is the work done by the compressor 478, the pump 470, the heat storage pump 469, and the cooling fan 471 (and optionally, the pump 474). The mechanical power produced from or delivered by the processes in the system ($W_2$) is the work done by the expander 472 and the turbine 465.

By reversing the trilateral heat pump 1320 to a heat engine, it is possible to use the stored heat in the tank 466 (and/or the "stored cold" in the tank 467) to get mechanical power out of the storage subsystem 1380 to run a generator, as one example. In a solar power system, electricity can then be produced during the night when the sun is down. To get the reverse trilateral heat engine operation, the following components in FIG. 20 can be changed, switched in/out, or operated in the opposite direction. The compressor 478 can be replaced by or switched with one or more expanders. The turbine 465 can be replaced by or switched with a pump, and the pump 469 can be operated in the reverse direction. The heat engine 1310 and the direct solar energy conversion subsystem 1390 generally do not operate with the reversed heat engine 1320, but can do so during daytime hours to cover mechanical energy requirements in peak consumption hours.

Exemplary Rankine Cycles and Energy Storage Systems

Figure 21:
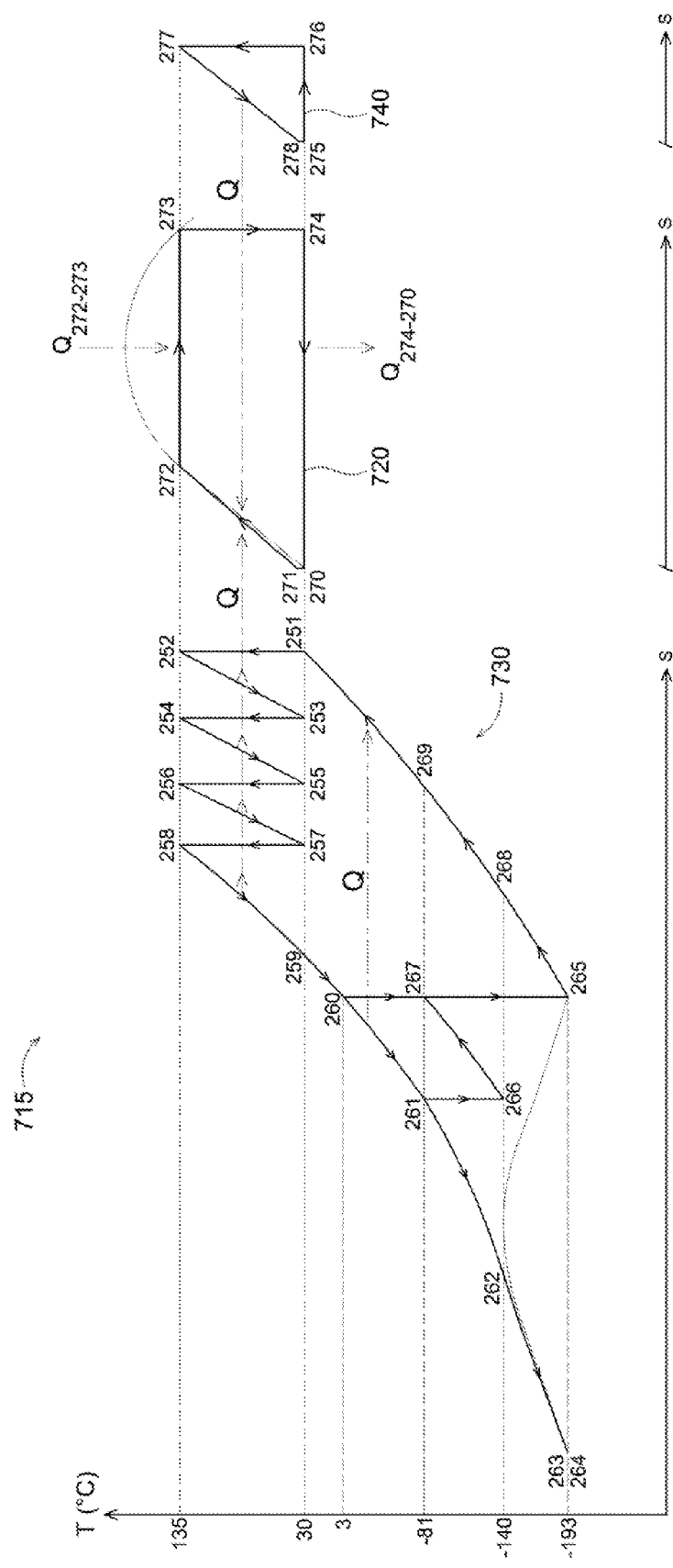
FIG. 21 a TS diagram of an exemplary Rankine cycle and an exemplary dual-cycle system that can produce liquid air or other liquefied or phase-changed gases in accordance with one or more embodiments of the present invention.

FIG. 21 shows a TS diagram 715 of an exemplary Rankine cycle 720 with feed water pre-heating, and an exemplary dual-cycle system 730 that can store energy by producing liquid air or other liquefied or phase-changed gases (such as liquid oxygen, liquid nitrogen, carbon dioxide, etc.). The temperatures along the y-axis of the diagram 715 are exemplary for a gas such as air, nitrogen, oxygen, carbon dioxide, or combinations thereof, and are not limiting with regard to this system.

The diagram 715 of FIG. 21 includes four combined cycles, in which two cooperating Brayton cycles work together with a Rankine cycle and a trilateral cycle. The first and second Brayton cycles work as a heat pumps, the Rankine cycle works as a heat engine, and the trilateral cycle works as a heat pump. In FIG. 21, the system is operating in a charging mode, and the combined cycles produce liquid air for low temperature, high energy, and/or high capacity heat storage.

The basic components and processes in the Brayton, Rankine and trilateral cycles are generally as described above with regard to FIGS. 1-2 and 4-5. The first Brayton cycle includes the cycle 265-268-269-251-252-253-254-255-256-257-258-

259-260-267-265. The second Brayton cycle includes the cycle 265-268-269-251-252-253-254-255-256-257-258-259-260-261-266-267-265. Each of the cycles in this combination includes four adiabatic compressions (251-252, 253-254, 255-256, and 257-258), each followed by a decreasing temperature heat reduction in the temperature interval from 135 to 30° C. (252-253, 254-255, 256-257, and 258-259). The four successive adiabatic compressions increase the pressure of the air or other gas in the system 715 from about 1 atm at 251 to a first pressure (e.g., 2-10 atm) at 252, a second pressure greater than the first pressure (e.g., and in the range of 5-50 atm) at 254, a third pressure greater than the first pressure (and optionally greater than the second pressure; e.g., in the range of 10-200 atm) at 256, and a fourth pressure greater than the third pressure (e.g., and in the range of 20-500 atm) at 258. The three adiabatic expansion processes 261-266, 260-267 and 267-265 are designed to match the heat capacity of air as the working fluid in the specified intervals to get an optimum match in heat transferred or exchanged within the temperature gradients. The pressure release processes decrease the pressure of the air or other gas in the system 715 from the fourth pressure to a fifth pressure less than the fourth pressure (e.g., and in the range of 5-100 atm) at 266 and 267, and from the fifth pressure to about 1 atm at 265. The process steps from 261 to 264 condense the air (or a chemical component thereof, or another gas such as methane, ethylene, nitrous oxide, argon, etc.) to liquid, with a final adiabatic expansion at 263-264.

The Rankine cycle 720 includes the cycle 270-271-272-273-274-270. In charging mode, the Rankine cycle 720 is a Rankine heat engine, powered for example by the heat absorbed from the sun and from the first and second Brayton cycles in the dual-cycle system 730, and the Brayton cycles in the dual-cycle system 730 work as Brayton heat pumps. In discharging mode, the first Rankine cycle 720 is stopped.

A trilateral cycle 740 includes the cycle 275-276-277-278-275. In discharging mode, the trilateral cycle 740, working as a trilateral heat pump, powers the first and the second Brayton cycles 730, which work as Brayton heat engines. In charging mode, the trilateral cycle 740 is stopped. Optionally, the trilateral cycle 740 can be used in charging mode to supplement the heat from the Brayton cycles 730 that is transferred to the Rankine heat engine cycle 720.

Internal heat transfers or exchanges occur from each of 252-253, 254-255, 256-257 and 258-259 to 271-272. From the decreasing temperature gradient 259-263, heat transfers or exchanges occur in three steps to the increasing temperature gradient 265-251: first, from heat rejection mechanism 259-261 to heat absorption mechanism 269-251; second, from heat rejection mechanism 261-262 to each of heat absorption mechanisms 268-269 and 266-267; and finally, from heat rejection mechanism 262-263 to heat absorption mechanism 265-268.

The total heat added or transferred to the system 715 ($Q_{in}$) from heat sources (e.g., external heat sources, as described herein) is represented by $Q_{272-273}+Q_{251}$ (the ambient heat of air brought into the system 715 for liquefaction) and optionally by $Q_{275-276}$. The total heat delivered or transferred from the system 715 ($Q_{out}$) to a heat sink (e.g., an external heat sink, as described herein) is $Q_{274-270}$. The mechanical power produced by and/or transferred within the system 715 is represented by $W_2=W_{273-274}+W_{260-267}+W_{267-265}+W_{261-266}+W_{263-264}$, and optionally $W_{278-275}$. The total mechanical work absorbed by or input to the system 715 is represented by $W_1=W_{270-271}+W_{251-252}+W_{253-254}+W_{255-256}+W_{257-258}$ and optionally $W_{276-277}$. The total mechanical power delivered by or from the system 715 ($W_{out}$) is $W_2-W_1$.

A discharging mode of the system 715 can be entered by reversing the first and second Brayton cycles 730 (in which case they operate as heat engines), stopping the Rankine heat engine cycle 720, and starting the trilateral heat pump cycle 740. In the discharging mode, the energy in the stored liquid air can be released through expanders and/or turbines, and recovered (for example, as electricity) during the time when $Q_{in}$ to the system 715 is not sufficient to liquefy air and/or meet the mechanical power demand. On the other hand, when the energy in the stored liquid air (or other liquefied gases) is not needed for the foreseeable future, and additional liquefied air/gas is expected to be made, the liquefied air/gas(es) can be recovered and sold in the market (e.g., as a coolant).

In discharging mode, the heat added or transferred to the system 715 ($Q_{in}$) is represented by $Q_{275-276}$, the heat delivered or transferred from the system 715 ($Q_{out}$) is represented by $Q_{251}$ (the heat of the stored air ejected out from the system), the mechanical work performed by and/or transferred within the system 715 ($W_1$) is represented by $W_2=W_{252-251}+W_{254-253}+W_{256-255}+W_{258-257}+W_{275-278}$, and the mechanical work absorbed by or input to the system 715 ($W_2$) is represented by $W_1=W_{264-263}+W_{267-265}+W_{261-266}+W_{260-267}+W_{277-276}$. Thus, the total mechanical power delivered by or from the system 715 ($W_{out}$) in discharging mode is $W_2-W_1$.

As explained above, the system 715 of cycles in FIG. 21 has a charging mode of operation and a discharging mode of operation. Together, with internal heat transfers or exchanges omitted, and with the heat storage system included in the system 715, the charging mode and the discharging mode in sequence complete one thermodynamic cycle that approaches the efficiency of a Carnot cycle, with isothermal heat absorption from outside the system 715 in the discharging mode, and isothermal heat rejection to outside the system 715 in the charging mode.

Figure 22:
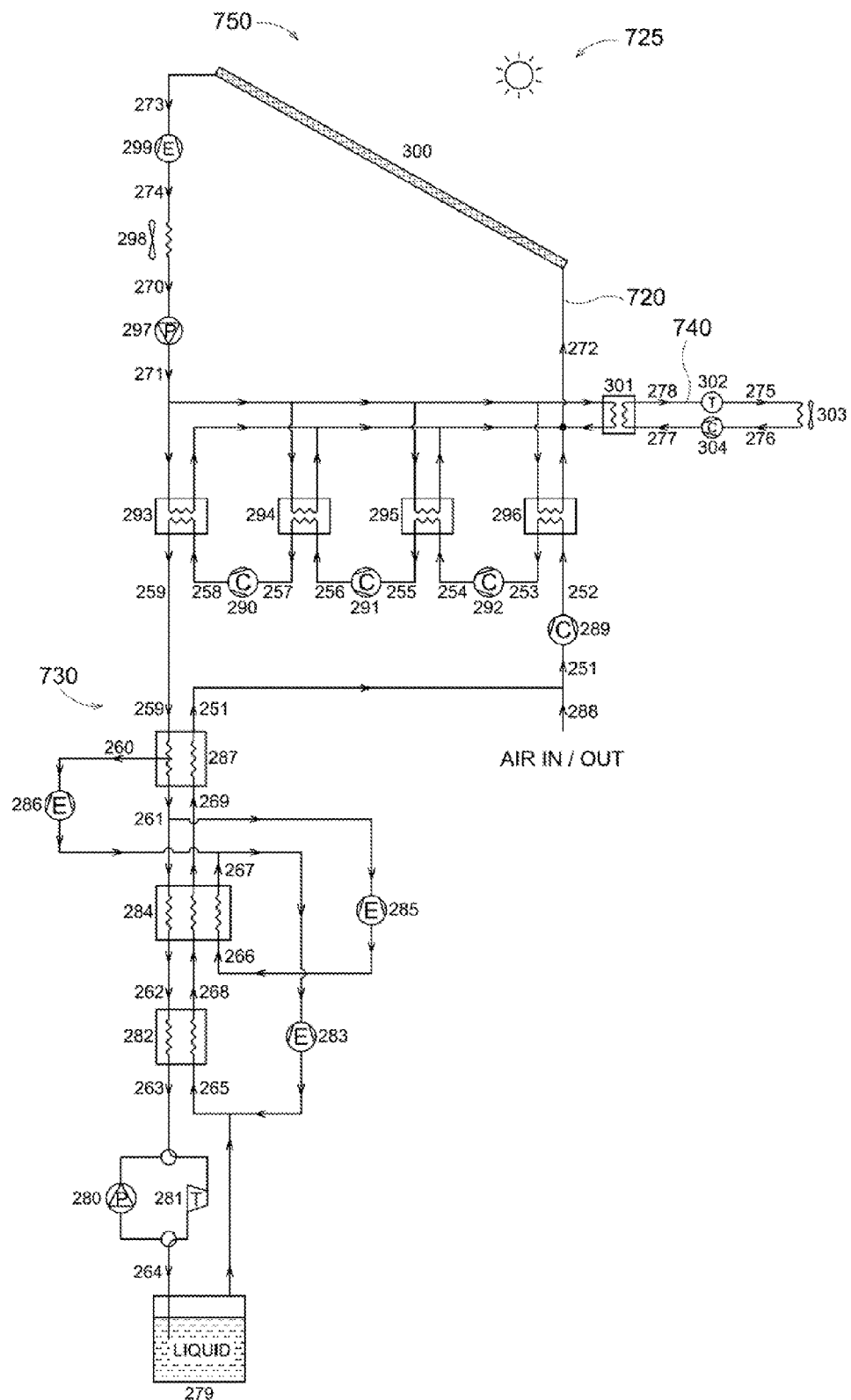
FIG. 22 is a layout of an exemplary machine and/or system with combined thermodynamic cycles according to the concepts and/or principles shown in FIG. 21.

FIG. 22 shows a layout of an exemplary machine and/or system 750 with combined thermodynamic cycles (e.g., heat pump[s] and heat engine[s]) according to the concepts and/or principles shown in FIG. 21. FIG. 22 demonstrates an example of a machine/system 750 including four combined cycles, where a Brayton heat pump 730 (comprising or representing two cooperating Brayton heat pump cycles) works together with a Rankine heat engine 720 and a trilateral heat pump 740. In FIG. 22, the system 750 is operating in a charging mode, and the (combined) Brayton heat pump 730 produces liquid air (in storage vessel or tank 279) for low temperature, high energy, and/or high capacity storage.

In charging mode, the Brayton heat pump(s) 730 and the Rankine heat engine 720 are operating, while the trilateral heat pump 740 is stopped. In discharging mode, the Brayton heat pump(s) 730 are running in reversed operation, the Rankine heat engine 720 is stopped, and the trilateral heat pump 740 is operating.

The basic components and processes of the Brayton heat pumps, the trilateral heat pump and the Rankine heat engine are as described above with regard to FIGS. 4 and 5. A first Brayton heat pump includes the cycle 265-268-269-251-252-253-254-255-256-257-258-259-260-267-265, with compressors 289, 292, 291 and 290, expanders 286 and 283, and heat exchangers 296, 295, 294, 293, 287, 284 and 282. A second Brayton heat pump includes the cycle 265-268-269-251-252-253-254-255-256-257-258-259-261-266-267-265, with compressors 289, 292, 291, 290, expanders 285 and 283, and heat exchangers 296, 295, 294, 293, 287, 284 and 282.

The flow of a medium (e.g., air) through the intake 288 and from 251 to 264, the compressors 289, 292, 291 and 290 and heat exchangers 296, 295, 294 and 293 release heat to the Rankine heat engine 720. Some of the medium remains in the Brayton heat pump(s) 730 to transport and release energy in the heat exchangers and the expanders, while a part of the medium releases thermal energy to the working fluid (e.g., air) by heat transfer or exchange in the heat exchangers 284 and 282 for condensation (e.g., of one or more chemical components of the air) to liquid. In the turbine 281, the energy storage medium (e.g., air) releases a final amount of heat and pressure before it is stored as liquid in the tank 279 for later use (e.g., in the discharge operation).

The Rankine heat engine 720 includes the cycle 270-271-272-273-274-270, with a pump 297, a solar collector 300, an expander 299, and heat exchangers 298, 293, 294, 295, 296 and 301. The trilateral heat pump 740 includes the cycle 275-276-277-278-275, with a compressor 304, a turbine 302, and heat exchangers 301 and 303.

In the charging mode, the main heat source in the example of FIG. 22 is the sun 725, energizing the Rankine heat engine 720 using the expander 299 to capture and transfer some of the energy to the compressors 289, 290, 291 and 292 and the pump 297. The total heat added or transferred to the system 750 is represented by $Q_{in}=Q_{300}$ (the heat absorbed by the working fluid in the heat engine 730 at the solar collector 300)+$Q_{288}$ (the ambient heat in the air taken in at point 251 in the Brayton heat pump[s] 730). The total heat delivered or transferred by or from the system 750 to a heat sink (e.g., an external heat sink, as described herein for example with respect to heat exchanger 471 [FIG. 20]) is represented by $Q_{out}=Q_{298}$. The mechanical work performed by and/or transferred within the system 750 is represented by $W_2=E_{299}+E_{286}+E_{283}+E_{285}+T_{281}$. The mechanical power absorbed in, performed on or transferred into the system 750 is represented by $W_1=P_{297}+C_{289}+C_{292}+C_{291}+C_{290}$.

In the discharging mode, the Brayton heat pump(s) 730 are reversed. As a result, the expanders are changed or switched to compressors, the compressors are changed or switched to expanders, and the turbine 281 is changed or switched to a pump to make the Brayton heat pump cycles 730 work as heat engines. The Rankine heat engine 720 is stopped, and the trilateral heat pump 740 is started. The system 750 of the combined heat engines and heat pump 730-740 now in operation then runs or operates using the liquid air stored in the tank 279 as a heat sink and the surrounding environment as a thermal energy source to produce the energy delivered by the expanders (e.g., that replace compressors 289, 292, 290 and 291) as electricity, for example.

In discharging mode, $Q_{in}$ is represented by $Q_{303}$, $Q_{out}$ is represented by $Q_{263-259}$ (the heat to vaporize and thus heat the liquid gas [air]). The difference in enthalpy in the retrieved energy storage medium (e.g., liquid air) from the tank 279 to the ambient air at 288 is captured and released in the system. In this example, $W_2=E_{289}+E_{292}+E_{291}+E_{290}+T_{302}$, and $W_1=P_{250}+C_{283}+C_{285}+C_{286}+C_{304}$. Thus, the total mechanical power delivered from the system 750 is represented by $W_{out}=W_2-W_1$.

Figure 23:
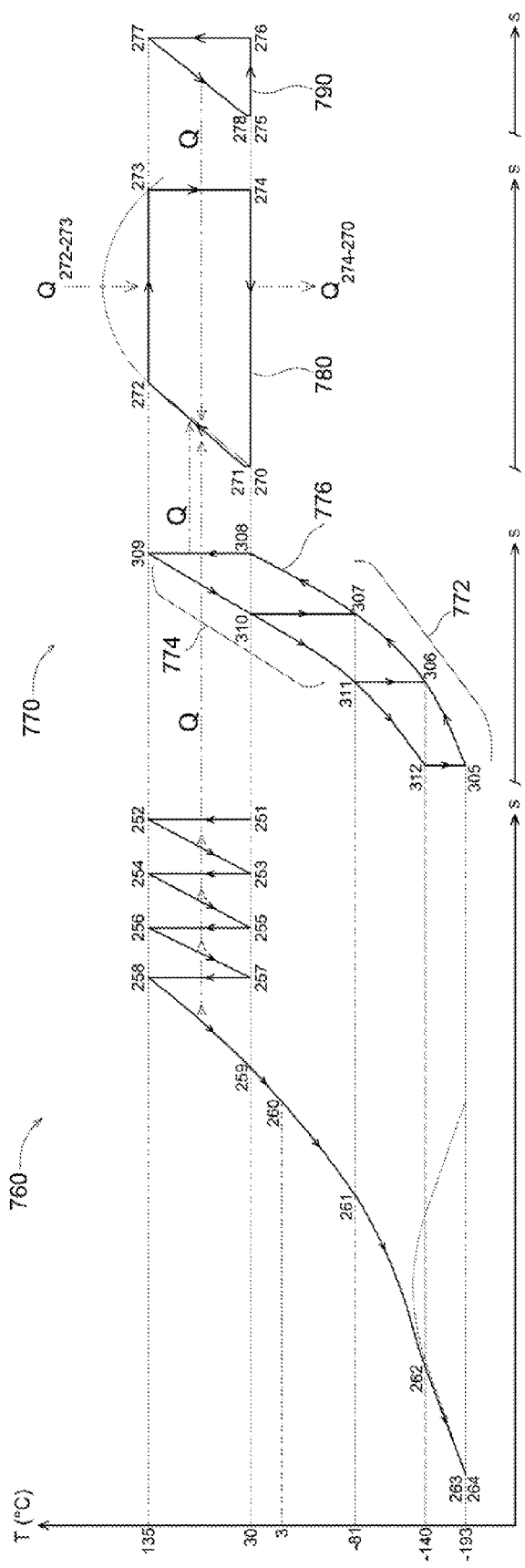
FIG. 23 is a TS diagram of a liquid air/gas production system with a Rankine cycle and pre-heating using a heat pump cycle in accordance with one or more embodiments of the present invention.

FIG. 23 shows a TS diagram 760 of an energy storage system that produces liquid air/gas, including a multiple Brayton cycle 770 and a heat pump cycle 780 for pre-heating. The diagram 760 in FIG. 23 shows a variation of the diagram 750 in FIG. 21. The first and second Brayton cycles in FIG. 21 are in one standalone cycle 770, which includes three Brayton cycles 772, 774 and 776. The remaining process steps in the first and second Brayton cycles 730 in FIG. 21 are described below as the process chain. Heat is transferred or exchanged through heat exchangers (see FIG. 24) between processes in the cycles 760, 770 and 780 and processes in the process chain. In discharging mode, the cycles 760, 770 and 790 transfer or exchange heat through respective heat exchangers.

The Rankine and trilateral cycles 780 and 790 in FIG. 23 have the same or substantially the same functions as the Rankine and trilateral cycles 730 and 740 in FIG. 21, and the differences for the Rankine and trilateral cycles 780 and 790 in FIG. 23 will be described below.

The basic processes included in the Brayton, Rankine, and trilateral cycles are as described in FIGS. 1 and 2. The Rankine heat engine cycle 780 in FIG. 23 is described with regard to the Rankine heat engine cycle 730 in FIG. 21. The trilateral heat pump cycle 790 in FIG. 23 is described with regard to the trilateral heat pump cycle 740 in FIG. 21.

The process chain includes and is represented by the sequence 251-252-253-254-255-256-257-258-259-260-261-262-263-264 in the liquid air/gas production diagram 760. The process chain is an open loop that in charging mode includes an air or gas input at 251 and a liquid air/gas output at 264. In discharging mode, the process chain operates in the reverse direction, and the liquid gas has an input at 264 and an output (e.g., as air or gas-phase material) at 251.

The first Brayton cycle 772 includes the cycle 305-306-307-308-309-310-311-312-305. The cycle 772 operates as a heat pump in charging mode and as a heat engine in discharging mode. The second Brayton cycle 774 includes the cycle 306-307-308-309-310-311-306. The cycle 774 operates as a heat pump in charging mode and as a heat engine in discharging mode. The third Brayton cycle 776 includes the cycle 307-308-309-310-307. The cycle 776 operates as a heat pump in charging mode and as a heat engine in discharging mode.

From the decreasing temperature gradient 259-263 in the gas liquefaction process 760, heat transfer or exchange occurs in three steps to the increasing temperature gradient 305-308 in the cycle 770 and/or first Brayton cycle 772: from 259-261 to 307-308, from 261-262 to 306-307, and finally from 262-263 to 305-306. Heat transfers or exchanges also occur from 309-310 in the first, second and third Brayton cycles 772, 774 and 776 to 271-272 in the Rankine cycle 780, and internally within the cycle 770 from 310-311 in the first and second Brayton cycles 772 and 774 to 307-308 in the first, second and third Brayton cycles 772, 774 and 776, and from 311-312 in the first Brayton cycle 772 to 306-307 in the first and second Brayton cycles 772 and 774.

The total heat added or transferred to the system 760 ($Q_{in}$) from heat sources (e.g., external heat sources, as described herein) is the same or substantially the same as in FIG. 21, and is represented by $Q_{272-273}+Q_{251}$ (the ambient heat of air brought into the system 760 for liquefaction), and optionally, $Q_{275-276}$. The total heat delivered or transferred from the system 760 ($Q_{out}$) to a heat sink (e.g., an external heat sink, as described herein) is the same or substantially the same as in FIG. 21, $Q_{274-270}$. The total mechanical work performed by and/or transferred within the system is represented by $W_2=W_{273-274}+W_{310-307}+W_{311-306}+W_{312-305}+W_{263-264}$, and optionally, $Q_{278-275}$. The total mechanical work absorbed by and/or added to the system is represented by $(W_1)=W_{270-271}+W_{251-252}+W_{253-254}+W_{255-256}+W_{257-258}+W_{308-309}$, and optionally, $Q_{276-277}$. The total mechanical power delivered by or from the system ($W_{out}$) is $W_2-W_1$.

A discharging mode of the system can be entered by reversing the process chain flow and the first, second and third Brayton cycles 772, 774 and 776, and making them operate as heat engines. The Rankine heat engine cycle 780 is stopped, and the trilateral heat pump cycle 790 is started. The energy in the stored in the liquid air or gas can then be released through expanders and recovered (for example, as electricity) during the time when the $Q_{in}$ to the system is not sufficient to liquefy air and/or meet the mechanical power demand. On the other hand, when the energy in the stored liquid air (or other liquefied gases) is not needed, and additional liquefied air/gas is expected to be made, the liquefied air/gas(es) can be recovered and sold in the market.

In discharging mode, the heat added or transferred to the system ($Q_{in}$) is represented by $Q_{275-276}$, the heat delivered or transferred from the system ($Q_{out}$) is represented by $Q_{251}$ (the heat of the stored air ejected out from the system). The mechanical power produced by and/or transferred within the system is represented by $W_2 = W_{252-251} + W_{254-253} + W_{256-255} + W_{258-257} + W_{278-275} + W_{309-308}$, and the mechanical work absorbed by or added to the system is represented by $W_1 = W_{264-263} + W_{305-312} + W_{306-311} + W_{307-310} + W_{276-277}$.
Thus, the total mechanical power delivered by or from the system ($W_{out}$) in discharging mode is $W_2 - W_1$.

Seen from the outside in charging mode, with internal heat transfers or exchanges omitted, the system of combined cycles 760-780 behaves like a single thermodynamic cycle with one isothermal heat source and one isothermal heat sink, and optionally, an additional isothermal heat source. In discharging mode, with internal heat transfers or exchanges omitted, the system of combined cycles 760-780 behaves like a single thermodynamic cycle with one isothermal heat source and one intermediary heat sink.

Figure 24:
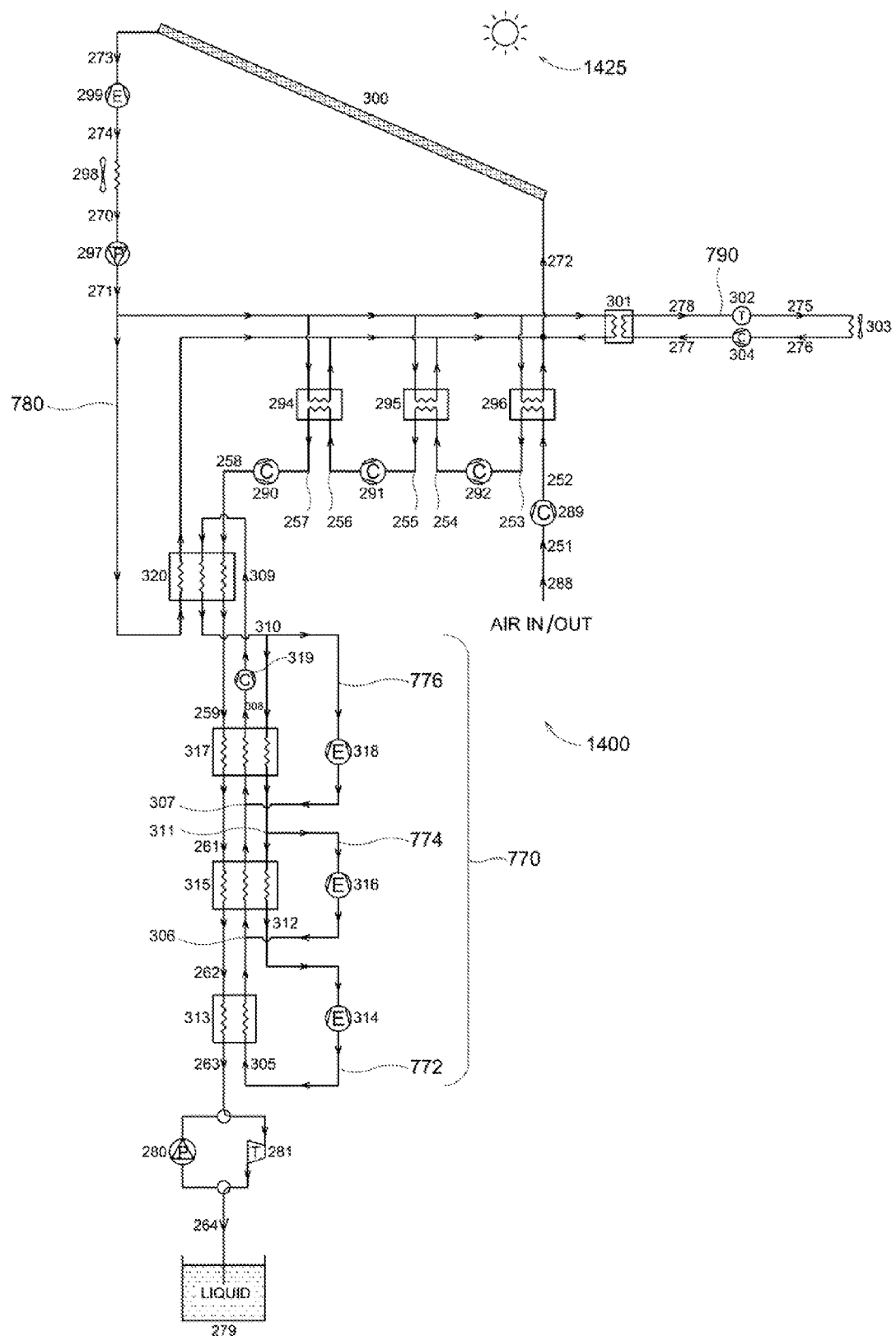
FIG. 24 is a layout of an exemplary machine and/or system with combined thermodynamic cycles according to the concepts and/or principles shown in FIG. 23.

FIG. 24 shows a layout of an exemplary machine and/or system 1400 with combined thermodynamic cycles according to the concepts and/or principles shown in FIG. 23. FIG. 24 demonstrates an exemplary variation of the system 750 in FIG. 22. In FIG. 22, the Brayton heat pump(s) is/are integrated with the process chain. In FIG. 24, the Brayton heat pump(s) 772, 774 and 776 are separate from the process chain, but included within one combined cycle 770. The open gas liquefaction cycle 760 with components and processing in FIG. 24 are described herein as the process chain. Heat is transferred or exchanged through heat exchangers in the heat pump(s)/heat engine(s) and by processes in the process chain. The Rankine heat engine and trilateral heat pump in FIG. 24 have the same or substantially the same structures and functions as in FIG. 22.

In FIG. 24, the system 1400 operates in a charging mode, and the combined cycles produce liquid air/gas for low temperature, high energy, and/or high capacity storage. In charging mode, all cycles are running except for the trilateral heat pump 790, which is stopped. If additional heat to the Rankine heat engine 780 is needed or desired, optionally the trilateral heat pump 790 can also be running. In discharging mode, the process chain and the Brayton heat pump(s) 770 are operating in reverse, the Rankine heat engine 780 is stopped, and the trilateral heat pump 790 is operating.

The basic components and processes of the Brayton heat pump(s) and engines, the Rankine heat engine and the trilateral heat pump are as described in FIGS. 4 and 5. The Rankine heat engine 780 in FIG. 24 is or is substantially as described for the Rankine heat engine 720 in FIG. 22. The trilateral heat pump 790 in FIG. 24 is or is substantially as described for the trilateral heat pump 740 described in FIG. 22. The gas liquefaction process chain includes the sequence 288-251-252-253-254-255-256-257-258-259-261-262-263-264, with compressors 289, 292, 291 and 290, turbine 281, heat exchangers 296, 295, 294, 320, 317, 315 and 313, and a liquid air tank 279. A first Brayton heat pump 772 includes the cycle 305-306-307-308-309-310-311-312-305, with compressor 319, expander 314, and heat exchangers 313, 315, 317 and 320. A second Brayton heat pump 774 includes the cycle 306-307-308-309-310-311-306, with compressor 319, expander 316, and heat exchangers 315, 317 and 320. A third Brayton heat pump 776 includes the cycle 307-308-309-310-307, with compressor 319, expander 318, and heat exchangers 317 and 320.

In the charging mode, the main heat source in the example of FIG. 24 is the sun 1425, energizing the Rankine heat engine 780 to produce and transfer energy using the expander 299 to the compressors 289-292 and the pump 297. The total heat added or transferred to the system is represented by $Q_{in} = Q_{300}$ (the heat absorbed by the working fluid in the Rankine heat engine 780 at the solar collector 300) + $Q_{288}$ (the ambient heat in the air taken in at point(s) 288 and/or 251 in the process chain). Optionally, $Q_{303}$ can be added to the system 1400 when heat in addition to that from the gradient heat transfer to the Rankine heat engine 780 is needed or desired. The total heat delivered or transferred by or from the system to a heat sink (e.g., an external heat sink, as described herein) is represented by $Q_{out} = Q_{298}$. The mechanical work performed by and/or transferred within the system 1400 is represented by $W_2 = E_{299} + E_{314} + E_{316} + E_{318} + T_{281}$, and optionally, $T_{302}$. The mechanical power absorbed in, performed on or transferred into the system 1400 is represented by $W_1 = P_{297} + C_{289} + C_{292} + C_{291} + C_{290} + C_{319}$, and optionally $C_{304}$.

In the discharging mode, the process chain and the Brayton heat pump(s) 770 are reversed. As a result, the expanders are changed or switched to compressors, the compressors are changed or switched to expanders, and the turbine 281 is changed or switched to a pump to make the Brayton heat pump(s) 772, 774 and 776 work as heat engines. The Rankine heat pump 780 is stopped, and the trilateral heat engine 790 is started. The system of the combined heat engine(s) and heat pump(s) 770 and 790, along with the pump 280 now in operation runs or operates using the liquid air/gas stored in the tank 279 and the surrounding environment as thermal energy sources to produce the energy delivered by the expanders in the process chain and in the Brayton heat engine 770, to generate electricity, for example.

In discharging mode, $Q_{in}$ is represented by $Q_{303}$, $Q_{out}$ is represented by $Q_{263-259}$ (the heat to vaporize, and thus heat, the liquid gas [air]). The mechanical work performed by and/or transferred within the system is represented by $W_2 = E_{289} + E_{292} + E_{291} + E_{290} + E_{319} + T_{302}$. The mechanical power absorbed in, performed on or transferred into the system 1400 is represented by $W_1 = P_{250} + C_{314} + C_{316} + C_{318} + C_{304}$. Thus, the total mechanical power delivered from the system is represented by $W_{out} = W_2 - W_1$.

Figure 25:
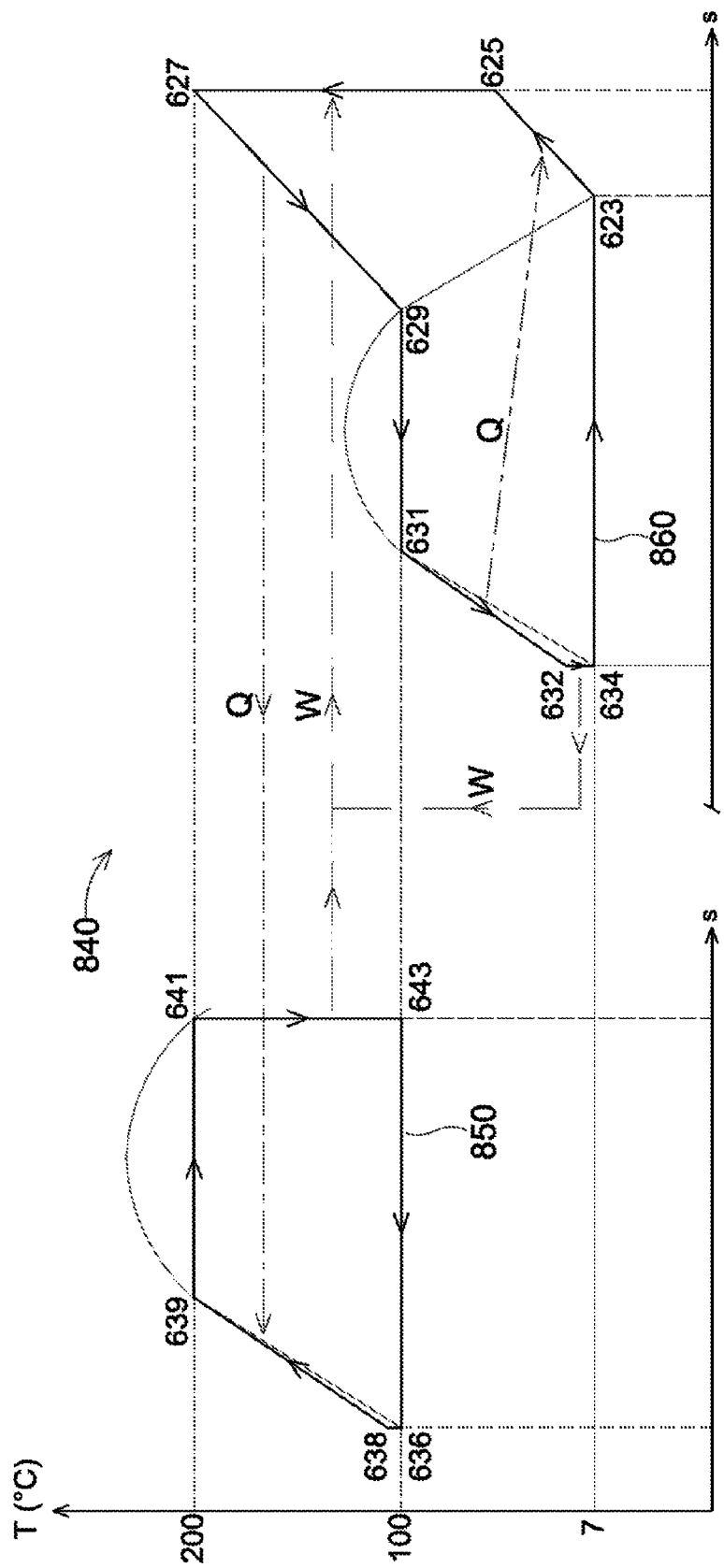
FIG. 25 is a TS diagram of an exemplary system with internal gradient heat exchanges, comprising a Rankine heat engine cycle with an isothermal heat transfer from an external heat source and an isothermal heat transfer to an external heat sink, and a Rankine heat pump cycle with isothermal heat exchanges with an external heat source and an external heat sink, and with internal gradient heat exchanges with the Rankine heat engine cycle and within the Rankine heat pump cycle, in accordance with one or more embodiments of the present invention.

Exemplary Combined Rankine-Vapor Compression or Rankine-Trilateral Systems with Internal Heat Transfers and Mechanical Work Transformation and/or Transfers FIG. 25 shows a TS diagram 840 of an exemplary system with internal gradient heat transfers or exchanges, comprising a Rankine heat engine cycle 850 with an isothermal heat transfer from an external heat source and an isothermal heat transfer to an external heat sink, and a vapor compression heat pump cycle 860 with an isothermal heat transfer from an external heat source and an isothermal heat transfer to an external heat sink, and with internal gradient heat transfers to or heat exchanges with the Rankine heat engine cycle 850 and within the vapor compression heat pump cycle 860. The diagram 840 shows the combined Rankine cycle 850 and the vapor compression cycle 860 working together. The system can be used to retrieve, collect or store energy from the sun (as one example), or from other heat sources (e.g., within operating temperature limits).

The basic processes in the Rankine cycle 850 and the vapor compression cycle 860 are as described in FIG. 1. The Rankine heat engine cycle 850 includes the cycle 636-638-639-641-643-636. The vapor compression heat pump cycle 860 includes the cycle 623-625-627-629-631-632-634-623. Internal heat transfers occur from the gradient 627-629 in the vapor compression heat pump cycle 860 to the gradient 638-639 in the heat engine cycle 850, and within the heat pump cycle 860 from the gradient 631-632 to the gradient 623-625. While the Rankine heat engine cycle 850 is shown using $H_2O$ as a working fluid, the Rankine heat pump cycle 860 is shown using $NH_3$ as a working fluid, and the temperatures along the y-axis of the diagram 840 are exemplary for $H_2O$ and/or $NH_3$ as working fluids, this aspect of the invention is not limited to $H_2O$ and/or $NH_3$ as working fluids, and can use other substances or mixtures thereof (as described herein and/or as otherwise used in the art).

The total heat added or transferred to the system ($Q_{in}$) from one or more heat sources (e.g., external heat sources, as described herein) is represented by $Q_{639-641}+Q_{634-623}$. The total heat delivered or transferred from the system ($Q_{out}$) to one or more heat sinks (e.g., external heat sinks, as described herein) is represented by $Q_{643-636}+Q_{629-631}$. The total mechanical work performed by and/or transferred within the system is represented by $W_2=W_{641-643}+W_{632-634}$. The total mechanical work absorbed by or input to the system is represented by $W_1=W_{625-627}+W_{636-638}$. In some implementations, the work $W_{641-643}+W_{632-634}$ (e.g., by expansions of the working fluid) can be used to drive a complementary process (e.g., a gas compression or a pumping process) at 625-627 in the vapor compression heat pump cycle 860. The total mechanical power delivered by or from the system ($W_{out}$) is $W_2-W_1$. Seen from the outside, with internal heat transfers or exchanges omitted, the system of combined cycles 850-860 behaves like a single thermodynamic cycle, with heat transfers or exchanges from two external isothermal heat sources and (when combined with a heat storage subsystem) one external intermediary isothermal heat sink.

Figure 26:
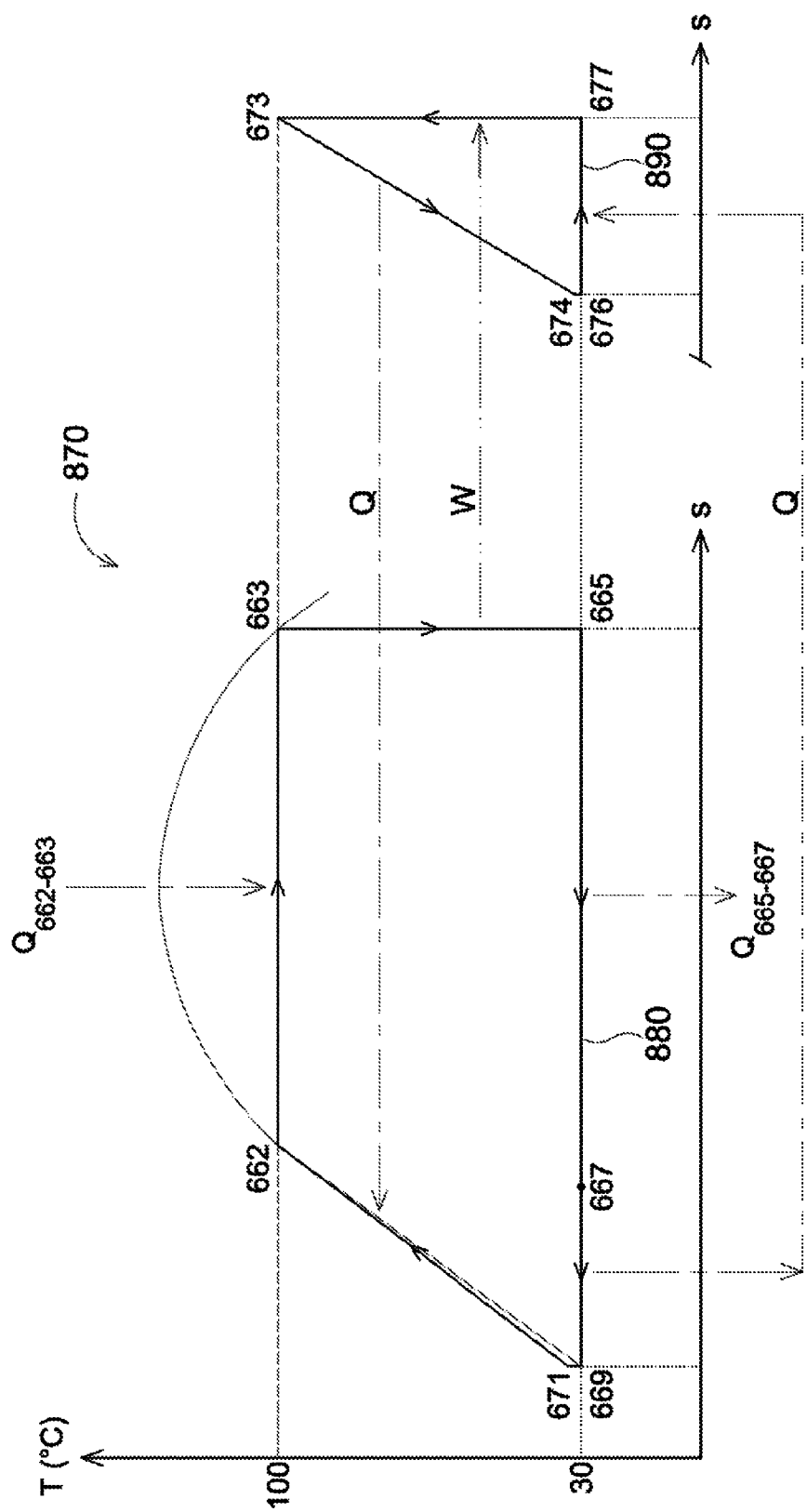
FIG. 26 is a TS diagram for an exemplary system with internal gradient and isothermal heat exchanges, comprising a Rankine heat engine cycle and a trilateral heat pump cycle, with heat transfers from an isothermal heat source and to an isothermal heat sink, in accordance with one or more embodiments of the present invention.

FIG. 26 shows a TS diagram 870 for an exemplary system with internal gradient and isothermal heat transfers or exchanges, comprising a Rankine heat engine cycle 880 and a trilateral heat pump cycle 890, with heat transfers from an isothermal heat source and to an isothermal heat sink. The diagram 870 shows a combined thermodynamic cycle with the Rankine and trilateral cycles 880 and 890 working together. The Rankine cycle 880 works as a heat engine, and the trilateral cycle 890 works as a heat pump. The system can be used as a discharging loop to retrieve stored energy from a heat storage system, to make electricity and/or heat homes or buildings, for example.

The basic processes in the Rankine and trilateral cycles are as described in FIG. 1. The Rankine heat engine cycle 880 includes the cycle 669-671-662-663-665-667-669. The trilateral heat pump cycle 890 includes the cycle 676-677-673-674-676. Internal heat transfers occur from the gradient 673-674 in the trilateral heat pump cycle 890 to the gradient 662-671 in the Rankine heat engine cycle 880, and from the isothermal condensation process 665-667 in the Rankine heat engine cycle 880 to the isothermal evaporation process 676-677 in the trilateral heat pump cycle 890. The total heat added or transferred to the system ($Q_{in}$) from one or more heat sources (e.g., an external heat source, as described herein) is represented by $Q_{662-663}$. The total heat delivered or transferred from the system ($Q_{out}$) to one or more heat sinks (e.g., an external heat sink) is represented by $Q_{667-669}$. The total mechanical work performed by and/or transferred within the system is represented by $W_2=W_{663-665}+W_{674-676}$. The total mechanical work absorbed by or input to the system is represented by $W_1=W_{677-673}+W_{669-671}$. In some implementations, the work $W_{663-665}$ (e.g., by expansions of the working fluid) can be used to drive a complementary process (e.g., a gas compression or a pumping process) at 677-673 in the trilateral heat pump cycle 890. The total mechanical power delivered by or from the system ($W_{out}$) is $W_2-W_1$. Seen from the outside, with internal heat transfers or exchanges omitted, the system of combined cycles 880-890 behaves like a Carnot cycle, with a heat transfer from an external isothermal heat source to an external isothermal heat sink. Such a process can dramatically improve efficiency of the energy transfer, and can approach an ideal Carnot cycle.

Figure 27:
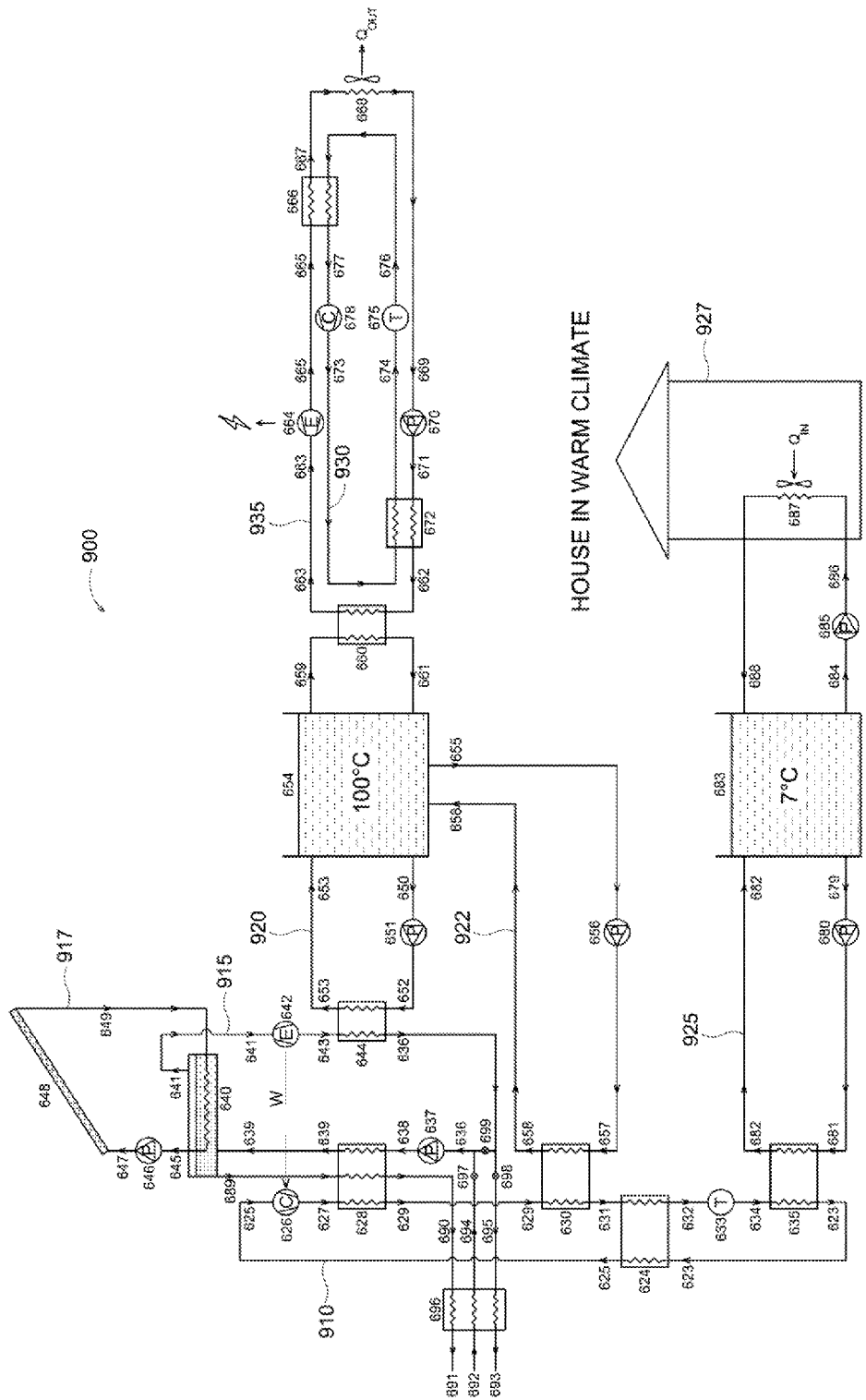
FIG. 27 is a layout of an exemplary system and/or machine with combined cycles in accordance with the concepts and/or principles shown in FIGS. 25 and 26.

Exemplary Combined Thermodynamic Cycle-Based Systems for Heating and Cooling, and/or Providing Electricity in Homes and Other Buildings FIG. 27 shows a layout of an exemplary system and/or machine 900 with combined heat pump(s) and heat engine(s) according to FIGS. 25 and 26. FIG. 27 shows an example of a combination of subsystems and/or machines in accordance with the concepts and/or principles shown in FIGS. 25 and 26. FIG. 27 shows an example of a system 900 in which four combined cycles can work together, utilize a common heat storage subsystem, and enable the delivery of both electricity and thermal control (e.g., cooling) of a living or work space in a warm environment. The Rankine-trilateral and Rankine-vapor compression cycles work in pairs and run in opposite directions. Each pair includes a trilateral or vapor compression heat pump and a Rankine heat engine. The basics of trilateral and vapor compression heat pumps and Rankine heat engines are described with regard to FIGS. 4 and 5.

The first pair is a Rankine heat engine and a vapor compression heat pump, and includes a vapor compression heat pump 910 that includes the cycle 623-625-627-629-631-632-634-623, heat exchangers 624, 628 and 630, a compressor 626, and a turbine 633. The matching Rankine heat engine 915 includes the cycle 636-638-639-641-643-636, heat exchangers 640, 644 and 628, an expander 642 and a pump 637. During the daytime, the solar panel or sunlight absorber/reflector 648 heats a working fluid in solar energy collection subsystem 917 and transfers the heat through the heat exchanger 640 to the first Rankine heat engine 915. The thermal energy transferred into the first Rankine heat engine 915 energizes the expander 642, and transfers or exchanges heat through heat exchanger 644 to or with the heat storage subsystem 920, which is ultimately stored in the hot fluid (e.g., water) tank 654. In the system 900, the tank 654 operates as an isothermal heat storage device. The mechanical energy from the expander 642 feeds the compressor 626 in the vapor compression heat pump 910, which pre-heats the working fluid (e.g., feed water) in the Rankine heat engine 915 through heat exchange in the heat exchanger 628. The fluid in the vapor compression heat pump 910 also transfers additional heat to the heat storage subsystem(s) through the heat exchanger 630 (which is connected to the hot fluid tank 654 in heat storage subsystem 922). The heat pump 910 transfers or exchanges heat internally in the heat exchanger 624, releases mechanical energy in the turbine 633, and absorbs heat from the cool storage subsystem 925 (which stores a working fluid such as water at a relatively low temperature in cool storage tank 683) through the heat exchanger 635. In the system 900, the tank 683 can also operate as an isothermal heat (or "coolness") storage device. The energy from the turbine 633 can be retrieved or used to operate machinery or a coil (e.g., to generate electricity), and the heat pump 910 cools the working fluid in the cool storage subsystem 925. The temperatures shown in the tanks 654 and 683 are exemplary and appropriate for water or brine as the working fluid(s), but the system 900 is not limited to such temperatures in the storage tanks 654 and 683.

The second Rankine-trilateral pair includes a trilateral heat pump 930, which includes the cycle 676-677-673-674-676, heat exchangers 666 and 672, a compressor 678, and a turbine 675. The matching heat engine 935 includes the cycle 669-671-662-663-665-667-669, heat exchangers 672, 660, 666 and 668, an expander 664, and a pump 670. The Rankine-trilateral pair is energized by the heat storage subsystem 920 through the heat exchanger 660. In one example, an additional pump may be present in the loop adjacent to the heat exchanger 660 (e.g., at 661). In the expander 664, thermodynamic energy is released and turned into mechanical energy by the expander that generates electricity as an energy output, for example. Most of the remaining heat in the Rankine heat engine 935 is transferred by the heat exchanger 666 to the heat pump cycle 930. The temperature of the working fluid in the heat pump cycle 930 increases after passing through the compressor 678, and the heat is transferred back to the heat engine 935 through the heat exchanger 672. Heat exchanger 668 in the heat engine 935 transfers heat to the environment, which acts as the combined Rankine-trilateral cycles' external heat sink. By using the intermediate heat storage subsystem 920 and cool storage subsystem 925, the system 900 can also operate during the night, and deliver the energy in the form of electricity and air conditioning (e.g., to house or building 927 through heat/cool exchanger 687).

FIG. 27 has also one extra feature that takes advantage of the ability of water (or other working fluid, such as brine or salt water) to vaporize. By turning the valves 697, 698 and 699 in the first Rankine heat engine 915, salt water can be pumped in to the system through an inlet 692 and the heat exchanger 696, and the water is then vaporized in the tank 640, and condensed in the heat exchanger 644. Fresh water can then be delivered through valve 698 and outlet 693. The concentration of salt in the water tank 640 will increase, but the salt water in the tank 640 can be drained (or pumped) from the system through the heat exchangers 628 and 696 at the same or substantially the same rate as new salt water entering into the system, minus that fresh (desalinated) water removed from the tank 640. The extra energy for getting fresh drinking water in this application is negligible, and can be neglected in calculations of energy in and energy out.

Figure 28:
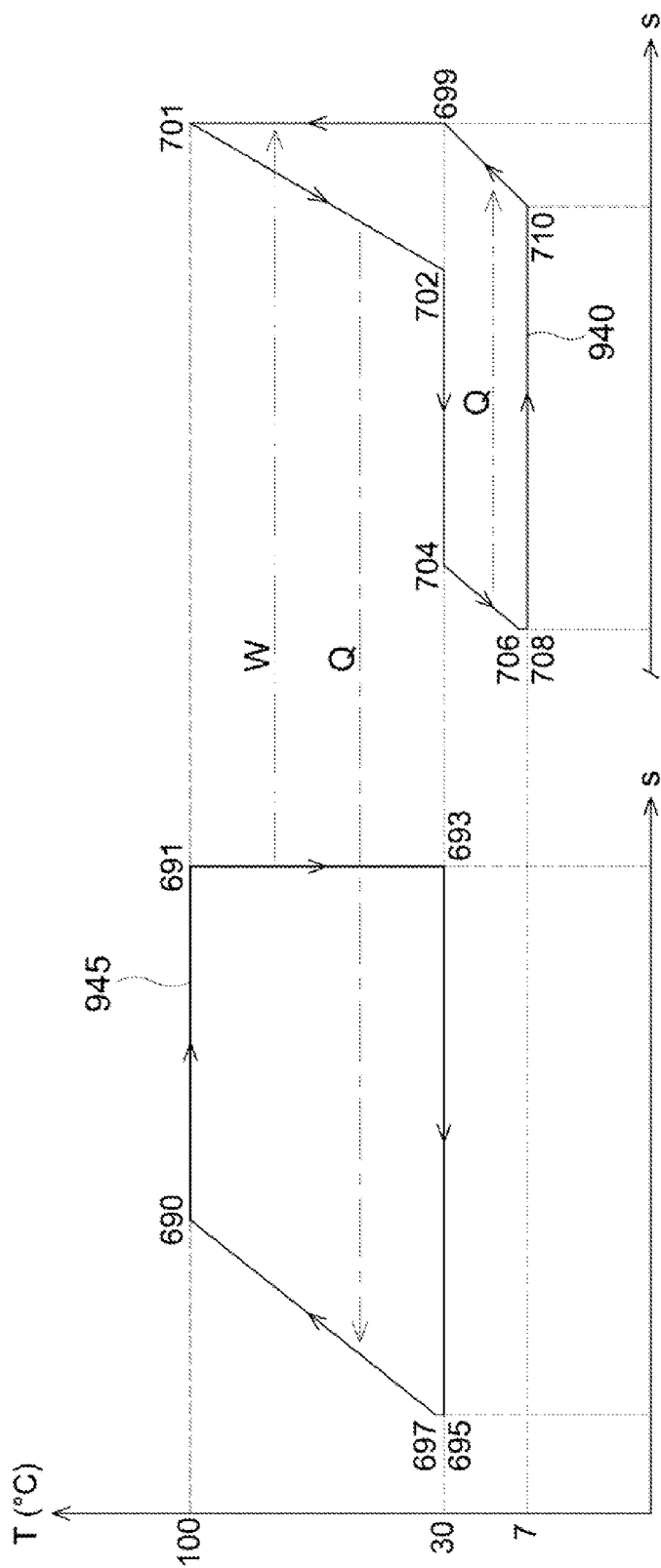
FIG. 28 is a TS diagram of an exemplary thermodynamic cycle with internal gradient heat exchanges, in accordance with one or more embodiments of the present invention.

FIG. 28 shows a TS diagram of an exemplary thermodynamic cycle with internal gradient heat transfers or exchanges, comprising a Rankine heat engine cycle 945 with an isothermal heat transfer from an external heat source and an isothermal heat transfer to an external heat sink, and a vapor compression heat pump cycle 940 with an isothermal heat transfer from an external heat source, an isothermal heat transfer to an external heat sink, and an internal gradient heat transfer or exchange. The diagram shows a combined cycle in which a Rankine heat pump cycle 945 works together with a vapor compression heat pump cycle 940. The system can be used to retrieve stored energy from a heat storage system, to make electricity and/or heat homes or buildings, for example, or from other heat sources (e.g., within operating temperature limits).

The basic processes in the Rankine cycle 945 and the vapor compression cycle 940 are as described with regard to FIG. 1. The Rankine heat engine cycle 945 includes the cycle 695-697-690-691-693-695. The vapor compression heat pump cycle 940 includes the cycle 710-699-701-702-704-706-708-710. Internal heat transfers or exchanges occur from the gradient 701-702 in the vapor compression heat pump cycle 940 to the gradient 697-690 in the Rankine heat engine cycle 945, and within the vapor compression heat pump cycle 940 from the gradient 704-706 to the gradient 710-699.

The total heat added or transferred to the system ($Q_{in}$) from one or more heat sources (e.g., external heat sources, as described herein) is represented by $Q_{690-691}+Q_{708-710}$. The total heat delivered or transferred from the system ($Q_{out}$) to one or more heat sinks (e.g., external heat sinks, as described herein) is represented by $Q_{693-695}+Q_{702-704}$. The total mechanical work performed by and/or transferred within the system is represented by $W_2=W_{691-693}+W_{706-708}$. The total mechanical work absorbed by or added to the system is represented by $W_1=W_{699-701}$ $W_{695-697}$. In some implementations, at least some of the work $W_{691-693}$ (e.g., by expansion of the working fluid in the Rankine heat engine cycle 945) can be used to drive a complementary process (e.g., a gas compression) at 699-701 in the vapor compression heat pump cycle 940. The total mechanical power delivered by or from the system ($W_{out}$) is $W_2-W_1$. Seen from the outside, with internal heat transfers or exchanges omitted, the system of combined cycles 940-945 behaves like a single thermodynamic cycle, with a first heat transfer from an external intermediary heat source (e.g., when combined with a heat storage subsystem), a second heat transfer from an isothermal heat source, and a heat transfer to an isothermal heat sink.

Figure 29:
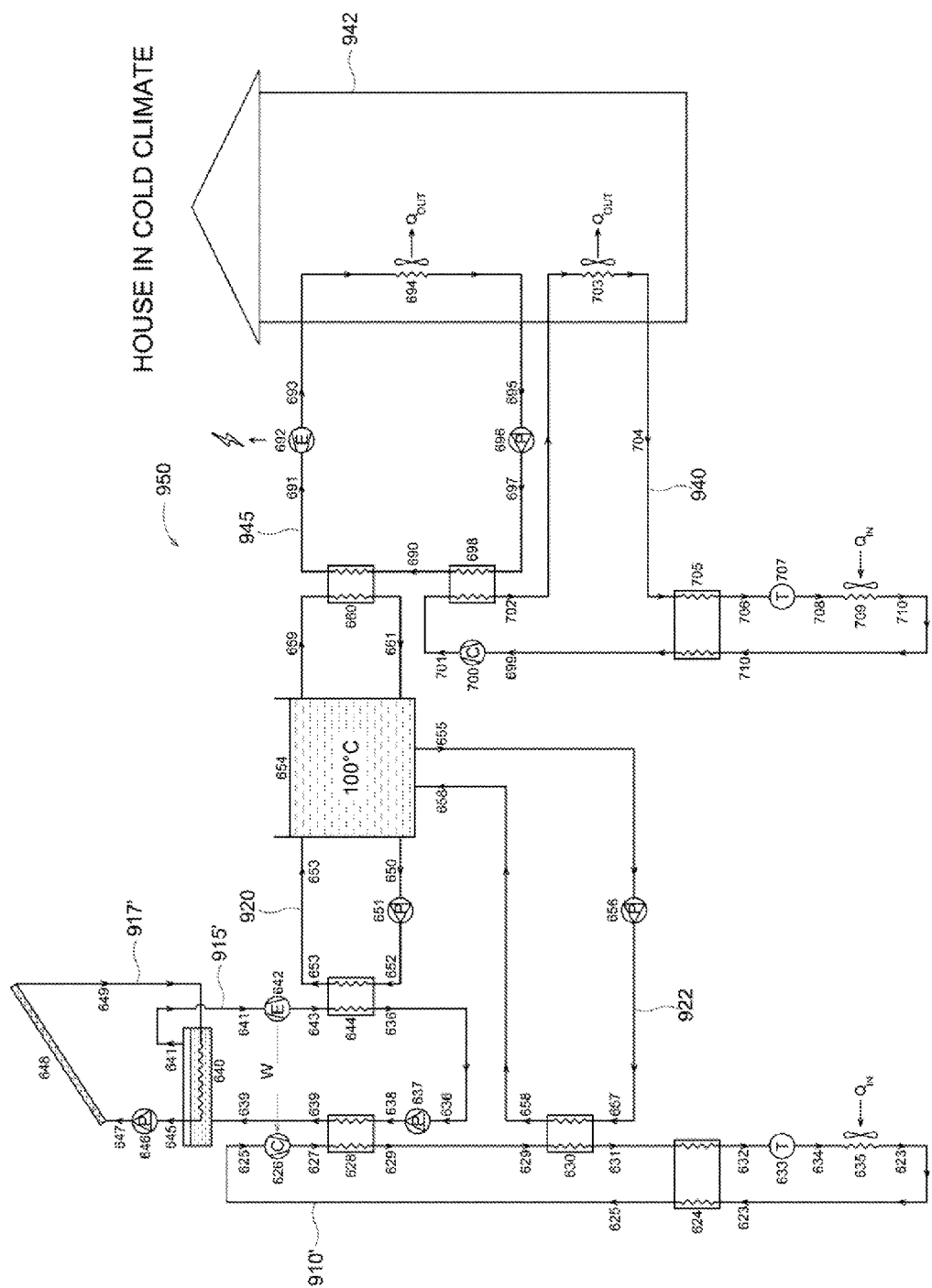
FIG. 29 is a layout of an exemplary machine or system with combined cycles in accordance with the concepts and/or principles shown in FIGS. 25 and 28.

FIG. 29 shows a layout of an exemplary machine or system 950 with combined cycles according to FIGS. 25 and 28. FIG. 29 shows an example of a combination of machines and/or systems similar to that in FIG. 27. The system 950 is an example showing two Rankine heat engines and two vapor compression heat pumps working together, utilizing a common heat storage subsystem 920-922 (dedicated components for the corresponding energy retrieval subsystem are not shown), and enabling delivery of both electricity and heat for powering and/or heating a living or work space 942 in a cold environment. The Rankine heat engines and vapor compression heat pumps work in pairs and run in opposite directions. Each pair includes one Rankine heat engine and one vapor compression heat pump. The basics of vapor compression heat pumps and Rankine heat engines are described with regard to FIGS. 4 and 5.

The first Rankine heat pump-vapor compression heat engine pair 910'-915' are substantially similar to the first Rankine pair 910-915 in FIG. 27. The vapor compression heat pump 910' includes the cycle 623-625-627-629-631-632-634-623, heat exchangers 624, 628 and 630, a compressor 626, and a turbine 633. The matching Rankine heat engine 915' includes the cycle 636-638-639-641-643-636, heat exchangers 640, 644 and 628, an expander 642, and a pump 637.

During the daytime, the solar panel/collector/reflector (e.g., sun absorber) 648 absorbs and transfer heat through the heat exchanger 640 to the Rankine heat engine 915', and thus, to the system 950. The thermal energy transferred into the first Rankine heat engine 915' energizes the expander 642, and transfers or exchanges heat through heat exchanger 644 to or with the heat storage subsystem 920, which is ultimately stored in the hot fluid (e.g., water) tank 654. In the system 950, the tank 654 operates as an isothermal heat storage device. The mechanical energy from the expander 642 feeds (or is transferred to) the compressor 626 in the first vapor compression heat pump 910', which pre-heats the working fluid (e.g., feed water) in the Rankine heat engine 915' through heat exchange in the heat exchanger 628. The fluid in the first Rankine heat pump 910' transfers additional heat to the heat storage subsystem(s) through the heat exchanger 630 (which is connected to the hot fluid tank 654 in heat storage subsystem 922). The heat pump 910' transfers or exchanges heat internally in the heat exchanger 624, and releases mechanical energy in the turbine 633. The energy from the turbine 633 can be retrieved or used to operate machinery or a coil (e.g., to generate electricity). The temperatures shown in the tank 654 is exemplary and appropriate for water or brine as the working fluid, but the system 950 is not limited to such temperatures in the storage tanks 654 and 683.

The second Rankine-vapor compression pair in FIG. 29 includes a second vapor compression heat pump 940 and a second Rankine heat engine 945. The second vapor compression heat pump 940 includes the cycle 710-699-701-702-704-706-708-710, heat exchangers 705, 709, 698 and 703, a compressor 700, and a turbine 707. The matching Rankine heat engine 945 includes the cycle 695-697-690-691-693-695, heat exchangers 660, 694 and 698, an expander 692, and a pump 696. The second Rankine heat engine—vapor compression heat pump pair 940-945 is energized by the heat storage subsystem 920 through the heat exchanger 660. In the expander 692, thermodynamic energy is released and turned into mechanical energy by the expander that generates electricity as an energy output, for example. Heat from the second Rankine heat engine 945 is transferred through the heat exchanger 694 to the building 942 (e.g., a house, office building, factory, warehouse, etc.), which acts as a heat sink. The pump 696 keeps the working fluid (e.g., water) flowing, and as the fluid passes through the heat exchanger 698, the temperature increases (e.g., the working fluid in the heat engine 945 is energized by the heat pump 940). The cycle starts over again with the heat exchanger 660.

The second vapor compression heat pump 940 transfers (e.g., receives) heat through the heat exchanger 709 from an external heat source (e.g., the outdoor environment), then transfers or exchanges heat internally through the heat exchanger 705. The temperature of the working fluid increases as it passes through the compressor 700, then heat from the second vapor compression heat pump 940 is first transferred or exchanged to the heat engine 945 through heat exchanger 698, and then to the building (e.g., house) as a heat sink through heat exchanger 703. Heat is also transferred or exchanged internally in the heat exchanger 705, and finally, mechanical energy is released by the turbine 707 to complete the cycle. By using the heat storage system 920, the system 950 can operate during the night and deliver energy in the form of electricity and heating for houses and other buildings/enclosed spaces.

Figure 30:
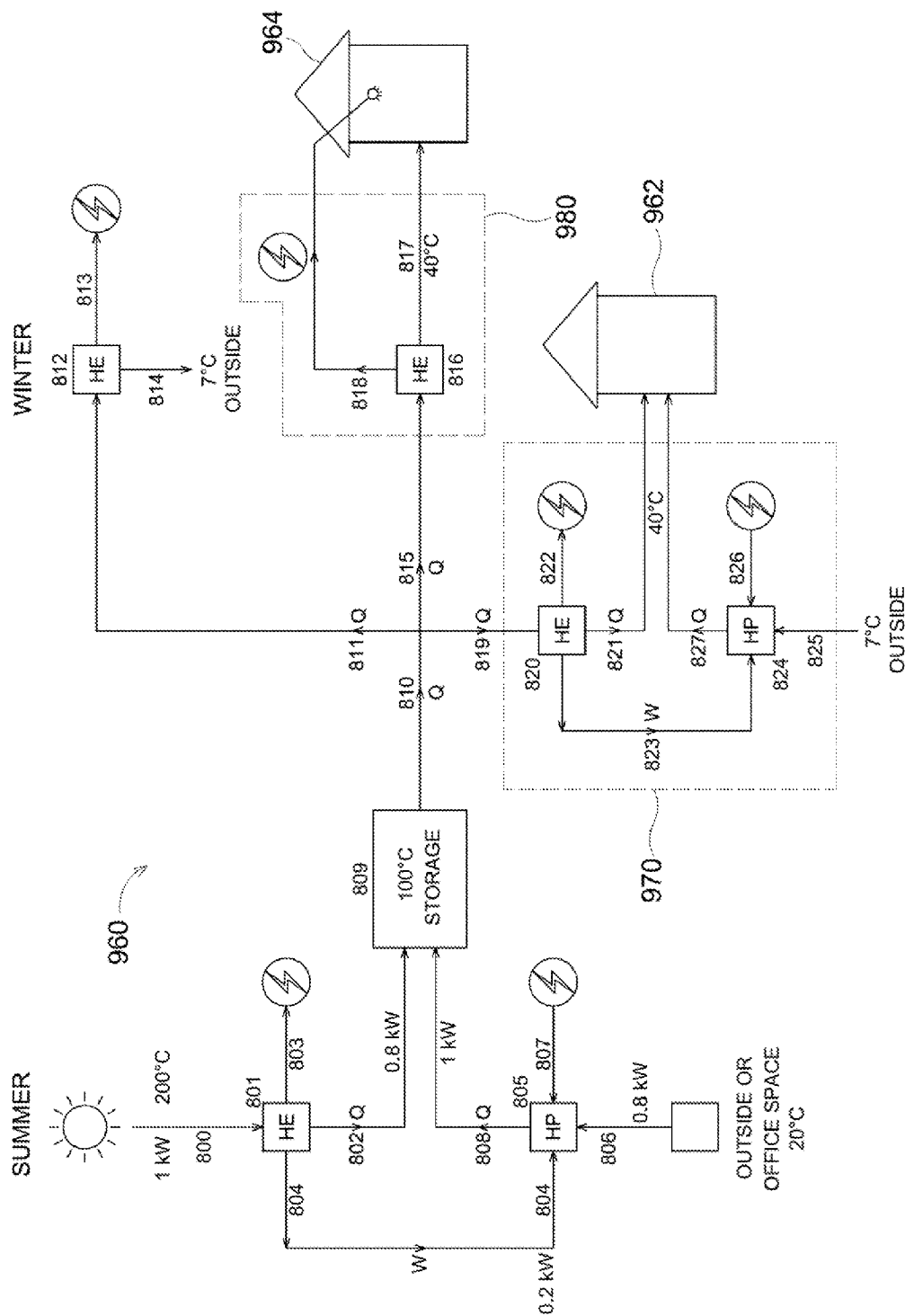
FIG. 30 is a diagram showing various combinations of systems that utilize the principle(s) and innovations of the present disclosure.

FIG. 30 shows a high level diagram of combinations of such systems that utilize the principle(s) and innovations of the present disclosure. FIG. 30 shows examples of thermodynamic heat pumps and heat engines and combinations thereof utilized in different situations when energy like heat, cold (e.g., air conditioning, gas liquefaction, ice-making, etc.), or electricity is desired or demanded.

In the system 960 of FIG. 30, solar energy is collected at 800 and used by a first heat engine 801 (e.g., a combined Rankine heat engine and trilateral heat pump) to produce electricity (or perform other work using mechanical energy captured or transformed in the heat engine 801) at 803, transfer heat to and/or perform work on a first heat pump 805 (e.g., a combined vapor compression heat pump and trilateral heat engine), and heat a medium (e.g., water or brine) in a heat storage subsystem 809 through a heat exchange mechanism 802. The heat pump 805 can also absorb heat from a heat source (e.g., the external environment, which can have, but is not limited to, a relatively high temperature of about 20° C. or greater, or an enclosed environment with relatively high heat generation, such as an office during the daytime or a computer room or other enclosed space housing operational electrical equipment) at 806, receive electrical power (e.g., from another component in the system 960 or from another source) at 807, and transfer heat to the storage medium (e.g., water or brine) in the heat storage subsystem 809 through a second heat exchange mechanism 808.

The heat storage subsystem 809 can transfer thermal energy to or exchange thermal energy with one or more of three heat engines in separate and/or different exemplary thermodynamic subsystems. In a first exemplary subsystem 970, a second heat engine 820 (e.g., a combined Rankine heat engine and trilateral heat pump) receives heat from the heat storage subsystem 809 via one or more heat exchange mechanisms 810 and/or 819, and transfers heat to, exchanges heat with, and/or performs work 823 on a second heat pump 824 (e.g., a combined vapor compression heat pump and trilateral heat engine). The second heat engine 820 also transfers heat through a third heat exchange mechanism 821 to a first building 962 (e.g., a home, office building, factory, warehouse, etc.). The second heat engine 820 can also generate electricity 822 (or perform other work using mechanical energy captured or transformed in the second heat engine 820). The second heat pump 824 can absorb heat from a heat source 825 (e.g., the external environment, which in the winter, can have, but is not limited to, a relatively low temperature of about 7° C.), receive electrical power (e.g., from another component in the system 960 or from another source) at 826, and transfer heat to the first building 962 through a fourth heat exchange mechanism 827. The second heat engine 820 and the second heat pump 824 can transfer heat from a working fluid or energy storage medium having a temperature higher than that of the external source at 825 (for example, about 40° C.), but the heat engine 820, heat pump 824, and working fluid(s) therein are not limited to this temperature.

The heat storage subsystem 809 can additionally or alternatively transfer thermal energy to or exchange thermal energy with a second exemplary subsystem 980, including a third heat engine 816 (e.g., including a combined Rankine heat pump and trilateral heat pump), which receives heat 815. The third heat engine 816 generate electricity 818 to be used in the second building 964. The third heat engine 816 transfers heat through a fifth heat exchange mechanism 817 to a second building 964 (e.g., a home, office building, factory, warehouse, etc.).

In a third exemplary subsystem, the heat storage subsystem 809 can additionally or alternatively transfer thermal energy to or exchange thermal energy with a fourth heat engine 812 (e.g., a combined Rankine heat engine and trilateral heat pump), which receives heat 811 from the heat storage subsystem 809. The fourth heat engine 812 transfers heat through a sixth heat exchange mechanism 814 to a heat sink (e.g., the external environment, which in the winter, can have, but is not limited to, a relatively low temperature of about 7° C.) and generates electricity, which can be used elsewhere in the system 960, stored (e.g., in one or more batteries), or sold on the grid.

Collecting heat from the sun and storing the thermal energy in the form of hot water (for example) provides highly effective systems and/or methods for supporting energy needs in homes, industries and various other establishments in an environmentally friendly manner. By heating the water or other storage medium when the sun is available, and using the hot water or other working fluid to retrieve and/or convert energy at night or other time when the sun is not available, the availability of energy for producing electricity, heat or cold is not limited to the time of the day or the time of year, assuming the dimensions of the components included in the system are sufficient to store enough thermal energy to drive and/or supply the demanded or desired energy.

This system 960 has several advantages. Compared to a system with a gradient heat transfer or exchange, the system with isothermal heat transfers or exchanges needs only one heat storage tank, whereas gradient heat transfer or exchange systems generally need at least two tanks. Alternatively or additionally, one may use the relative temperature difference between the two tanks (e.g., in a gradient heat transfer or exchange system) to drive mechanical and/or thermodynamic operations or processes (e.g., according to conventional methods of doing so). The efficiency of the system 960 is also higher than gradient heat transfer or exchange systems because it is not dependent on any non-linear heat capacity of the working fluid (as often occurs in gradient-based heat transfer or exchange processes).

Figure 32:
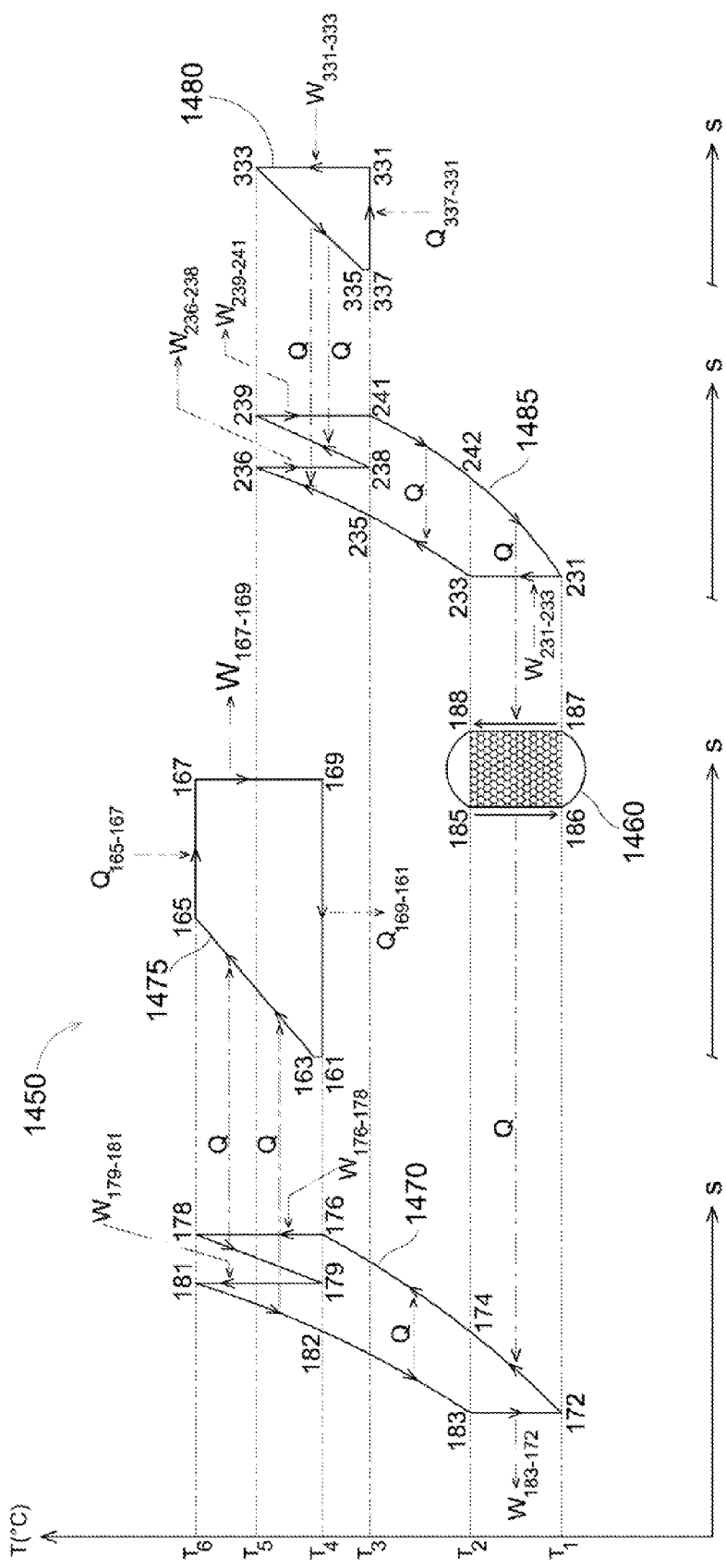
FIG. 32 includes TS diagrams of an exemplary heat transfer and energy storage and retrieval system with internal gradient and external isothermal heat exchanges, in accordance with one or more embodiments of the present invention.
Figure 33:
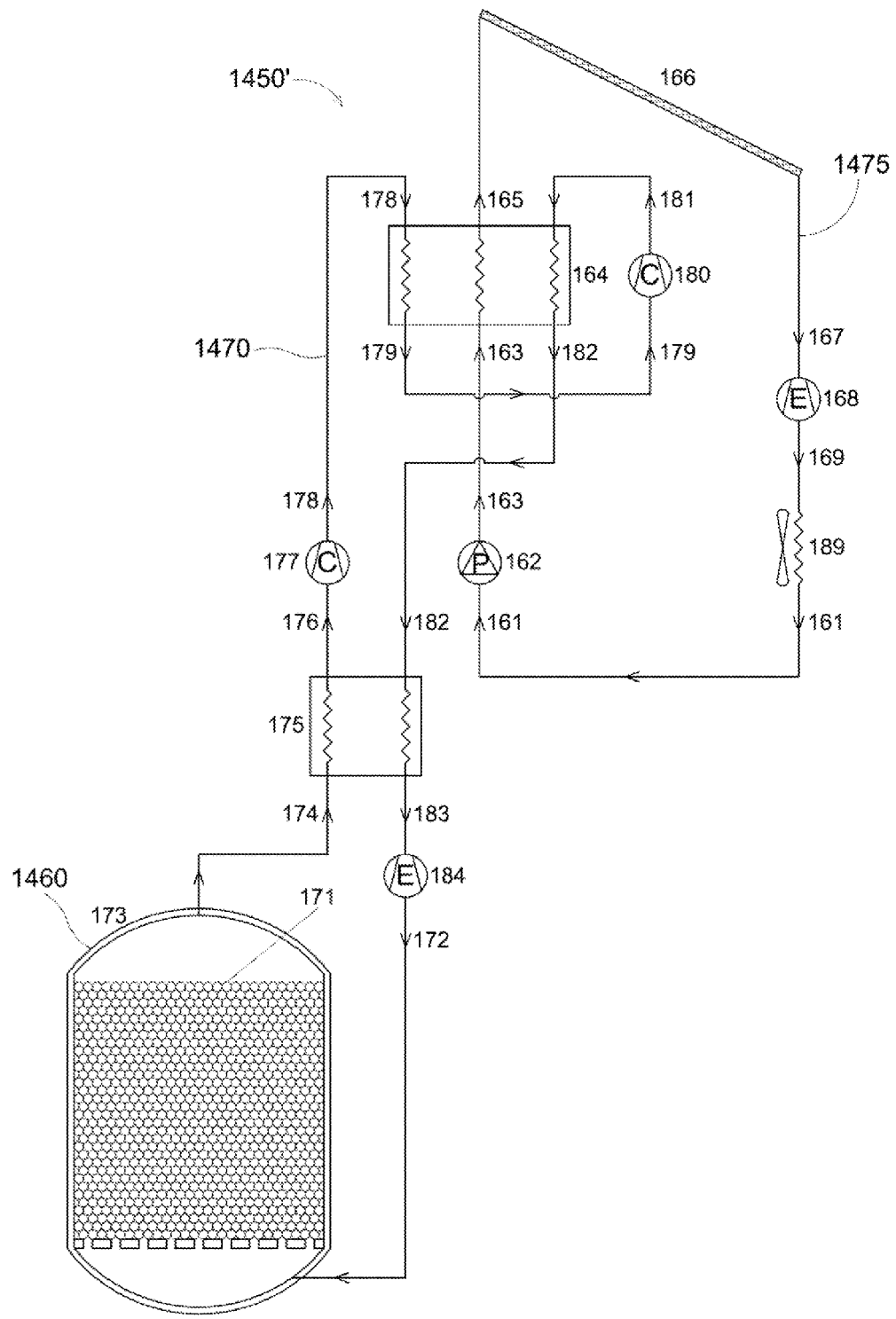
FIG. 33 is a layout of an exemplary energy storage system with combined cycles in accordance with the concepts and/or principles shown in FIG. 32.
Figure 34:
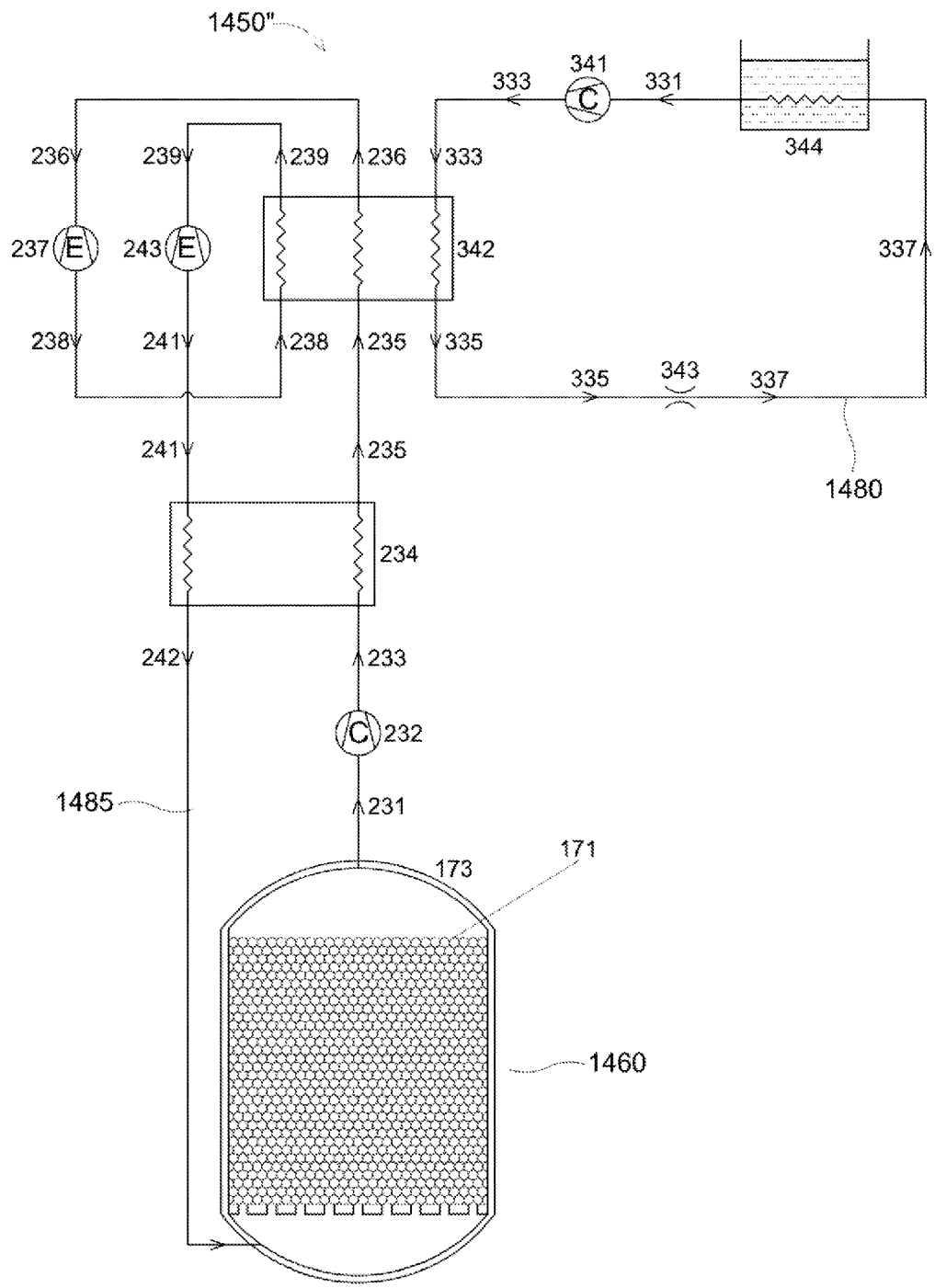
FIG. 34 is a layout of an exemplary energy retrieval system with combined cycles in accordance with the concepts and/or principles shown in FIG. 32.

FIG. 32 shows TS diagrams of a heat transfer and energy storage system 1450 that includes an energy storage subsystem 1460, a Brayton heat pump 1470, a Rankine heat engine 1475, a Brayton heat engine 1485, and a trilateral heat pump 1480. FIGS. 33-34 show layout diagrams of the heat transfer and energy storage system 1450 in charging mode and discharging mode, respectively. The Brayton heat pump 1470 and Rankine heat engine 1475 charge the energy storage subsystem 1460 by removing heat from the heat storage medium and building a temperature difference with respect to the surrounding environment. Thermal energy can later be recovered from the storage subsystem 1460 in the discharge cycle by the combined trilateral heat pump 1480 and Brayton heat engine 1485. In effect, the energy storage subsystem 1460 stores a medium from which heat is removed in the charging cycle, and in the discharging cycle, functions as a heat sink.

The Rankine heat engine 1475 receives heat isothermally from 165 to 167 ($Q_{165-167}$), and provides mechanical work from 167 to 169 (e.g., $W_{out}=W_{167-169}$). The Rankine heat engine 1475 rejects heat isothermally from 169 to 161 (e.g., $Q_{out}=Q_{169-161}$) using an isothermal heat exchanger 189. In one example, the isothermal heat absorption mechanism comprises a solar energy collector (see, e.g., 166 in FIG. 33). In such an embodiment, the Rankine heat engine 1475 and Brayton heat pump 1470 are powered during the daytime. The Rankine gradient heat exchange mechanism receives heat (e.g., $Q_{in}=Q_{163-165}$) from the Brayton heat pump 1470. Two compressors 177 and 180 (FIG. 33) raise the temperature of the working fluid to temperature $T_6$ at 178 and 181 (FIG. 32) in the Brayton cycle 1470 to enable the two gradient heat rejections across the heat exchanger 164 (FIG. 33). Other components and processes in the Rankine heat engine 1475 are the same as or similar to the same or similar components in the Rankine cycles 720, 820, 917 and 917' in FIGS. 22, 24, 27 and 29, and operate in the same or similar way thereto.

Referring back to FIG. 32, the Brayton heat pump cycle 1470 receives heat across the gradient 172-174 from the "cold" energy storage subsystem 1460 from temperature $T_1$ to temperature $T_2$. As a result, the energy storage subsystem 1460 is the heat source for the Brayton heat pump 1470. A heat exchanger (e.g., regenerator) 175 (FIG. 33) exchanges or transfers heat within the Brayton heat pump cycle from the descending gradient 182-183 to the ascending gradient 174-176. The compressors 177 and 180 (FIG. 33) compress the working fluid to raise the temperature from $T_4$ to $T_6$, followed by the gradient heat exchange (FIG. 32) with the Rankine heat engine 1475 using the heat exchanger 164 (FIG. 33). The working fluid in the Brayton heat pump cycle then releases heat at 182-183 (to the ascending gradient 174-176), and finally an expander 184 reduces the temperature of the working fluid from $T_2$ to $T_1$ (at 183-172 in FIG. 32).

In the discharging cycle, which generally runs during the night (or otherwise in the absence of solar energy), the trilateral heat pump cycle 1480 receives or absorbs heat isothermally from 337 to 331 (i.e., $Q_{in}=Q_{337-331}$), and the Brayton heat engine cycle 1485 exchanges heat with the "cold" energy storage subsystem 1460 (acting as a heat sink) across the gradient from 242 to 231 (i.e., $Q_{out}=Q_{242-231}$). Temperature $T_3$, the temperature at which the trilateral heat pump cycle 1480 absorbs heat (by isothermal heat absorption), is lower than the temperature of the environment ($T_4$), and is used for cooling (e.g., providing air conditioning to a house, building or other enclosure, such as a cold storage room or a refrigerated shipping container/vessel, for example as described herein). In FIG. 34, the trilateral heat pump 1480 includes a water tank 344 for cooling water held therein, along with a compressor 341, a heat exchanger 342, and a pump 343. Also, the Brayton heat pump 1485 includes a gradient heat exchange mechanism (e.g., regenerator 234) to transfer heat (e.g., from temperature $T_3$ to temperature $T_2$; see FIG. 32) from the descending gradient 241-242 to the ascending gradient 233-235 in the Brayton heat pump 1485, along with first and second expanders 237 and 243, heat exchanger 342, and compressor 232. The remaining processes and components in FIG. 34 are the same as or similar to those described above with regard to FIGS. 32-33, but operating in the reverse direction. Furthermore, the remaining processes and components in FIG. 34 may be the same as or similar to the same or similar components and processes described above with regard to FIGS. 1-7, 12-13, 17-18, and 21-24. The mechanical power produced by and/or transferred within the system (in discharge mode) is represented by $W_2=W_{236-238}+W_{239-241}+W_{335-337}$. The mechanical power absorbed by and/or added to the system (in discharge mode) is $W_1=W_{231-233}+W_{331-333}$. The mechanical work performed by the system on one or more external devices is thus represented by $W_{out}=W_2-W_1$.

In the example 1450 of FIGS. 32-34, all 4 cycles 1470-1485 work together with a "cold" storage subsystem 1460, and the energy storage and retrieval cycle time is 24 hours. The gradient heat transfers between cycles are all internal (i.e., not with the environment or a component not in one of the cycles), so each of the energy storage and energy retrieval processes in the system 1450 appears to the outside as a single cycle, with isothermal heat transfers into ($Q_{in}$) and out from ($Q_{out}$) the system.

Figure 35:
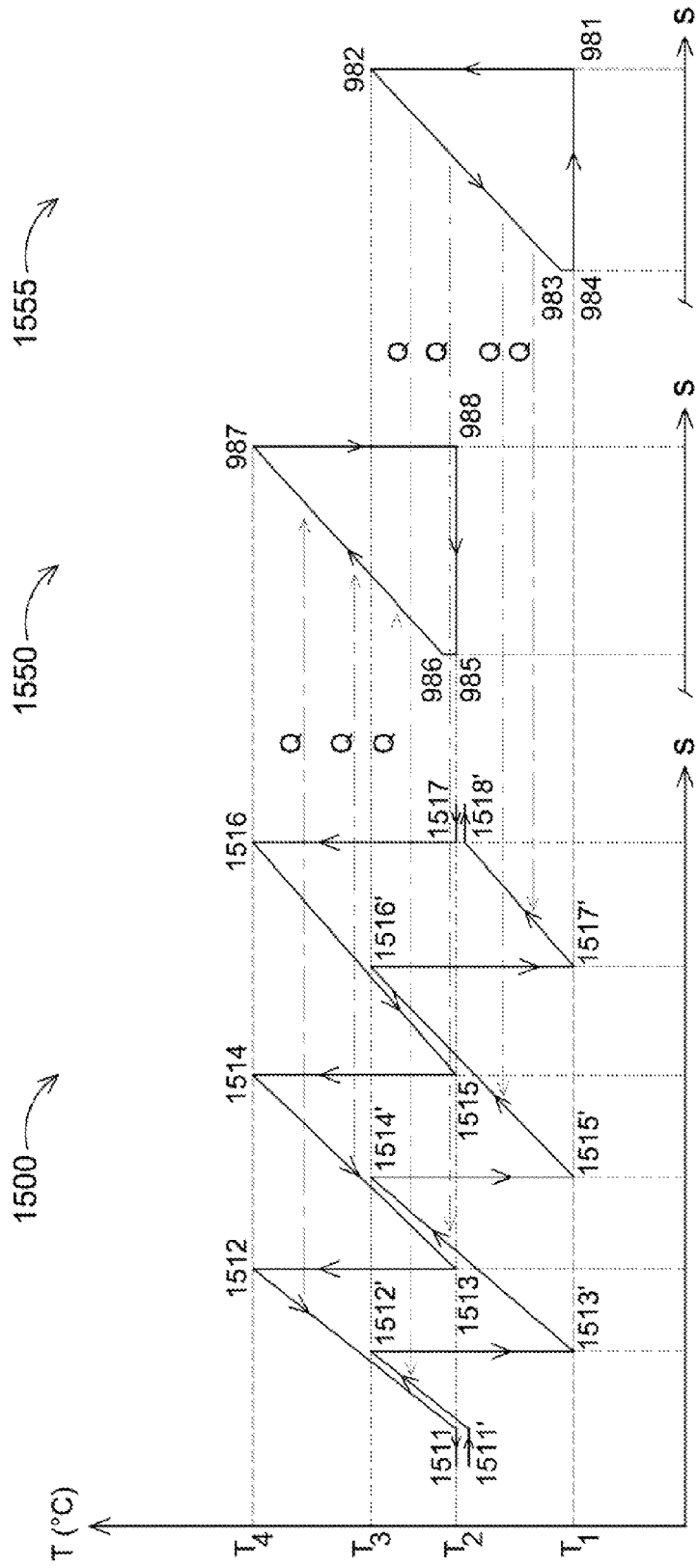
FIG. 35 is a TS diagram of a compressed air energy storage (CAES) system, including a Brayton heat pump cycle combined with a trilateral heat engine cycle and a trilateral heat pump cycle.

FIG. 35 is a TS diagram of a compressed air energy storage (CAES) system, including a Brayton heat pump and/or heat engine cycle 1500 combined with a trilateral heat engine cycle 1550 and a trilateral heat pump cycle 1555, configured to store and retrieve energy in or from compressed air. The system produces electricity and "coldness" in the discharging mode and can produce useful heat (e.g., warm or hot tap water) in the charging mode.

The Brayton cycle 1500 is split in two half-cycles or modes. The process sequence 1517-1511 is the charging mode or half-cycle, and the process sequence 1511'-1518' is the discharging mode or half-cycle.

Figure 36:
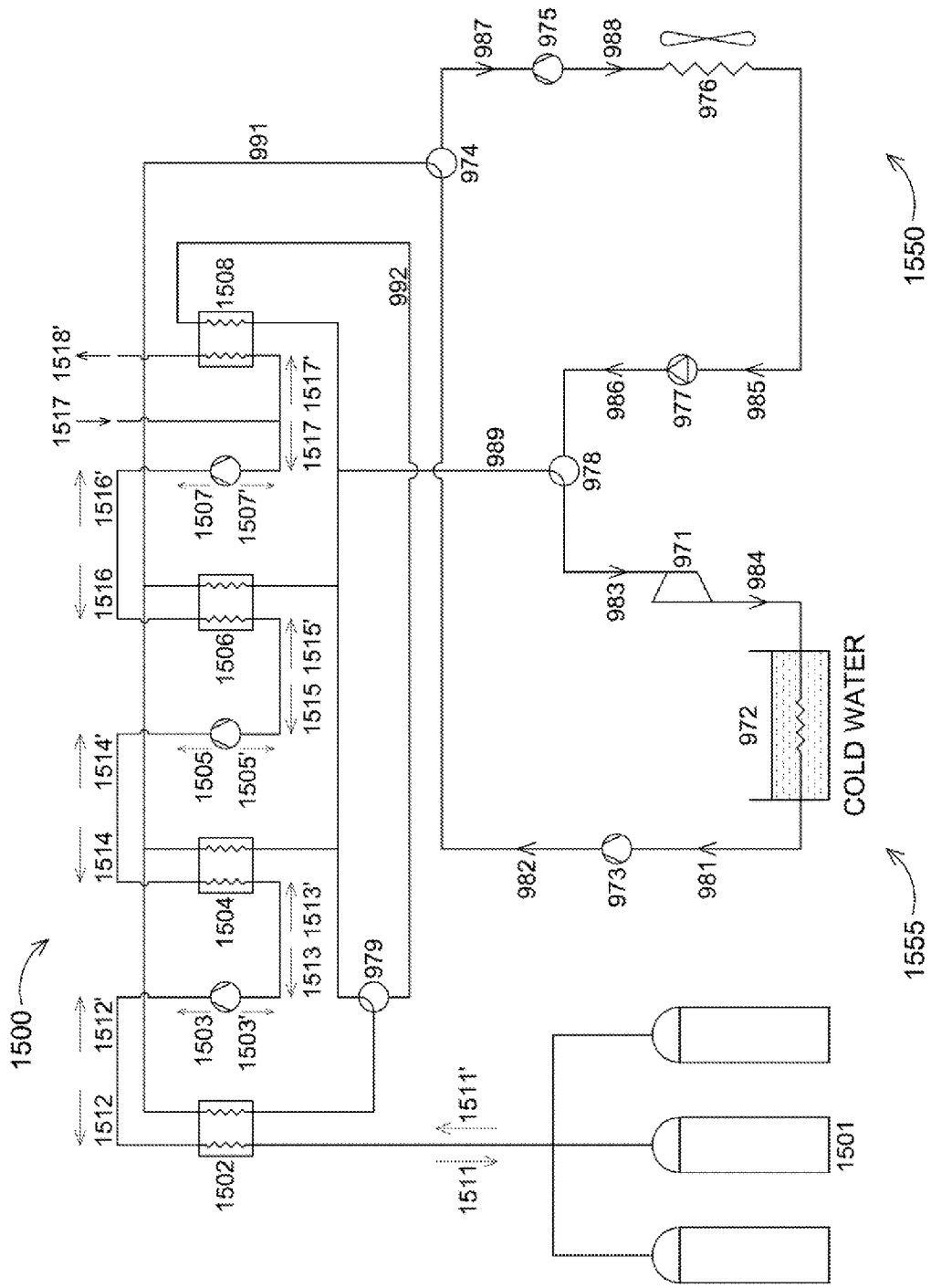
FIG. 36 is a layout of an exemplary energy storage and retrieval system with combined cycles in accordance with the concepts and/or principles shown in FIG. 35.

In charging mode, air taken from the outside (e.g., the external environment) at 1517 is compressed in the processes 1517-1516, 1515-1514 and 1513-1512, cooled in the processes 1516-1515, 1514-1513 and 1512-1511 in the Brayton heat pump cycle 1500, and delivered to an accumulator (e.g., storage tanks 1501 in FIG. 36). Heat from the three gradient heat rejection processes 1516-1515, 1514-1513 and 1512-1511 in the Brayton heat pump cycle 1500 is transferred to the gradient heat-absorbing process 986-987 in the trilateral heat engine cycle 1550. The trilateral heat engine cycle 1550 rejects heat in an isothermal process 988-985. In a cold climate, the external heat sink may be used for heating a house or other building. In discharging mode, air at a high pressure is taken from the accumulator tank at 1511', expanded in the processes 512'-513', 514'-515' and 516'-517', heated in the processes 1517'-1518'+1511'-1512', 1513'-1514', and 1515'-1516' in the Brayton heat engine cycle 1500', and finally released in the open air at 1518. Heat to the gradient heat absorption processes in the Brayton heat engine 1500' is transferred from 982-983 in the trilateral heat pump cycle 1555, where the heat is absorbed from an external source in the isothermal process 984-981. The isothermal heat absorption process 984-981 in the heat pump cycle 1555 is at a temperature $T_1$, which is lower than the ambient surrounding temperature $T_2$, and can be utilized for cooling purposes.

FIG. 36 shows a layout of the CAES system of FIG. 35, having a Brayton heat pump/heat engine 1500 combined with a trilateral heat engine 1550 and a trilateral heat pump 1550. The accumulator 1501 stores the compressed air. The devices 1503, 1505 and 1507 are reversible and are used as compressors in charging mode and as expanders in discharging mode. The heat exchangers 1502, 1504 and 1506 cool the air in charging mode, and in discharging mode, the heat exchangers 1502, 1504 and 1506 heat the air together with the additional heat exchanger 1508.

In charging mode, air is taken from the outside at 1517, compressed in the compressor 1507, cooled in the heat exchanger 1506, compressed in the compressor 1505, cooled in the heat exchanger 1504, compressed in the compressor 1503, cooled in the heat exchanger 1502, and delivered to the compressed air storage device 1501 at 1511. In discharging mode, air is taken from the compressed air storage device 1501 at 1511', heated in the heat exchanger 1502, expanded in the expander 1503', heated in the heat exchanger 1504, expanded in the expander 1505', heated in the heat exchanger 1506, expanded in the expander 1507', heated in the heat exchanger 1508, and delivered to the outside (e.g., external environment) at 1518. In charging mode, the valves 974, 978 and 979 are in another (e.g., complementary or opposite) position from that shown in FIG. 36.

In charging mode, the liquid in the heat engine 1550 is pumped by pump 977, and via conduits delivered to heat exchangers 1504, 1506 and 1508, which work as evaporators. The gas from the evaporators is expanded in the expander 975 and condensed in the condenser 976. The heat from the condenser 976 is either delivered to the outside in a warm climate or used to heat tap water, which can be further used to heat a building, room or other space in a relatively cold climate. The power needed for the compressors 1503, 1505 and 1507 and for the pump 977 is reduced by the power delivered by the expander 975.

In discharging mode, the valves 974, 978 and 979 are in the position as seen in FIG. 36. The gas in 981 from the evaporator 972 in the heat pump 1555 is compressed by compressor 973 and via conduits delivered to and cooled by heat exchangers 1502, 1504, 1506 and 1508, which work as condensers. The liquid from the condensers is delivered to a pressure reducing turbine 971 or a Joule-Thompson expansion valve, and delivered to the evaporator 972. The heat absorbed by the evaporator 972 can be taken either from the outside in a relatively cold climate, or from a room cooling device in a relatively warm climate. The power delivered from the system by the expanders 1503', 1505' and 1507' and the turbine 994 is reduced by the power delivered to the compressor 973.

Figure 37:
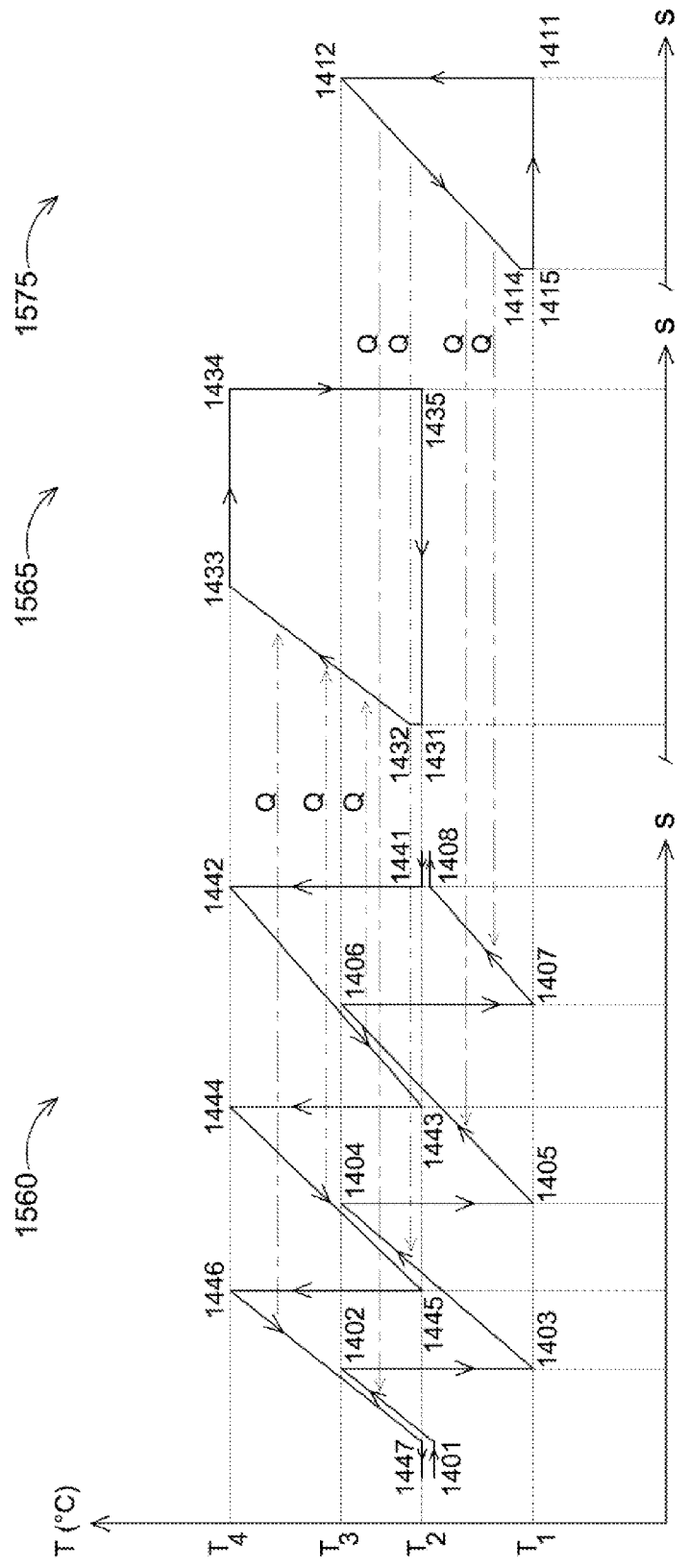
FIG. 37 is a TS diagram of another compressed air energy storage (CAES) system, including a Brayton heat pump compression sequence combined with a Rankine heat engine cycle and a trilateral heat pump cycle.

FIG. 37 shows a TS diagram of a CAES system, including a Brayton heat pump compression sequence 1560 combined with a Rankine heat engine cycle 1565, and a Brayton heat engine expansion sequence 1570 combined with a trilateral pump cycle 1575. The Rankine heat engine cycle 1565 may have an isothermal heat source (e.g., a solar heating source, such as is described herein) and a gradient heat source (e.g., heat rejected from the Brayton heat pump cycle 1560). The stored energy may be compressed air. The system produces electricity and coldness in discharging mode and can produce valuable heat (e.g., to heat tap water) in charging mode.

In charging mode, air taken from the outside at 1421 is alternatingly compressed by the three compression processes 1421-1422, 1423-1424 and 1425-1426 and cooled by the three cooling processes 1422-1423, 1424-1425 and 1426-1427, and delivered to the accumulator at 1427. The Rankine cycle 1565 includes a gradient heat absorption process 1432-1433 that absorbs heat rejected from the three compression processes 1421-1422, 1423-1424 and 1425-1426, a heat absorption process that absorbs heat from an external heat source (e.g., solar heat) in the isothermal process 1433-1434, and a heat rejection process that rejects heat from the isothermal process 1455-1451 to an external heat sink.

In discharging mode, air from the accumulator at 1401 is alternatingly expanded by the three expansion processes 1402-1403, 1404-1405 and 1406-1407, heated by the four gradient heat absorption processes 1401-1402, 1403-1404, 1405-1406 and 1407-1408, and delivered to the outside at 1408. The isothermal heat absorption process 1414-1411 in the trilateral heat pump cycle 1575 absorbs heat from an external heat source, and the gradient heat rejection process 1412-1414 in the trilateral heat pump cycle 1575, and transfers the heat from the gradient heat rejection process 1412-1414 to the four gradient absorbing processes 1401-1402, 1403-1404, 1405-1406 and 1407-1408 in the Brayton heat engine cycle 1570.

In a relatively cold climate, the external heat sink in charging mode may be a house or other building or closed space, and the external heat source in discharging mode may be the external environment. In a relatively warm climate, the external heat sink in charging mode may be the external environment, and the external heat source in discharging mode may be the house or other building or closed space.

Figure 38:
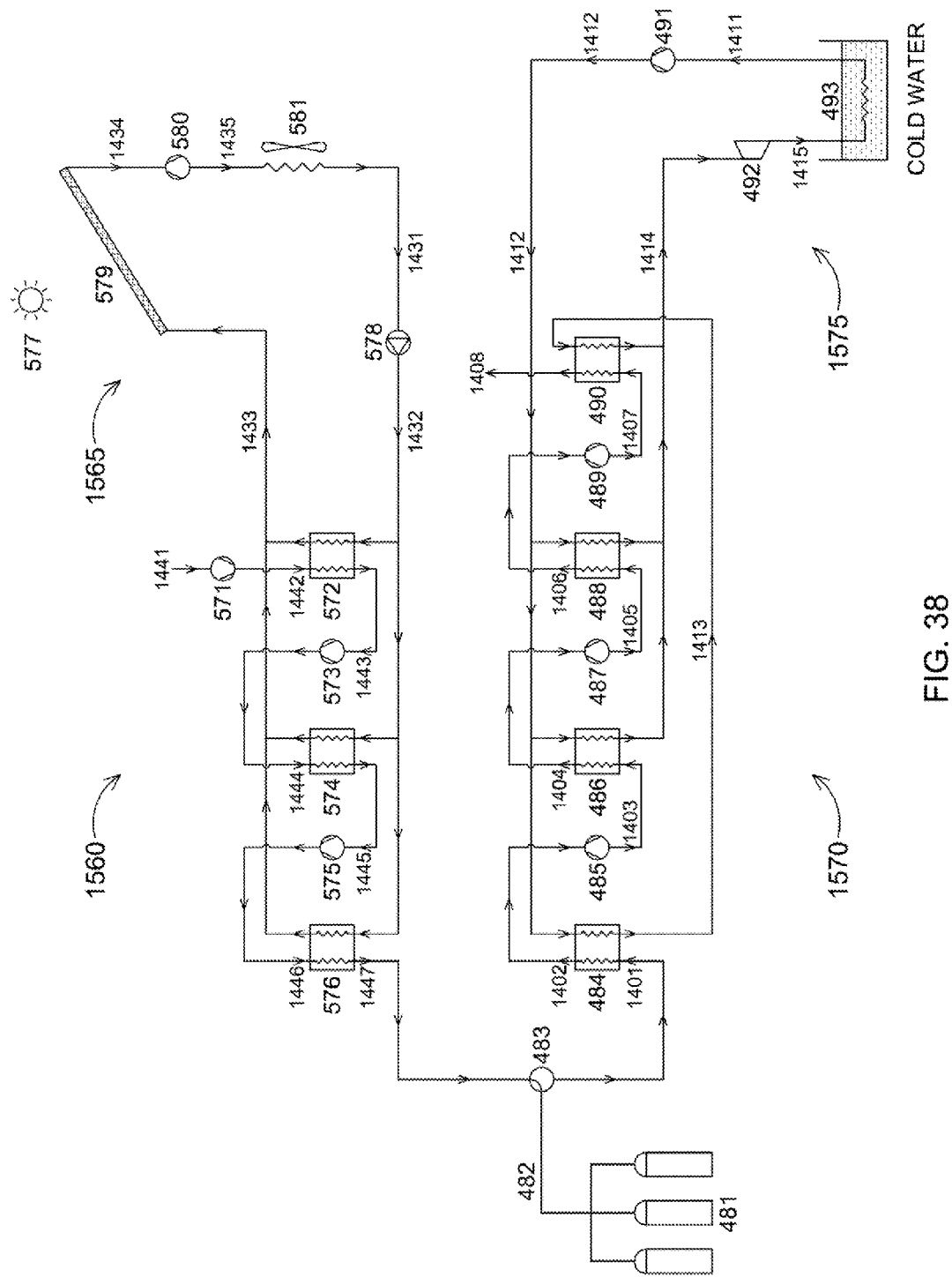
FIG. 38 is a layout of another exemplary energy storage and retrieval system with combined cycles in accordance with the concepts and/or principles shown in FIG. 37.

FIG. 38 shows a layout of the CAES system of FIG. 37, showing the Brayton heat pump compression sequence 1560 combined with a Brayton heat engine 1565, and Brayton heat engine expansion sequence 1570 combined with a trilateral pump 1575. The accumulator 481 stores the compressed air.

In charging mode, air is taken from the outside (e.g., the external environment) at 1421, compressed in the compressor 571, cooled in the heat exchanger 572, compressed in the compressor 573, cooled in the heat exchanger 574, compressed in the compressor 575, cooled in the heat exchanger 576, and delivered to the compressed air storage device 481 at 482. The valve 483 is in the position shown in FIG. 38. The power for the compressors 571, 573 and 575 and the pump 578 is delivered by the expander 560, which is 560 powered by the heat absorbed from the sun in the sun heat absorber device 579.

In discharging mode, air is taken from the compressed air storage device 481 at 482. The valve 483 is in another (e.g., complementary or opposite) position from that shown in FIG. 38. The air is further heated in the heat exchanger 484, expanded in the expander 485, heated in the heat exchanger 486, expanded in the expander 487, heated in the heat exchanger 488, expanded in the expander 489, heated in the heat exchanger 490, and delivered to the outside (e.g., the external environment) at 1408. The power delivered by the expanders 485, 487 and 489 and the turbine 492 is reduced by the power delivered to the compressor 491.

In discharging mode, the gas in conduit 1411 from the evaporator 493 in the trilateral heat pump 1575 is compressed by compressor 491, and via conduit 1412, delivered to and cooled by heat exchangers 484, 486, 488 and 490, which may work as condensers. The heat exchangers 484 and 490 work in series. The liquid from the condensers is delivered to a pressure-reducing turbine 994 or a Joule-Thompson expansion valve, and then is finally delivered to the evaporator 493 to complete the cycle.

CONCLUSION/SUMMARY

Thus, the present invention provides systems and methods for transferring and optionally storing and/or retrieving thermal energy. The systems and methods generally include a heat pump and a heat engine, the heat pump including first and second heat exchange mechanisms and first and second pressure changing mechanisms, and the heat engine including third and fourth heat exchange mechanisms and third and fourth pressure changing mechanisms. One of the first and second heat exchange mechanisms has a first temperature gradient in a first direction, and one of the third and fourth heat exchange mechanisms has a second temperature gradient in a second direction opposite to the first direction. The heat pump and the heat engine exchange heat with each other across the first and second temperature gradients, and at least one of the heat pump and the heat engine includes at least one isothermal heat exchange mechanism.

The present invention may this increase the usage of a temperature difference and/or Carnotize the thermodynamic processes that increase the efficiency of heat driven machines or thermal processes driven by such temperature differences. The systems and methods disclosed herein advantageously limit or minimize "second law" losses. The combination of cycles in the present disclosure bring the different systems of combined cycles close to an ideal Carnot cycle. A key concept behind the invention is that the heat from a gradient process (e.g., a decreasing gradient) in the pump cycle is transferred to a complementary gradient process (e.g., an increasing gradient) in the engine cycle. Together with use of one or more isothermal heat exchanges (e.g., based on a phase change of the working substance or working fluid), the present invention limits or minimizes "second law" losses.

By combining the cycles as shown in the exemplary temperature-entropy (TS) diagrams disclosed herein, it is possible to get close to a perfect match between the heat transfer or exchange processes for the most efficient heat transmission between the different cycles. Such cycle combinations also provide an ability to efficiently exchange heat with the environment outside the combined-cycle pump-engine (system), depending on various system requirements, with combinations including (but not limited to) heat exchanges across an increasing gradient in one cycle to a decreasing gradient in another cycle, heat exchanges across an increasing gradient to a decreasing gradient within a single cycle, isothermal heat transfers from an external heat source to a cycle in the system or from a cycle in the system to an external heat sink, and internal isothermal heat transfers or exchanges between different cycles in the system.

The effects of the present systems based on multiple cycles working together include less energy needed for driving the heat engine(s), more heat transferred from the cold side by the heat pump(s), and an increase in the efficiency of heat-sourced motors and heating/cooling systems. The present invention can, for example, increase the efficiency of a solar driven air conditioning (AC) system or a biomass heating or energy generation system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system, comprising:
   a) a heat engine having a first isothermal heat exchange mechanism and a first gradient heat exchange mechanism; and
   b) a heat pump having a second isothermal heat exchange mechanism and a second gradient heat exchange mechanism;
   wherein the heat engine and the heat pump transfer or exchange heat countercurrent across the first and second gradient heat exchange mechanisms, the first isothermal heat exchange mechanism transfers heat to an external heat sink, and the second isothermal heat exchange mechanism receives heat from an external heat source.

2. The system of claim 1, wherein the first heat engine comprises a Rankine heat engine with a high pressure side, the heat pump comprises a vapor compression heat pump with a high pressure side, and the countercurrent heat transfer across the first and second gradient heat exchange mechanisms transfers heat from the high pressure side of the heat pump to the high pressure side of the heat engine.

3. The system of claim 2, wherein the vapor compression heat pump further comprises a low pressure side, a third gradient heat exchange mechanism in the high pressure side, and a fourth gradient heat exchange mechanism in the low pressure side, and the third gradient heat exchange mechanism transfers heat from the high pressure side to the fourth gradient heat exchange mechanism in the low pressure side.

4. The system of claim 1, wherein the heat engine comprises a trilateral heat engine with a high pressure side, the heat pump comprises a vapor compression heat pump with a high pressure side, and the countercurrent heat transfer across the first and second gradient heat exchange mechanisms transfers heat from the high pressure side of the heat pump to the high pressure side of the heat engine.

5. The system of claim 1, wherein the heat engine comprises a Rankine heat engine with a high pressure side, the heat pump comprises a trilateral heat pump with a high pressure side, and the countercurrent heat transfer across the first and second gradient heat exchange mechanisms transfers heat from the high pressure side of the heat pump to the high pressure side of the heat engine.

6. The system of claim 1, wherein the heat engine comprises a Rankine heat engine with a high pressure side, the heat pump comprises a transcritical heat pump with a high pressure side, and the countercurrent heat transfer across the first and second gradient heat exchange mechanisms transfers heat from the high pressure side of the heat pump to the high pressure side of the heat engine.

7. The system of claim 1, wherein the heat engine comprises a trilateral heat engine with a high pressure side, the heat pump comprises a transcritical heat pump with a high pressure side, and the countercurrent heat transfer across the first and second gradient heat exchange mechanisms transfers heat from the high pressure side of the heat pump to the high pressure side of the heat engine.

8. The system of claim 1, wherein the heat engine comprises a transcritical heat engine with a high pressure side, the heat pump comprises a trilateral heat pump with a high pressure side, and the countercurrent heat transfer across the first and second gradient heat exchange mechanisms transfers heat from the high pressure side of the heat pump to the high pressure side of the heat engine.

9. The system of claim 1, wherein the isothermal heat sink comprises an isothermal heat storage device.

10. The system of claim 1, wherein the isothermal heat source comprises an isothermal heat storage device.

11. A system, comprising:
  a) a heat engine including a first isothermal heat exchange mechanism and a first gradient heat exchange mechanism;
  b) a Brayton thermodynamic device including second and third gradient heat exchange mechanisms;
  c) a heat pump including a second isothermal heat exchange mechanism and a fourth gradient heat exchange mechanism;
  wherein:
    the heat engine and the Brayton thermodynamic device transfer heat countercurrent across the first and second gradient heat exchange mechanisms,
    the Brayton thermodynamic device and the heat pump transfer heat countercurrent across the third and fourth gradient heat exchange mechanisms,
    the first isothermal heat exchange mechanism transfers heat to an external heat sink, and
    the second isothermal heat exchange mechanism receives heat from an external heat source.

12. The system of claim 11, wherein the Brayton thermodynamic device comprises a Brayton heat pump with a high pressure side and a low pressure side, the heat engine comprises a Rankine heat engine with a high pressure side, the heat pump comprises a trilateral heat pump with a high pressure side, the countercurrent heat transfer across the first and second gradient heat exchange mechanisms transfers heat from the high pressure side of the Brayton heat pump to the high pressure side of the Rankine heat engine, and the countercurrent heat transfer across the third and fourth gradient heat exchange mechanisms transfers heat from the high pressure side of the trilateral heat pump to the low pressure side of the Brayton heat pump.

13. The system of claim 11, wherein the Brayton thermodynamic device comprises a Brayton heat pump with a high pressure side and a low pressure side, the heat engine comprises a trilateral heat engine with a high pressure side, the heat pump comprises a trilateral heat pump with a high pressure side, the countercurrent heat transfer across the first and second gradient heat exchange mechanisms transfers heat from the high pressure side of the Brayton heat pump to the high pressure side of the trilateral heat engine, and the countercurrent heat transfer across the third and fourth gradient heat exchange mechanisms transfers heat from the high pressure side of the trilateral heat pump to the low pressure side of the Brayton heat pump.

14. The system of claim 11, wherein the heat engine comprises a Rankine heat engine with a high pressure side, the Brayton thermodynamic device comprises a Brayton heat engine having a high pressure side and a low pressure side, the heat pump comprises a trilateral heat pump with a high pressure side, the countercurrent heat transfer across the first and second gradient heat exchange mechanisms transfers heat from the low pressure side of the Brayton heat engine to the high pressure side of the Rankine heat engine, and the countercurrent heat transfer across the third and fourth heat exchange mechanisms transfers heat from the high pressure side of the trilateral heat pump to the high pressure side of the Brayton heat engine.

15. The system of claim 11, wherein the heat engine comprises a trilateral heat engine with a high pressure side, the Brayton thermodynamic device comprises a Brayton heat engine having a high pressure side and a low pressure side, the heat pump comprises a trilateral heat pump with a high pressure side, the countercurrent heat transfer across the first and second gradient heat exchange mechanisms transfers heat from the low pressure side of the Brayton heat engine to the high pressure side of the trilateral heat engine, and the countercurrent heat transfer across the third and fourth heat exchange mechanisms transfers heat from the high pressure side of the trilateral heat pump to the high pressure side of the Brayton heat engine.

16. The system of claim 14, further comprising a heat storage subsystem with a gradient heat absorption mechanism that receives heat from the second gradient heat exchange mechanism in a low pressure side of the Brayton heat engine in a first mode, and a gradient heat rejection mechanism that transfers heat to the first gradient heat exchange mechanism in the Rankine heat engine in a second mode.

17. The system of claim 15, further comprising a heat storage subsystem with a gradient heat absorption mechanism that receives heat from the second gradient heat exchange mechanism in a low pressure side of the Brayton heat engine in a first mode, and a gradient heat rejection mechanism that transfers heat to the first gradient heat exchange mechanism in the trilateral heat engine in a second mode.

18. A system, comprising:
  a) a first thermodynamic device with a first isothermal heat exchange mechanism and a first gradient heat exchange mechanism;
  b) a Brayton thermodynamic device having a high pressure side and a low pressure side, with a second gradient heat exchange mechanism in the high pressure side and a third gradient heat exchange mechanism in the low pressure side; and
  c) a gradient heat storage device with a fourth gradient heat exchange mechanism;
  wherein:
    the first thermodynamic device and the Brayton thermodynamic device transfer heat countercurrent across the first and second gradient heat exchange mechanisms, and
    the Brayton thermodynamic device and the gradient heat storage device transfer heat countercurrent across the third and fourth gradient heat exchange mechanisms.

19. The system of claim 18, wherein the first thermodynamic device comprises a Rankine heat engine, the Brayton thermodynamic device comprises a Brayton heat pump, the first isothermal heat exchange mechanism transfers heat to a first external heat sink, and the third gradient heat exchange mechanism receives heat from the fourth gradient heat exchange mechanism.

20. The system of claim 18, wherein the first thermodynamic device comprises a trilateral heat engine, the Brayton thermodynamic device comprises a Brayton heat pump, the first isothermal heat exchange mechanism transfers heat to a first external heat sink, and the third gradient heat exchange mechanism receives heat from the fourth gradient heat exchange mechanism.

21. The system of claim 18, wherein the first thermodynamic device comprises a trilateral heat pump, the Brayton thermodynamic device comprises a Brayton heat engine, the first isothermal heat exchange mechanism receives heat from an external heat source, and the third gradient heat exchange mechanism transfers heat to the fourth gradient heat exchange mechanism.

22. The system of claim 18, wherein the gradient heat storage device is integrated with the Brayton thermodynamic device, and the third and fourth gradient heat exchange mechanisms are an inner surface of the gradient heat storage device.

23. A thermodynamic device, comprising:
   a) a first heat exchanger comprising a first gradient heat exchange mechanism and a second gradient heat exchange mechanism, the first gradient heat exchange mechanism having a first fluid therein, and the second gradient heat exchange mechanism having a second countercurrent fluid therein;
   b) a second heat exchanger comprising a third gradient heat exchange mechanism and a fourth gradient heat exchange mechanism, the third gradient heat exchange mechanism having the first fluid therein, and the fourth gradient heat exchange mechanism having the second countercurrent fluid therein, wherein the second fluid in the second gradient heat exchange mechanism has a direct fluid connection with the second fluid in the fourth gradient heat exchange mechanism; and
   c) an adiabatic temperature-changing mechanism in between and in fluid connection with the first gradient heat exchange mechanism and the third gradient heat exchange mechanism, wherein heat is exchanged between the first and the second fluids in the first and the second heat exchangers.

\* \* \* \* \*